US012674781B2

(12) United States Patent
David et al.

(10) Patent No.: US 12,674,781 B2
(45) Date of Patent: Jul. 7, 2026

(54) SYSTEMS, METHODS, AND APPARATUS FOR REPORTING INSPECTION DATA

(71) Applicant: Gecko Robotics, Inc., Pittsburgh, PA (US)

(72) Inventors: Chase David, Montgomery, TX (US); Michael A. Binger, Pittsburgh, PA (US); Kevin Y. Low, Pittsburgh, PA (US); Ryan DeSoto, Pearland, TX (US); Brandon J. Reitz, Magnolia, TX (US); Spencer Bowman, Pittsburgh, PA (US); Edward A. Bryner, Pittsburgh, PA (US); Albert J. Biglan, Pittsburgh, PA (US)

(73) Assignee: Gecko Robotics, Inc., Pittsburgh, PA (US)

( * ) Notice: Subject to any disclaimer, the term of this patent is extended or adjusted under 35 U.S.C. 154(b) by 0 days.

(21) Appl. No.: 19/327,842

(22) Filed: Sep. 12, 2025

(65) Prior Publication Data

US 2026/0009769 A1    Jan. 8, 2026

Related U.S. Application Data

(63) Continuation of application No. 18/935,035, filed on Nov. 1, 2024, now Pat. No. 12,442,797, and a (Continued)

(51) Int. Cl.
 *G01N 29/22*    (2006.01)
 *G01N 29/04*    (2006.01)
 (Continued)

(52) U.S. Cl.
 CPC ......... *G01N 29/226* (2013.01); *G01N 29/041* (2013.01); *G01N 29/265* (2013.01); *G01N 29/262* (2013.01)

(58) Field of Classification Search
 CPC ..... G01N 29/26; G01N 29/041; G01N 29/265
 (Continued)

(56) References Cited

U.S. PATENT DOCUMENTS

| | | | |
|---|---|---|---|
| 4,893,286 A | 1/1990 | Cobb | |
| 6,981,417 B1 | 1/2006 | Oravecz | |

(Continued)

FOREIGN PATENT DOCUMENTS

| | | |
|---|---|---|
| KR | 20110033609 A | 3/2011 |
| KR | 102263144 B1 | 6/2021 |
| WO | 2022225725 A1 | 10/2022 |

OTHER PUBLICATIONS

PCT/US2023/085922, "International Application Serial No. PCT/US2023/085922, International Search Report and Written Opinion mailed May 21, 2024", Gecko Robotics, Inc., 25 pages.

*Primary Examiner* — Jacques M Saint Surin
(74) *Attorney, Agent, or Firm* — GTC Law Group PC & Affiliates

(57) ABSTRACT

A payload may perform inspection operations for an inspection surface. The payload may configure metadata for inspection data collected as a part of the inspection operations. The payload may upload inspection data in response to the inspection operations. The payload may perform at least one of analysis of the inspection data or validation of the inspection data utilizing the uploaded inspection data, where the performing at least one of analysis of the inspection data or validation of the inspection data comprises accessing a facility visualization and planning platform. The payload may provide a preliminary report in response to the analyzed and/or validated inspection data. The payload may review the preliminary report for data quality and/or data accuracy, and provide an approved report in response to the (Continued)

review. The payload may confirm the approved report for scope completion, and provide a confirmed final report.

19 Claims, 42 Drawing Sheets

Related U.S. Application Data continuation of application No. PCT/US2023/085922, filed on Dec. 26, 2023.

(60) Provisional application No. 63/596,142, filed on Nov. 3, 2023, provisional application No. 63/477,098, filed on Dec. 23, 2022.

(51) Int. Cl.
  *G01N 29/26*  (2006.01)
  *G01N 29/265*  (2006.01)

(58) Field of Classification Search
  USPC ........................................................... 73/618
  See application file for complete search history.

(56) References Cited

U.S. PATENT DOCUMENTS

| | | | | |
|---|---|---|---|---|
| 7,869,844 | B2 * | 1/2011 | Lee | H04B 1/3833 |
| | | | | 455/575.4 |
| 8,739,059 | B2 * | 5/2014 | Rabenold | G06Q 40/04 |
| | | | | 715/224 |
| 9,904,614 | B2 * | 2/2018 | Stevens | G06F 11/3604 |
| 10,083,166 | B2 * | 9/2018 | Liu | G06F 40/56 |
| 11,364,943 | B1 | 6/2022 | Brick et al. | |
| 2019/0128856 | A1 | 5/2019 | Spay et al. | |
| 2020/0254615 | A1 * | 8/2020 | Bryner | B25J 5/007 |
| 2022/0214315 | A1 | 7/2022 | Serrill et al. | |

* cited by examiner

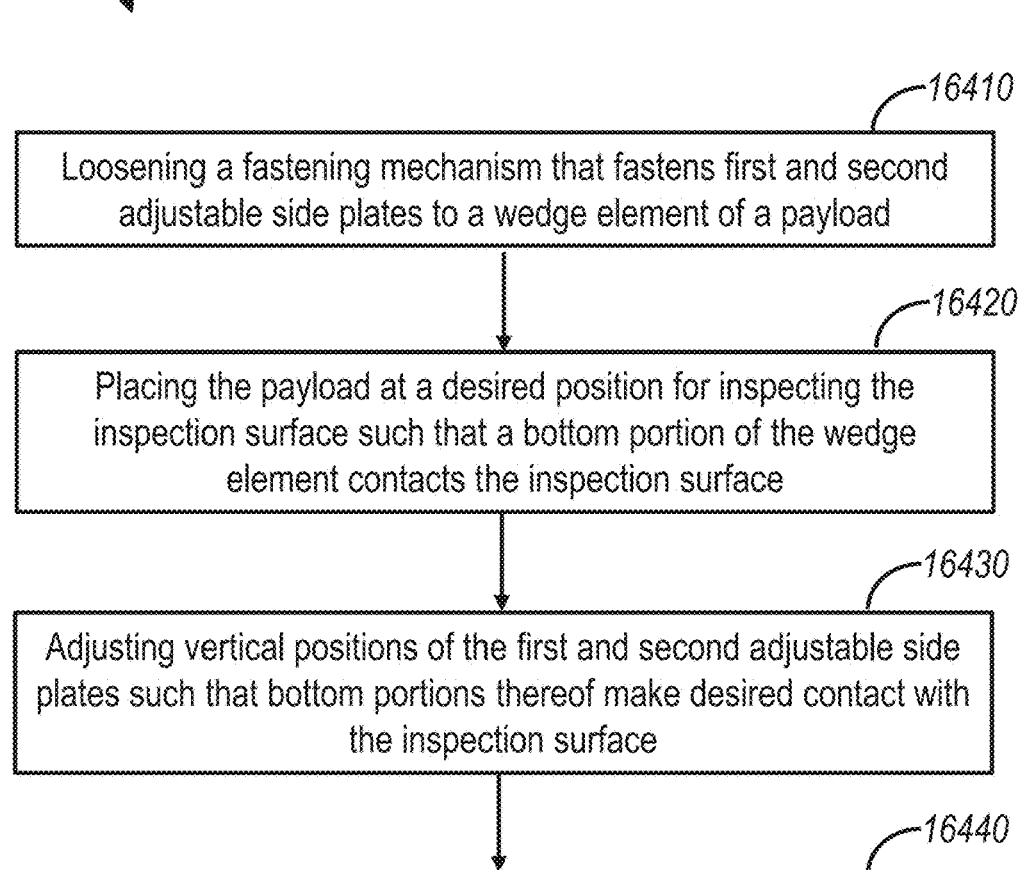

16410

Loosening a fastening mechanism that fastens first and second adjustable side plates to a wedge element of a payload

16420

Placing the payload at a desired position for inspecting the inspection surface such that a bottom portion of the wedge element contacts the inspection surface

16430

Adjusting vertical positions of the first and second adjustable side plates such that bottom portions thereof make desired contact with the inspection surface

16440

Tightening the fastening mechanism that fastens the first and second side plates to the wedge element of the payload

Inspecting an inspection surface with a payload including a wear structure having a wear indicator

16520

Observing the wear indicator

16530

Determining, based on the observing, whether to perform an inspection operation

Figure 41:
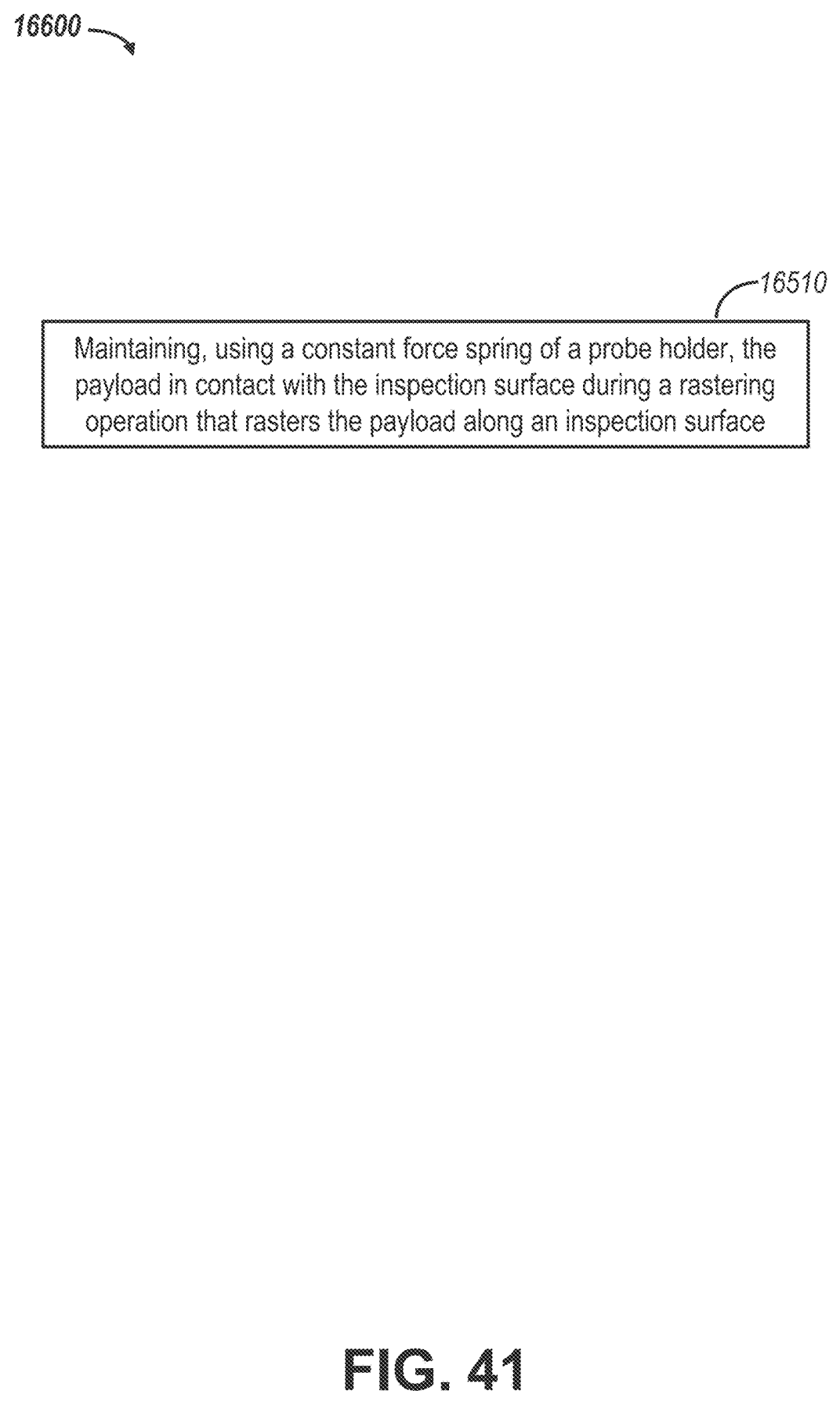

16600 ⟍

⌐16510

Maintaining, using a constant force spring of a probe holder, the
payload in contact with the inspection surface during a rastering
operation that rasters the payload along an inspection surface

Figure 42:
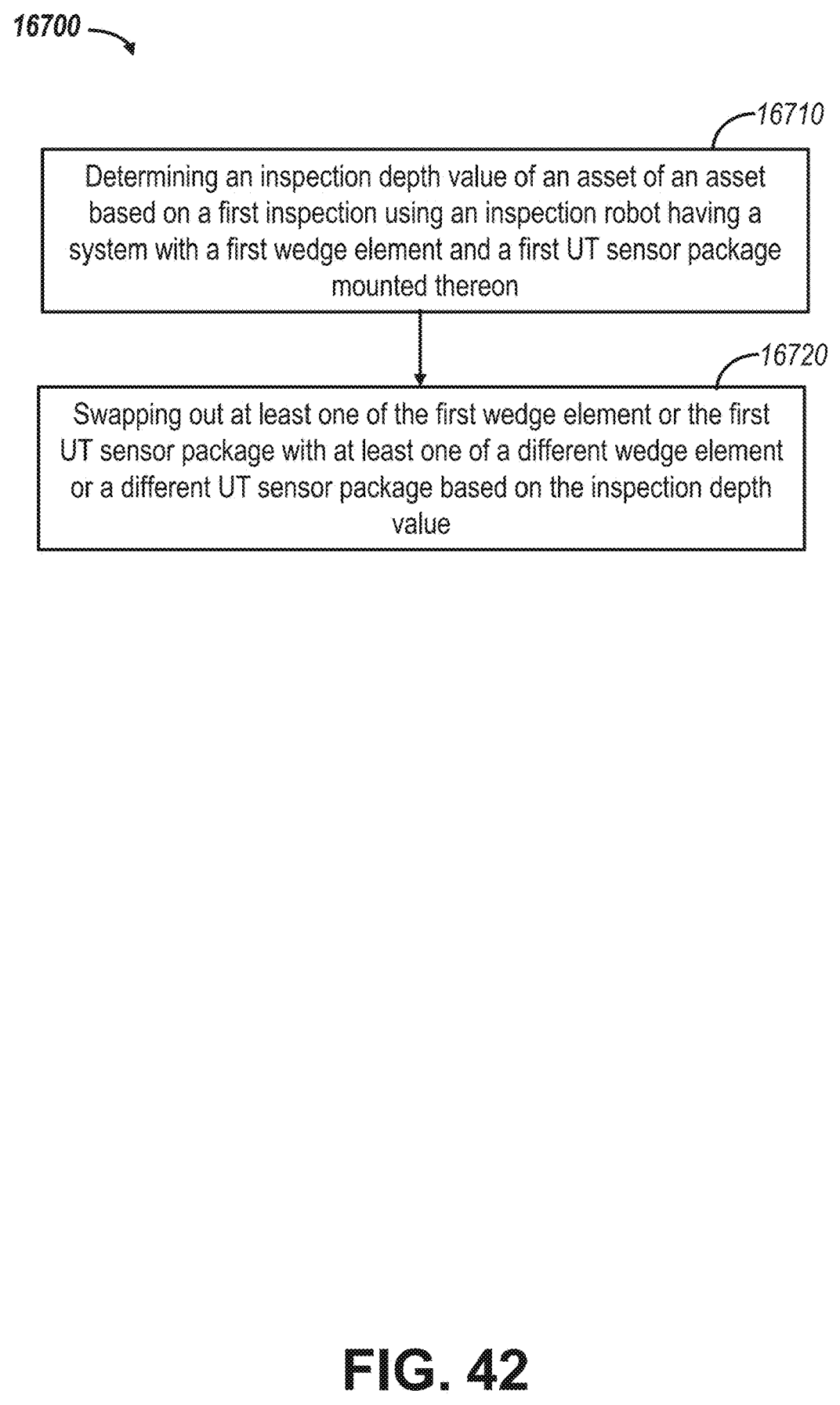

Determining an inspection depth value of an asset of an asset based on a first inspection using an inspection robot having a system with a first wedge element and a first UT sensor package mounted thereon

16720

Swapping out at least one of the first wedge element or the first UT sensor package with at least one of a different wedge element or a different UT sensor package based on the inspection depth value

Begin

Collecting inspection surface data at a first location    17502

Transmitting the inspection surface data to a second location    17504

Perform remote data processing on the inspection surface data    17505

Receiving an inspection control parameter from the second location    17506

Performing an inspection operation in response to the inspection control parameter    17508

End

18200

Controller 18202

Inspection surface description circuit 18204

Remote inspection evaluation circuit 18206

Inspection execution circuit 18208

Inspection surface data 18210

Inspection control parameter 18212

Inspection operation 18214

SYSTEMS, METHODS, AND APPARATUS FOR REPORTING INSPECTION DATA

CROSS-REFERENCE TO RELATED APPLICATION

This application is a continuation of and claims priority to U.S. patent application Ser. No. 18/935,035, filed Nov. 1, 2024, entitled "SYSTEMS, METHODS, AND APPARATUS FOR INSPECTION OF A SURFACE USING SENSOR HOLDER WITH DUAL LINEAR PHASED ARRAY OF ULTRA-SONIC ELEMENTS," issued as U.S. Pat. No. 12,442,797 on Oct. 14, 2025.

U.S. patent application Ser. No. 18/935,035 claims the benefit of priority to U.S. Provisional Patent Application 63/596,142, entitled "PHASED ARRAY CONSTANT FORCE PROBE HOLDER," filed on Nov. 3, 2023.

U.S. patent application Ser. No. 18/935,035 is a continuation of, and claims priority to, PCT Patent Application Serial No. PCT/US2023/085922, filed on Dec. 26, 2023, published on Jun. 27, 2024, as International Publication No. WO2024138219, and entitled "SYSTEMS, METHODS, AND APPARATUS FOR INSPECTION OF A SURFACE USING SENSOR HOLDER WITH DUAL LINEAR PHASED ARRAY OF ULTRA-SONIC ELEMENTS".

PCT Patent Application Serial No. PCT/US2023/085922 claims the benefit of priority to U.S. Provisional Patent Application 63/477,098, entitled "SYSTEMS, METHODS, AND APPARATUS FOR INSPECTION OF A SURFACE USING A SENSOR HOLDER WITH DUAL LINEAR PHASED ARRAY OF ULTRA-SONIC ELEMENTS," filed on Dec. 23, 2022 and U.S. Provisional Patent Application 63/596,142, entitled "PHASED ARRAY CONSTANT FORCE PROBE HOLDER," filed on Nov. 3, 2023.

The foregoing applications are incorporated herein by reference in the entirety for all purposes.

BACKGROUND

The present disclosure relates to robotic inspection and treatment of industrial surfaces.

SUMMARY

Previously known inspection and treatment systems for industrial surfaces suffer from a number of drawbacks. Industrial surfaces are often required to be inspected to determine whether a pipe wall, tank surface, or other industrial surface feature has suffered from corrosion, degradation, loss of a coating, damage, wall thinning or wear, or other undesirable aspects. Industrial surfaces are often present within a hazardous location—for example in an environment with heavy operating equipment, operating at high temperatures, in a confined environment, at a high elevation, in the presence of high voltage electricity, in the presence of toxic or noxious gases, in the presence of corrosive liquids, and/or in the presence of operating equipment that is dangerous to personnel. Accordingly, presently known systems require that a system be shutdown, that a system be operated at a reduced capacity, that stringent safety procedures be followed (e.g., lockout/tagout, confined space entry procedures, harnessing, etc.), and/or that personnel are exposed to hazards even if proper procedures are followed. Additionally, the inconvenience, hazards, and/or confined spaces of personnel entry into inspection areas can result in inspections that are incomplete, of low resolution, that lack systematic coverage of the inspected area, and/or that are prone to human error and judgement in determining whether an area has been properly inspected.

Further, inspection operations utilizing an inspection robot are highly complex, requiring the proper configuration of the inspection robot (e.g., proper drive modules; payloads; electronic configuration; installation, calibration, and configuration of appropriate sensors for the inspection surface; etc.) and operational expertise to position and operate the inspection robot successfully and safely. Previously known systems require operators that have operational expertise, as well as expertise in configuring the sensors and electronic components of the inspection robot, and in analyzing the inspection data to ensure that the data is collected properly as well as the correct data, sensor settings, inspection surface coverage, and the like that is appropriate for the inspection surface. Inspection surface variability, such as the thickness of the inspection surface, coatings thereon, the type of damage, wear, or corrosion being inspected, and/or changes in the inspection surface over time further add to the complexity. Additionally, phased array ultrasonic (UT) inspection operations add further complications, such as properly configuring the phased array UT payload appropriately for the surface and/or inspected aspects, where the configuration includes, without limitation, the excitation amplitude of the phased array elements, sequencing of excitation and detection operations, performing beam steering operations, ensuring that calibrations are correct (e.g., time windows, frequency values, amplitude values, sequencing values, ensuring that communications utilize the proper units, protocols, sampling rates, etc.). Accordingly, inspection operations for previously known systems require either personnel that have a significant number of areas of expertise, or the presence of multiple persons at the inspection location that between them have the various expertise categories to safely, properly, and completely perform the inspection operations. Where a single person with multiple areas of expertise are utilized, a very limited number of personnel are available and capable to perform inspection operations, reducing the overall inspection capacity of a service provider, increasing the risk to operations due to single point failures for a significant body of inspection operations, and increasing the attention burden of operating personnel, for example during operational periods that require data analysis, UT analysis, and sophisticated physical operations, increasing the risk that an aspect of the inspection operations may be missed, performed incorrectly, or performed at lower than optimal safety conditions. Where multiple persons are utilized to provide the various areas of expertise, operational risks are increased (e.g., due to additional operational personnel positioned at a facility which might include industrial hazards, and further where some of the additional operational personnel may not be operational experts that are familiar with proper operations in view of the industrial hazards), overall system risks are increased (e.g., due to increased travel risks moving multiple personnel between locations), and costs are significantly increased (e.g., where some of the personnel are underutilized during certain inspection operations where their particular area of expertise is not required).

Embodiments of the present disclosure address numerous challenges in previously known systems, for example and without limitation: providing for rapid and convenient configuration of a UT phased array payload appropriate for an inspection surface; providing for rapid and convenient confirmation that a configured inspection robot is correctly configured and ready to perform inspection operations; and/or separating expert personnel from supporting inspection operations, where the separation is provided in both location and/or time, allowing for more complete utilization of personnel, allowing for experts to focus on high value activity according to their expertise, and reducing operational cost and risk. In certain embodiments, one or more, or all, of aspects of these challenges are addressed. In certain embodiments, embodiments may address other challenges in previously known systems that are not explicitly set forth preceding.

BRIEF DESCRIPTION OF THE FIGURES

FIG. 21 illustrates a rotational joint according to an example embodiment.

FIG. 39 depicts an example procedure to adjust side walls of a wedge element.

FIG. 41 depicts an example procedure to maintain a payload in contact with an inspection surface.

FIG. 42 depicts an example procedure to adjust a sensing package for an inspection robot.

DETAILED DESCRIPTION

Figure 1:
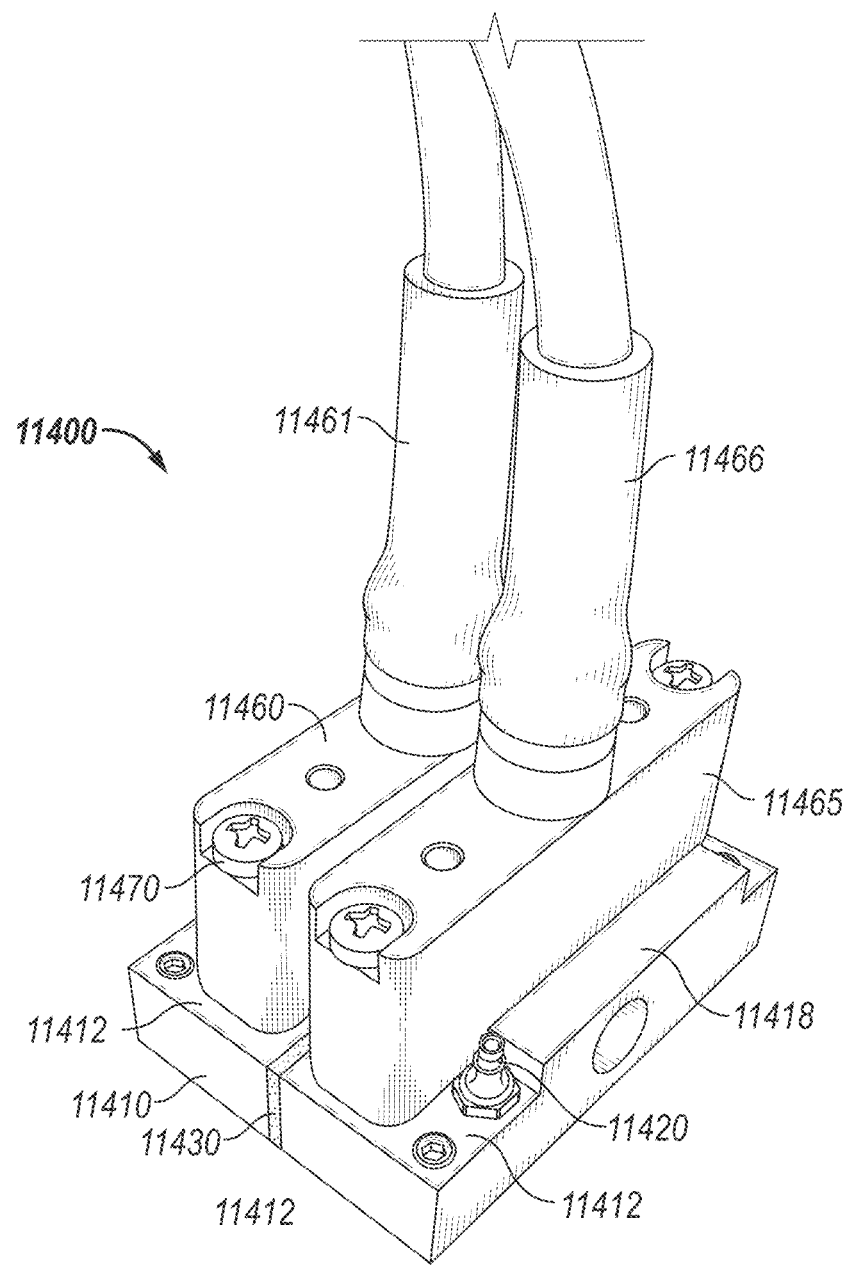
FIG. 1 illustrates an example payload having a dual linear phased array.

The present disclosure relates to a system developed for traversing, climbing, or otherwise traveling over walls (curved or flat), or other industrial surfaces. Industrial surfaces, as described herein, include any tank, pipe, housing, or other surface utilized in an industrial environment, including at least heating and cooling pipes, conveyance pipes or conduits, and tanks, reactors, mixers, or containers. In certain embodiments, an industrial surface is ferromagnetic, for example including iron, steel, nickel, cobalt, and alloys thereof. In certain embodiments, an industrial surface is not ferromagnetic.

Certain descriptions herein include operations to inspect a surface, an inspection robot or inspection device, or other descriptions in the context of performing an inspection. Inspections, as utilized herein, should be understood broadly. Without limiting any other disclosures or embodiments herein, inspection operations herein include operating one or more sensors in relation to an inspected surface, electromagnetic radiation inspection of a surface (e.g., operating a camera) whether in the visible spectrum or otherwise (e.g., infrared, UV, X-Ray, gamma ray, etc.), high-resolution inspection of the surface itself (e.g., a laser profiler, caliper, etc.), performing a repair operation on a surface, performing a cleaning operation on a surface, and/or marking a surface for a later operation (e.g., for further inspection, for repair, and/or for later analysis). Inspection operations include operations for a payload carrying a sensor or an array of sensors (e.g. on sensor sleds) for measuring characteristics of a surface being traversed such as thickness of the surface, curvature of the surface, ultrasound (or ultra-sonic) measurements to test the integrity of the surface and/or the thickness of the material forming the surface, heat transfer, heat profile/mapping, profiles or mapping any other parameters, the presence of rust or other corrosion, surface defects or pitting, the presence of organic matter or mineral deposits on the surface, weld quality and the like. Sensors may include magnetic induction sensors, acoustic sensors, laser sensors, LIDAR, a variety of image sensors, and the like. The inspection sled may carry a sensor for measuring characteristics near the surface being traversed such as emission sensors to test for gas leaks, air quality monitoring, radioactivity, the presence of liquids, electro-magnetic interference, visual data of the surface being traversed such as uniformity, reflectance, status of coatings such as epoxy coatings, wall thickness values or patterns, wear patterns, and the like. The term inspection sled may indicate one or more tools for repairing, welding, cleaning, applying a treatment or coating the surface being treated. Treatments and coatings may include rust proofing, sealing, painting, application of a coating, and the like. Cleaning and repairing may include removing debris, sealing leaks, patching cracks, and the like. The term inspection sled, sensor sled, and sled may be used interchangeably throughout the present disclosure.

In certain embodiments, for clarity of description, a sensor is described in certain contexts throughout the present disclosure, but it is understood explicitly that one or more tools for repairing, cleaning, and/or applying a treatment or coating to the surface being treated are likewise contemplated herein wherever a sensor is referenced. In certain embodiments, where a sensor provides a detected value (e.g., inspection data or the like), a sensor rather than a tool may be contemplated, and/or a tool providing a feedback value (e.g., application pressure, application amount, nozzle open time, orientation, etc.) may be contemplated as a sensor in such contexts.

In certain embodiments, the robotic vehicle includes sensor sleds with one sensor and sensor sleds with a plurality of sensors. A number of sensors arranged on a single sensor sled may be arranged with the same sensor type across the direction of robotic vehicle travel (e.g., perpendicular to the direction of travel, or "horizontal") to increase coverage of that sensor type (e.g., to cover different surfaces of an object, such as two sides of a pipe), arranged with the same sensor type along the direction of robotic vehicle travel (e.g., parallel to the direction of travel, or "vertical") to provide redundant coverage of that sensor type over the same location (e.g., to ensure data coverage, to enable statistical analysis based on multiple measurements over the same location), arranged with a different sensor type across the direction of robotic vehicle travel to capture a diversity of sensor data in side-by-side locations along the direction of robotic vehicle travel (e.g., providing both ultra-sonic and conductivity measurements at side-by-side locations), arranged with a different sensor type along the direction of robotic vehicle travel to provide predictive sensing from a leading sensor to a trailing sensor (e.g., running a trailing gamma-ray sensor measurement only if a leading ultra-sonic sensor measurement indicates the need to do so), combinations of any of these, and the like. The modularity of the robotic vehicle may permit exchanging sensor sleds with the same sensor configuration (e.g., replacement due to wear or failure), different sensor configurations (e.g., adapting the sensor arrangement for different surface applications), and the like.

Providing for multiple simultaneous sensor measurements over a surface area, whether for taking data from the same sensor type or from different sensor types, provides the ability to maximize the collection of sensor data in a single run of the robotic vehicle. If the surface over which the robotic vehicle was moving were perfectly flat, the sensor sled could cover a substantial surface with an array of sensors. However, the surface over which the robotic vehicle travels may be highly irregular, and have obstacles over which the sensor sleds must adjust, and so the preferred embodiment for the sensor sled is relatively small with a highly flexible orientation, as described herein, where a plurality of sensor sleds is arranged to cover an area along the direction of robotic vehicle travel. Sensors may be distributed amongst the sensor sleds as described for individual sensor sleds (e.g., single sensor per sensor sled, multiple sensors per sensor sled (arranged as described herein)), where total coverage is achieved through a plurality of sensor sleds mounted to the robotic vehicle. Further, each sensor sled may be positioned to accommodate regular characteristics in the surface (e.g., positioning sensor sleds to ride along a selected portion of a pipe aligned along the direction of travel), to provide for multiple detections of a pipe or tube from a number of radial positions, sensor sleds may be shaped to accommodate the shape of regular characteristics in the surface (e.g., rounded surface of a pipe), and the like. In this way, the sensor sled arrangement may accommodate both the regular characteristics in the surface (e.g., a series of features along the direction of travel) and irregular characteristics along the surface (e.g., obstacles that the sensor sleds flexibly mitigate during travel along the surface).

Throughout the present description, certain orientation parameters are described as "horizontal," "perpendicular," and/or "across" the direction of travel of the inspection robot, and/or described as "vertical," "parallel," and/or in line with the direction of travel of the inspection robot. It is specifically contemplated herein that the inspection robot may be travelling vertically, horizontally, at oblique angles, and/or on curves relative to a ground-based absolute coordinate system. Accordingly, except where the context otherwise requires, any reference to the direction of travel of the inspection robot is understood to include any orientation of the robot—such as an inspection robot traveling horizontally on a floor may have a "vertical" direction for purposes of understanding sled distribution that is in a "horizontal" absolute direction. Additionally, the "vertical" direction of the inspection robot may be a function of time during inspection operations and/or position on an inspection surface—for example as an inspection robot traverses over a curved surface. In certain embodiments, where gravitational considerations or other context based aspects may indicate—vertical indicates an absolute coordinate system vertical—for example in certain embodiments where couplant flow into a cone is utilized to manage bubble formation in the cone. In certain embodiments, a trajectory through the inspection surface of a given sled may be referenced as a "horizontal inspection lane"—for example, the track that the sled takes traversing through the inspection surface.

The term selectively couplable (and similar terms) as utilized herein should be understood broadly. Without limitation to any other aspect or description of the present disclosure, selectively couplable describes a selected association between objects. For example, an interface of object 1 may be so configured as to couple with an interface of object 2 but not with the interface of other objects. An example of selective coupling includes a power cord designed to couple to certain models of a particular brand of computer, while not being able to couple with other models of the same brand of computer. In certain embodiments, selectively couplable includes coupling under selected circumstances and/or operating conditions, and/or includes de-coupling under selected circumstances and/or operating conditions.

The term fluidly communicate (and similar terms) as utilized herein should be understood broadly. Without limitation to any other aspect or description of the present disclosure, fluid communication describes a movement of a fluid, a gas, or a liquid, between two points. In some examples, the movement of the fluid between the two points can be one of multiple ways the two points are connected, or may be the only way they are connected. For example, a device may supply air bubbles into a liquid in one instance, and in another instance the device may also supply electricity from a battery via the same device to electrochemically activate the liquid.

The term universal conduit (and similar terms) as utilized herein should be understood broadly. Without limitation to any other aspect or description of the present disclosure, a universal conduit describes a conduit capable of providing multiple other conduits or connectors, such as fluid, electricity, communications, or the like. In certain embodiments, a universal conduit includes a conduit at least capable to provide an electrical connection and a fluid connection. In certain embodiments, a universal conduit includes a conduit at least capable to provide an electrical connection and a communication connection.

The term mechanically couple (and similar terms) as utilized herein should be understood broadly. Without limitation to any other aspect or description of the present disclosure, mechanically coupling describes connecting objects using a mechanical interface, such as joints, fasteners, snap fit joints, hook and loop, zipper, screw, rivet, or the like.

As will be appreciated, embodiments of the modular drive assemblies disclosed herein may provide for the ability to quickly swap out wheel configurations for the inspection robot. For example, a first modular drive assembly having wheels with a first shape corresponding to a first portion of an inspection surface (or the surface as a whole) may be switched out with another modular drive assembly having wheels with a shape corresponding to a second portion of the inspection surface (or a second inspection surface). For example, a first modular drive assembly may be used to inspect a first pipe having a first curvature and a second modular drive assembly may be used to inspect a second pipe having a second curvature.

Interrogating, performing inspection operations, and/or collecting inspection data, as utilized herein, includes any operations to collect data associated with a given sensor, to perform data collection associated with a given sensor (e.g., commanding sensors, receiving data values from the sensors, or the like), and/or to determine data in response to information provided by a sensor (e.g., determining values, based on a model, from sensor data; converting sensor data to a value based on a calibration of the sensor reading to the corresponding data; and/or combining data from one or more sensors or other information to determine a value of interest). A sensor may be any type of sensor as set forth throughout the present disclosure, but includes at least a UT sensor, a phased array UT sensor, a dual phased array UT sensor, an EMI sensor (e.g., magnetic induction or the like), a temperature sensor, a pressure sensor, an optical sensor (e.g., infrared, visual spectrum, and/or ultra-violet), a visual sensor (e.g., a camera, pixel grid, or the like), or combinations of these.

A trajectory, as used herein, indicates a progression, sequence, and/or scheduled development of a related parameter over time, operating conditions, spatial positions, or the like. A trajectory may be a defined function (e.g., corresponding values of parameter A that are to be utilized for corresponding values of parameter B), an indicated direction (e.g., pursuing a target value, minimizing, maximizing, increasing, decreasing, etc.), and/or a state of an operating system (e.g., lifted, on or off, enabled or disabled, etc.). In certain embodiments, a trajectory indicates activation or actuation of a value over time, activation or actuation of a value over a prescribed group of operating conditions, activation or actuation of a value over a prescribed spatial region (e.g., a number of inspection surfaces, positions and/or regions of a specific inspection surface, and/or a number of facilities), and/or activation or actuation of a value over a number of events (e.g., scheduled by event type, event occurrence frequency, over a number of inspection operations, etc.). In certain embodiments, a trajectory indicates sensing a parameter, operating a sensor, displaying inspection data and/or visualization based on inspection data, over any of the related parameters (operating conditions, spatial regions, etc.) listed foregoing. The examples of a trajectory set forth with regard to the presently described embodiments are applicable to any embodiments of the present disclosure, and any other descriptions of a trajectory set forth elsewhere in the present disclosure are applicable to the presently described embodiments.

A response, as used herein, and without limitation to any other aspect of the present disclosure, includes an adjustment to at least one of: an inspection configuration for the inspection robot while on the surface (e.g., a change to sensor operations; couplant operations; robot traversal commands and/or pathing; payload configurations; and/or down force configuration for a payload, sled, sensor, etc.); a change to display operations of the inspection data; a change to inspection data processing operations, including determining raw sensor data, minimal processing operations, and/or processed data values (e.g., wall thickness, coating thickness, categorical descriptions, etc.); an inspection configuration for the inspection robot performed with the inspection robot removed from the inspection surface (e.g., changed wheel configurations, changed drive module configurations; adjusted and/or swapped payloads; changes to sensor configurations (e.g., switching out sensors and/or sensor positions); changes to hardware controllers (e.g., switching a hardware controller, changing firmware and/or calibrations for a hardware controller, etc.); and/or changing a tether coupled to the inspection robot. The described responses are non-limiting examples, and any other adjustments, changes, updates, or responses set forth throughout the present disclosure are contemplated herein for potential rapid response operations. Certain responses are described as performed while the inspection robot is on the inspection surface and other responses are described as performed with the inspection robot removed from the inspection surface, although any given response may be performed in the other condition, and the availability of a given response as on-surface or off-surface may further depend upon the features and configuration of a particular inspection robot, as set forth in the multiple embodiments described throughout the present disclosure. Certain responses are described as performed during inspection operations or in run-time, and certain responses are described as performed after inspection operations are completed, although any given response may be performed in the other condition. Additionally or alternatively, inspection operations may be understood to describe a single inspection operation at a location, with additional inspection operations (for example, after re-configuring the inspection robot, a sensor, a payload, a sensor calibration, etc.) being considered either a continuing inspection operation or a separate inspection operations. The description of a particular operation as a part of an inspection operation, as occurring after inspection operations, or the like, is provided to illustrate certain aspects of the present disclosure, and is not limiting to the present description. Additionally or alternatively, certain responses may be available only during certain operating conditions while the inspection robot is on the inspection surface, for example when the inspection robot is in a location physically accessible to an operator, and/or when the inspection robot can pause physical movement and/or inspection operations such as data collection. One of skill in the art, having the benefit of the present disclosure and information ordinarily available when contemplating a particular system and/or inspection robot, can readily determine response operations available for the particular system and/or inspection robot.

A response that is rapid, as used herein, and without limitation to any other aspect of the present disclosure, includes a response capable of being performed in a time relevant to the considered downstream utilization of the response. For example, a response that can be performed during the inspection operation, and/or before the completion of the inspection operation, may be considered a rapid response in certain embodiments, allowing for the completion of the inspection operation utilizing the benefit of the rapid response. Certain further example rapid response times include: a response that can be performed at the location of the inspection surface (e.g., without requiring the inspection robot be returned to a service or dispatching facility for reconfiguration); a response that can be performed during a period of time wherein a downstream customer (e.g., an owner or operator of a facility including the inspection surface; an operator of the inspection robot performing the inspection operations; and/or a user related to the operator of the inspection robot, such as a supporting operator, supervisor, data verifier, etc.) of the inspection data is reviewing the inspection data and/or a visualization corresponding to the inspection data; and/or a response that can be performed within a specified period of time (e.g., before a second inspection operation of a second inspection surface at a same facility including both the inspection surface and the second inspection surface; within a specified calendar period such as a day, three days, a week, etc.). An example rapid response includes a response that can be performed within a specified time related to interactions between an entity related to the operator of the inspection robot and an entity related to a downstream customer. For example, the specified time may be a time related to an invoicing period for the inspection operation, a warranty period for the inspection operation, a review period for the inspection operation, and or a correction period for the inspection operation. Any one or more of the specified times related to interactions between the entities may be defined by contractual terms related to the inspection operation, industry standard practices related to the inspection operation, an understanding developed between the entities related to the inspection operation, and/or the ongoing conduct of the entities for a number inspection operations related to the inspection operation, where the number of inspection operations may be inspection operations for related facilities, related inspection surfaces, and/or previous inspection operations for the inspection surface. One of skill in the art, having the benefit of the disclosure herein and information ordinarily available when contemplating a particular system and/or inspection robot, can readily determine response operations and response time periods that are rapid responses for the purposes of the particular system.

Certain considerations for determining whether a response is a rapid response include, without limitation, one or more of: The purpose of the inspection operation, how the downstream customer will utilize the inspection data from the inspection operation, and/or time periods related to the utilization of the inspection data; entity interaction information such as time periods wherein inspection data can be updated, corrected, improved, and/or enhanced and still meet contractual obligations, customer expectations, and/or industry standard obligations related to the inspection data; source information related to the response, such as whether the response addresses an additional request for the inspection operation after the initial inspection operation was performed, whether the response addresses initial requirements for the inspection operation that were available before the inspection operation was commenced, whether the response addresses unexpected aspects of the inspection surface and/or facility that were found during the inspection operations, whether the response addresses an issue that is attributable to the downstream customer and/or facility owner or operator, such as: inspection surface has a different configuration than was indicated at the time the inspection operation was requested; the facility owner or operator has provided inspection conditions that are different than planned conditions, such as couplant availability, couplant composition, couplant temperature, distance from an available base station location to the inspection surface, coating composition or thickness related to the inspection surface, vertical extent of the inspection surface, geometry of the inspection surface such as pipe diameters and/or tank geometry, availability of network infrastructure at the facility, availability of position determination support infrastructure at the facility, operating conditions of the inspection surface (e.g., temperature, obstacles, etc.); additional inspected conditions are requested than were indicated at the time of the inspection operation was requested; and/or additional inspection robot capabilities such as marking, repair, and/or cleaning are requested than were indicated at the time the inspection operation was requested.

The example utilizes x-y coverage resolution to illustrate the inspection surface as a two-dimensional surface having a generally horizontal (or perpendicular to the travel direction of the inspection robot) and vertical (or parallel to the travel direction of the inspection robot) component of the two-dimensional surface. However, it is understood that the inspection surface may have a three-dimensional component, such as a region within a tank having a surface curvature with three dimensions, a region having a number of pipes or other features with a depth dimension, or the like. In certain embodiments, the x-y coverage resolution describes the surface of the inspection surface as traversed by the inspection robot, which may be two dimensional, conceptually two dimensional with aspects have a three dimensional component, and/or three dimensional. The description of horizontal and vertical as related to the direction of travel is a non-limiting example, and the inspection surface may have a first conceptualization of the surface (e.g., x-y in a direction unrelated to the traversal direction of the inspection robot), where the inspection robot traverses the inspection surface in a second conceptualization of the surface (e.g., x-y axes oriented in a different manner than the x-y directions of the first conceptualization), where the operations of the inspection robot such as movement paths and/or sensor inspection locations performed in the second conceptualization are transformed and tracked in the first conceptualization (e.g., by the inspection map configuration circuit, a controller on the inspection robot, a controller on a base station, etc.) to ensure that the desired inspection coverage from the view of the first conceptualization are achieved.

In certain embodiments, an inspection robot and/or payload arrangement may be configured to engage a flat inspection surface. Engagement to a flat inspection surface is a non-limiting example, and other arrangements may include utilizing sled bottom surfaces, overall sled engagement positions, or freedom of relative movement of sleds and/or arms to engage a curved surface, a concave surface, a convex surface, and/or combinations of these (e.g., a number of parallel pipes having undulations, varying pipe diameters, etc.). An inspection robot and/or payload arrangement as set forth herein may be configured to provide a number of inspection sensors distributed horizontally and operationally engaged with the inspection surface, where movement on the inspection surface by the inspection robot moves the inspection sensors along the inspection surface. An inspection robot and/or payload arrangement as set forth herein may utilize one or more payloads capable of rastering over a region (e.g., typically but not limited to a horizontal rastering operation) to provide coverage of some or all of the inspection surface that is inspected during operations. In certain embodiments, the arrangement is configurable to ensure the inspection sensors remain operationally engaged with a flat inspection surface, with a concave inspection surface, and/or with a convex inspection surface. Additionally, the arrangement is configurable, for example utilizing pivotal and/or rotation arrangements of the arms and/or payloads, to maintain operational contact between the inspection sensors and an inspection surface having a variable curvature. For example, an inspection robot positioned within a large concave surface such as a pipe or a cylindrical tank, where the inspection robot moves through a vertical orientation (from the inspection robot perspective) is not either parallel to or perpendicular to a longitudinal axis of the pipe, will experience a varying concave curvature with respect to the horizontal orientation (from the inspection robot perspective), even where the pipe has a constant curvature (from the perspective of the pipe). In another example, an inspection robot traversing an inspection surface having variable curvature, such as a tank having an ellipsoid geometry, or a cylindrical tank having caps with a distinct curvature relative to the cylindrical body of the tank.

Numerous embodiments described throughout the present disclosure are well suited to successfully execute inspections of inspection surfaces having flat and/or varying curvature geometries. For example, payload arrangements described herein allow for freedom of movement of sensor sleds to maintain operational contact with the inspection surface over the entire inspection surface space. Additionally, control of the inspection robot movement with positional interaction, including tracking inspection surface positions that have been inspected, determining the position of the inspection robot using dead reckoning, encoders, and/or absolute position detection, allows for assurance that the entire inspection surface is inspected according to a plan, and that progression across the surface can be performed without excessive repetition of movement. Additionally, the ability of the inspection robot to determine which positions have been inspected, to utilize transformed conceptualizations of the inspection, and the ability of the inspection robot to reconfigure (e.g., payload arrangements, physical sensor arrangements, down force applied, and/or to raise payloads), enable and/or disable sensors and/or data collection, allows for assurance that the entire inspection surface is inspected without excessive data collection and/or utilization of couplant. Additionally, the ability of the inspection robot to traverse between distinct surface orientations, for example by lifting the payloads and/or utilizing a stability support device, allows the inspection robot to traverse distinct surfaces, such as surfaces within a tank interior, surfaces in a pipe bend, or the like. Additionally, embodiments set forth herein allow for an inspection robot to traverse a pipe or tank interior or exterior in a helical path, allowing for an inspection having a selected inspection resolution of the inspection surface within a single pass (e.g., where representative points are inspected, and/or wherein the helical path is selected such that the horizontal width of the sensors overlaps and/or is acceptably adjacent on subsequent spirals of the helical path).

It can be seen that various embodiments herein provide for an inspection robot capable to inspect a surface such as an interior of a pipe and/or an interior of a tank. Additionally, embodiments of an inspection robot herein are operable at elevated temperatures relative to acceptable temperatures for personnel, and operable in composition environments (e.g., presence of $CO_2$, low oxygen, etc.) that are not acceptable to personnel. Additionally, in certain embodiments, entrance of an inspection robot into certain spaces may be a trivial operation, where entrance of a person into the space may require exposure to risk, and/or require extensive preparation and verification (e.g., lock-out/tag-out procedures, confined space procedures, exposure to height procedures, etc.). Accordingly, embodiments throughout the present disclosure provide for improved cost, safety, capability, and/or completion time of inspections relative to previously known systems or procedures.

Presently available inspection devices for inspection surfaces related to welded and joined metal sections suffer from a number of drawbacks. Ultrasonic testing of weld areas and affected zones (e.g., areas heated by and/or affected by welding operations in the region of the weld) involve the traversal of the sensor head—for example a single UT sensor that is rastered back and forth to inspect a slice of the surface (e.g., a 200 mils, or ⅕ of an inch), then the sensor is advanced (e.g., about 200 mills again, if full surface inspection coverage is desired), and the operation is repeated until the desired surface coverage is inspected. Presently available devices and processes are therefore slow, expensive, and require significant manual management—for example inspecting and aligning the sensor along the weld area.

Systems, devices, and procedures as set forth herein provide for a number of improvements over previously known systems. Example systems allow for inspection of a significantly greater slice at a time—for example, three times to ten times the inspection area for each rastering slice, and additionally provide for improved inspection operations that are more likely to detect thin features (e.g., small cracks, and/or cracks that are significantly parallel with the rastering direction, which are difficult to detect with a single sensor scan). Additionally, systems herein provide for significantly improved coverage relative to the inspection area. Determination of damage, aging, or other failures relative to welds and heat affected areas are difficult, and sensitive to the context of detected features. For example, a bulk crack that is not associated with another feature such as corrosion, damage, hydrogen induced corrosion, and/or that is not in a stress direction may be less likely to propagate and/or cause further degradation or failure. Accordingly, the specific location of cracks, the features and corrosion mechanisms that are closely associated with cracks, and/or the orientation and/or progression over time of a crack are critical to understanding when repair or maintenance may be required, and/or when a failure is imminent. Systems herein provide for improved resolution in the inspection area, and improved diversity of sensor orientation(s) relative to the inspected areas. Further, systems herein provide for improved inspection speeds, and improved operations that provide for greater confidence that the proper area is being inspected, and that allow for greater automation of the inspection operations, providing for adjustment and confirmation of inspection operations without manual inputs, and allowing for inspection of surfaces that may be in dangerous areas (e.g., a high H2S environment), confined spaces, and/or other areas where manual operations are expensive, dangerous, or unavailable (e.g., within a pipe that a person cannot enter, and/or surfaces positioned in locations where a person cannot physically reach).

Previously known weld inspection operations are performed with a high degree of manual inputs, including positioning of sensors, movement of sensors along the weld, and manual verification of inspection positioning with regard to the weld. Additionally, tools for inspecting the weld and inspecting the heat affected area of the weld are separate devices, requiring two separate inspection operations to cover both the weld and the heat affected area.

Systems provided herein are capable to perform a weld inspection simultaneously with a heat affected zone inspection, and additionally are capable to ensure inspection of the proper area, traversal of obstacles, following a contour of a weld (including non-linear contours, intersecting weld areas, etc.) without manual input or interaction, and accordingly without requiring (or greatly reducing exposure) that personnel directly engage confined spaces or other environmental hazards.

Embodiments of the present disclosure may be utilized with various inspection robots and related systems. Embodiments may be included, in whole or part, with aspects of previously disclosed systems, aspects of embodiments herein may be embodied, at least in part, by aspects of previously disclosed systems, or the like. For example and without limitation including: inspection robots having, inter alia, a number of horizontally positioned sensors (e.g., reference U.S. application Ser. No. 18/341,991, "SYSTEM, METHOD, AND APPARATUS FOR ACOUSTIC INSPECTION OF A SURFACE", filed 27 Jun. 2023 (GROB-0003-U01-C08-C01)); inspection robots having features for rapid configuration of the inspection robot (e.g., reference U.S. application Ser. No. 18/306,408, "INSPECTION ROBOT", filed 25 Apr. 2023 (GROB-0007-U01-C01-SA)); inspection robots utilizing phased array sensors, with weld inspection payloads, utilizing beam steering operations for phased array sensors, processing phased array sensor data, and/or inspection robots with rastering sensors/payloads (e.g., reference U.S. application Ser. No. 17/752,955, "SYSTEMS FOR ASSESSMENT OF WELD ADJACENT HEAT AFFECTED ZONES", filed 25 May 2022 (GROB-0008-U01-C01)); inspection robots configured for high modularity and rapid configurability (e.g., reference U.S. application Ser. No. 17/731,797, "INSPECTION ROBOTS WITH FLEXIBLE WHEEL/MOTORING POSITION", filed 28

14

Apr. 2022 (GROB-0010-U01-C07)); a facility and visualization planning platform to support inspection operations and data from inspection robots (e.g., reference U.S. application Ser. No. 18/479,624, "SYSTEM, METHOD, AND APPARATUS TO INTEGRATE INSPECTION DATA AND BUSINESS ANALYSIS", filed 2 Oct. 2023 (GROB-0012-U01)); inspection robots with a shaped element phased array (e.g., reference PCT App. No. PCT/US2023/077835, "ROBOTIC SYSTEMS FOR ULTRASONIC SURFACE INSPECTION USING SHAPED ELEMENTS", filed 26 Oct. 2023 (GROB-0013-WO)); inspection robots with a high density sensor arrangement (e.g., reference PCT App. No. PCT/US2023/078409, "INSPECTION ROBOT WITH PROFILE ADAPTING SLED, COUPLANT REDUCTION FILM AND TRANSDUCER POD FOR THICK ASSETS", filed 1 Nov. 2023 (GROB-0015-WO)); and/or inspection robots with improved location identification (e.g., reference PCT App. No. PCT/US2023/075691, "SYSTEM, APPARATUS AND METHOD FOR IMPROVED LOCATION IDENTIFICATION", filed 2 Oct. 2023 (GROB-0017-WO)). Each one of the foregoing patent applications is incorporated herein by reference in the entirety for all purposes. The referenced inspection robots and related systems are non-limiting examples of systems that may benefit from embodiments of the present disclosure.

One challenge presented from a multi-phase array includes capturing and processing a large amount of data that is provided by UT sensors, as well as managing the sensors and inspection operations, for example providing couplant to the array to ensure that sensors are acoustically coupled to the surface, providing power and communications to the sensors and/or rastering actuator, and the like.

Certain descriptions herein reference sensor data or raw data. The terms sensor data or raw data should be understood broadly, but include at least one or more of: raw sensed feedback values from UT elements of a phased array; PLC and/or other hardware processed values from the raw sensed feedback values; and/or any other processed values, such as return times, thickness values, feature locations, grouped or lumped values from multiple elements, or the like, that at least in certain embodiments may be further utilized in post-processing, compensation, synthetic steering, and/or iterative improvement operations.

With reference to FIGS. 1-13, an example payload 11400 for an inspection robot to inspect an inspection surface is depicted. In example embodiments, the payload 11400 may include a first sensor 11460 including a first linear phased array of ultrasonic (UT) elements, and a second sensor 11465 including a second linear phased array of UT elements. In an example, the first linear phased array of UT elements of the first sensor 11460 may include only a single row of UT elements, and the number of UT elements in the first linear phased array may be 16, 32, 64, or 128, for example. Likewise, the second linear phased array of UT elements of the second sensor 11465 may include only a single row of UT elements, and the number of UT elements in the second linear phased array may be 16, 32, 64, or 128, for example. In some embodiments, the first linear phased array of UT elements and the second linear phased array of UT elements may have an equal number of UT elements.

In example embodiments, signals to and from the first linear phased array and second linear phased array may be transmitted via a single cable that is split into two parts 11461 and 11466 and soldered onto the respective first and second sensors 11460 and 11465. This cable may be impedance matched to the first linear phased array and second linear phased array. The first linear phased array and second linear phased array may be operated in phase with each other such that one array emits pulses and the other array receives the reflected pulses back from the material of the inspection surface. A system including the payload 11400 may be able to utilize all 128 elements of the first and second linear phased arrays, such as through a software configuration.

In example embodiments, the payload 11400 may include a sensor holder 11410, of which examples are illustrated in FIGS. 1-12, and which may also be referred to herein as a wedge element. Indeed, wedge element(s) as described herein with reference to example embodiments, which may include wedge element 14110 as illustrated by example in the drawings, may also refer to, and/or share some or all of the features of, sensor holder 11410, including but not limited to a unitary body and a structure for both first and second sensors.

As an example, a sensor holder 11410 configured with just one of the first and second sensors 11460 and 11465 may correspond to a wedge element 14110 as described herein. However, a sensor holder 11410 including both first and second sensors 11460 and 11465 may be helpful for inspecting thick assets (e.g., 3 or 4 inches or greater). A dual probe array, with sensors 11460, 11465 displaced a distance and at a selected angle to inspect a particular depth, may more readily inspect a selected depth than a single sensor, which may not readily inspect greater depths due to delay line echoes, multiple wedge returns, or the like. Further, a single sensor may be forced to inspect at a slower rate, for example to provide time to ensure proper processing to resolve features within the inspection surface and/or to differentiate echoes or wedge returns. In certain embodiments, embodiments with either a single sensor or a dual probe array may be configured to inspect an inspection surface of a selected depth, with appropriate configuration of the sensors (e.g., number of elements, interrogation angle, separation distance, processing operations, and time provided for signal receipt and analysis), whether a single phased array, dual phased array, or a number of phased arrays are provided on one or more of the wedge elements 14110. In some embodiments, one of the first or second sensors 11460 and 11465 may be removed and/or attached to the sensor holder 11410 via a fastening mechanism based on a thickness of the asset to be inspected.

In example embodiments, the sensor holder 11410 may have a unitary body. For example, the sensor holder 11410 may be made of a same, integral, and/or homogenous material.

In example embodiments, the material for the sensor holder 11410 may be selected based on acoustical characteristics (such as being capable of transferring the ultrasonic waves between the UT elements of the first and second sensors 11460 and 11465 and the inspection surface), a wear characteristic, and/or an industrial environment, as may be described elsewhere with reference to sensor holders and/or wedge elements described herein. For example, the material may be a plastic or another material, such as materials described with reference to a wedge element 14110 as described by example herein.

In example embodiments, the sensor holder 11410 may include a bottom side 13316 (see FIG. 12) structured to interface with the inspection surface. For example, the bottom side may be flat, although embodiments are not limited thereto, and in other embodiments, the bottom side may be curved, such as to correspond to a curvature of the inspection surface.

In example embodiments, the sensor holder 11410 may include a couplant connector 11420. The couplant connector

11420 may connect to a conduit through the sensor holder 11410 to provide a couplant to the bottom side of the sensor holder 11410 and provide an acoustic connection between the first and second sensors 11460 and 11465 and the inspection surface. The couplant connector 11420 may connect to a tether operative to provide the couplant, as may be described by example elsewhere herein.

In example embodiments, at least one or both of the first sensor 11460 and the second sensor 11465 may be mounted directly on the unitary body of the sensor holder 11410. In example embodiments, the first sensor 11460 and the second sensor 11465 are each mounted to the sensor holder 11410 such that the first linear phased array of UT elements is parallel to the second linear phased array of UT elements. For example, when viewed from a plan view of the payload 11400 (e.g., a top view directly overhead), the first linear phased array of UT elements may be parallel to the second linear phased array of UT elements. The two linear phased arrays may also be parallel to a direction of travel of the inspection robot, and/or perpendicular to a rastering direction.

Figure 11:
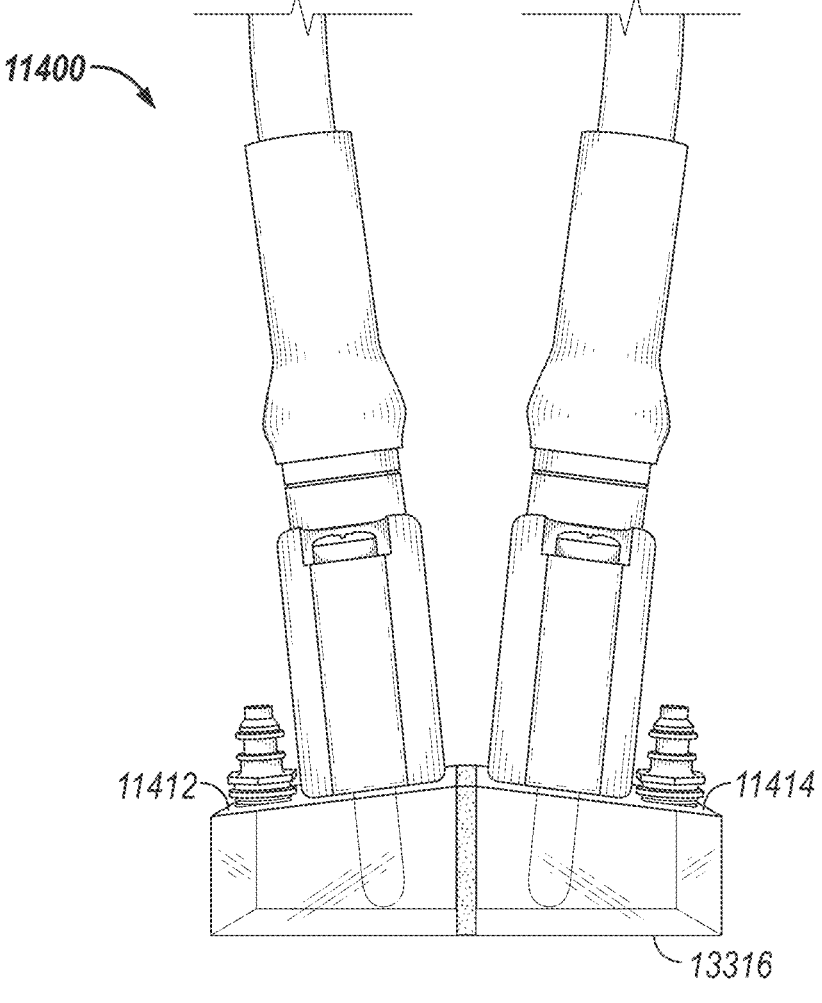
FIGS. 11-12 illustrate an example payload having a dual linear phased array.

In example embodiments, the first sensor 11460 and the second sensor 11465 may be each mounted to the sensor holder 11410 such that at least one of the first linear phased array of UT elements and the second linear phased array of UT elements is inclined relative to the bottom side 13316 of the sensor holder (see, e.g., FIG. 11). For example, the sensor holder 11410 may include a top side having a first surface 11412 and a second surface 11414 inclined relative to the first surface. The first sensor 11460 may be mounted to the first surface 11412 and the second sensor 11465 may be mounted to the second surface 11414.

In an example, the first sensor 11460 and the second sensor 11465 may each be mounted to the sensor holder 11410 with a fastening mechanism 11470 (e.g., screws or bolts). In an example, the second linear phased array of UT elements is inclined relative to the bottom side 13316 of the sensor holder. Furthermore, the sensor holder 11410 may include flanged portions 11418 projecting from each edge of the respective first and second surfaces 11412 and 11414 along the sides of the sensor holder 11410. The flanged portions 11418 may be immediately adjacent to the respective sensors 11460 and 11465 when the sensors are mounted on the sensor holder 11410 such that the flanged portions both assist in mounting the sensors 11460 and 11465 and support the sides of the sensors 11460 and 11465 to prevent torsion. For example, the flanged portions 11418 may prevent torsion on the fastening mechanism 11470, movement due to minor impacts, wear on connectors due to minor orientation displacement, or the like.

In example embodiments, the sensor holder 11410 may include a barrier 11430 interposed between the first surface 11412 and the second surface 11414 to reduce acoustic crosstalk between the first sensor 11460 and the second sensor 11465. In some embodiments, the barrier 11430 may extend from the bottom side of the sensor holder 11410 to the intersection of the first surface 11412 and the second surface 11414. In some embodiments, the barrier 11430 may include an adhesive to adhere together two respective sides of the sensor holder 11410 having the first surface 11412 and the second surface 11414. In certain embodiments, the barrier 11430 provides sufficient coverage of the acoustic communication area, and damping of acoustic communication, to provide time and/or an acoustic characteristic of potential cross-talk between the sensors 11460, 11465 to allow for completion of processing operations to determine the features of interest of and within the inspection surface.

Figure 2:
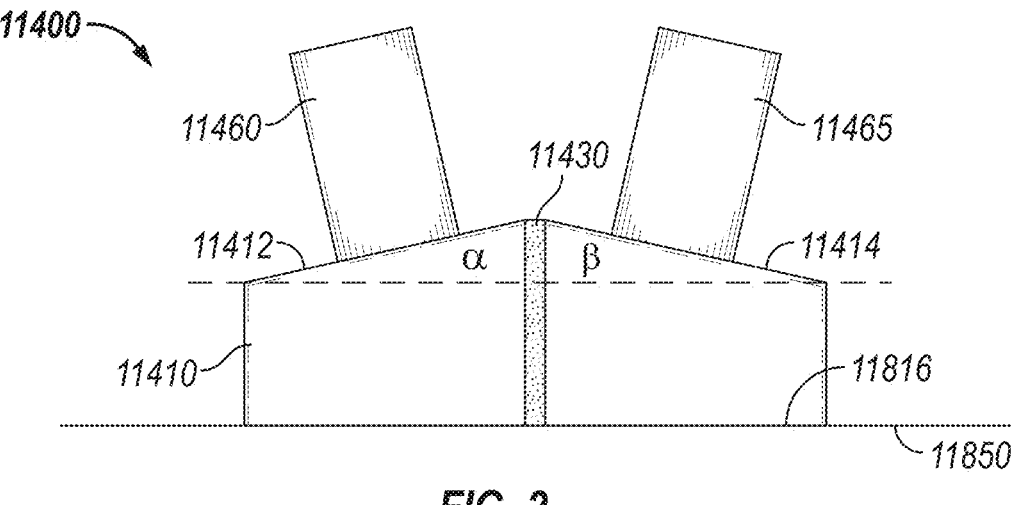
FIG. 2 is a side view of an example sensor holder.

With reference to FIG. 2, which depicts a side view of an example payload 11400, in example embodiments, the first surface 11412 may have an angle α (e.g., a "roof angle") of three to seven degrees, inclusive, relative to the bottom side 11816 such that the first linear phased array of UT elements is inclined relative to the bottom side 11816 at a first angle α of three to seven degrees, inclusive. Furthermore, the second surface 11414 may have an angle β (e.g., a "roof angle") of three to seven degrees, inclusive, relative to the bottom side 11816 such that the second linear phased array of UT elements is inclined relative to the bottom side 11816 at a second angle of three to seven degrees, inclusive. However, embodiments are not limited thereto, and in some embodiments, the angles α and β may each range from one to twelve degrees, inclusive. In some embodiments, the angles α and β may each range from one to seven degrees, inclusive. In an example, at least one or both the angles α and β may range from one to seven degrees, inclusive. In an example, the angles α and β may have the same magnitude but may, for example, be in opposite directions to form the "roof."

In some embodiments, it may be preferable for the first sensor 11460 and the second sensor 11465 to be physically close together on their respective first and second surfaces 11412 and 11414 to reduce error in depth readings. For example, the further away from each other the first and second sensors 11460 and 11465 are, the more error they may have in reading depth because the beams are further away, the beams will travel through more material that can obscure the intended inspection region, and/or processing operations to distinguish returns from features within the inspection surface may be more complex, reducing the available precision for feature detection and/or reducing the accuracy of inspection operations. Thus, a roof angle that enables physical closeness of the first and second sensors (e.g., between one to seven degrees, inclusive) and promotes convergence of the acoustic beams near the depth of inspection may be preferable.

As the bottom side 11816 may be structured to interface with the inspection surface 11850—for example, it may be in contact with or otherwise be parallel to the inspection surface 11850—the first surface 11412 may have the same angle α relative to the inspection surface 11850 as it does to the bottom side 11816, and the second surface 11414 may have the same angle β relative to the inspection surface 11850 as it does to the bottom side 11816.

In some embodiments, the first surface 11412 may have an angle α (e.g., a "roof angle") of 0 degrees (i.e., be parallel) relative to the bottom side 11816, and/or the second surface 11414 may have an angle β (e.g., a "roof angle") of 0 degrees, inclusive, relative to the bottom side 11816. However, embodiments in this regard are not limited thereto, and in some embodiments, the angle β may be one to twelve degrees, inclusive, or the angle α may be between one to twelve degrees, inclusive, while the other angle may be zero degrees. The roof angle may be utilized to orient each linear array at a selected angle for inspection. However, the linear arrays may be oriented at a selected angle distinct from the roof angle and/or entirely independently of the roof angle. Utilizing the roof angle, or the angle of the surfaces 11412, 11414, to provide the inspection angle of the linear arrays, may be convenient for manufacturing, design, and fabrication purposes, as the linear array can be coupled to the sensor holder 11410, allowing the roof angle to immediately determine the inspection angle. However, the coupling angle of the linear array to the sensor holder 11410 can be configured completely independently of the roof angle, for example through machining of additional mounting surfaces, angles for the delay line(s) for the linear array(s), or the like.

In some embodiments, the angle α may be equal to the angle β, and the angles α and β formed by the first surface 11412 and the second surface 11414 may be opposite to each other. Thus, the first surface 11412 may be inclined relative to the second surface 11414 at an angle of six to fourteen degrees, inclusive (although embodiments are not limited thereto, and in some embodiments, the angle may be between two to twenty-four degrees, inclusive). Like described above, as the bottom side 11816 may be structured to interface with the inspection surface 11850—for example, it may be flush or otherwise parallel to the inspection surface 11850—the first surface 11412 may have the same angle α relative to the inspection surface 11850 as it does to the bottom side 11816, and the second surface 11414 may have the same angle β relative to the inspection surface 11850 as it does to the bottom side 11816.

In example embodiments, during inspection of the inspection surface 11850, one of the first and second linear phased arrays may emit a beam through sensor holder 11410 toward the inspection surface 11850 at an angle α or β (which, as described above, may be 0 degrees or 3 to 7 degrees or 1 to 12 degrees), and the other of the first and second linear phased arrays may receive a beam reflection in response, such a beam reflection corresponding to characteristics of a portion of the inspection surface 11850, as may be described elsewhere herein. In an example, the UT elements may be pulsed using phasing algorithms and/or beam steering operations.

Figure 3:
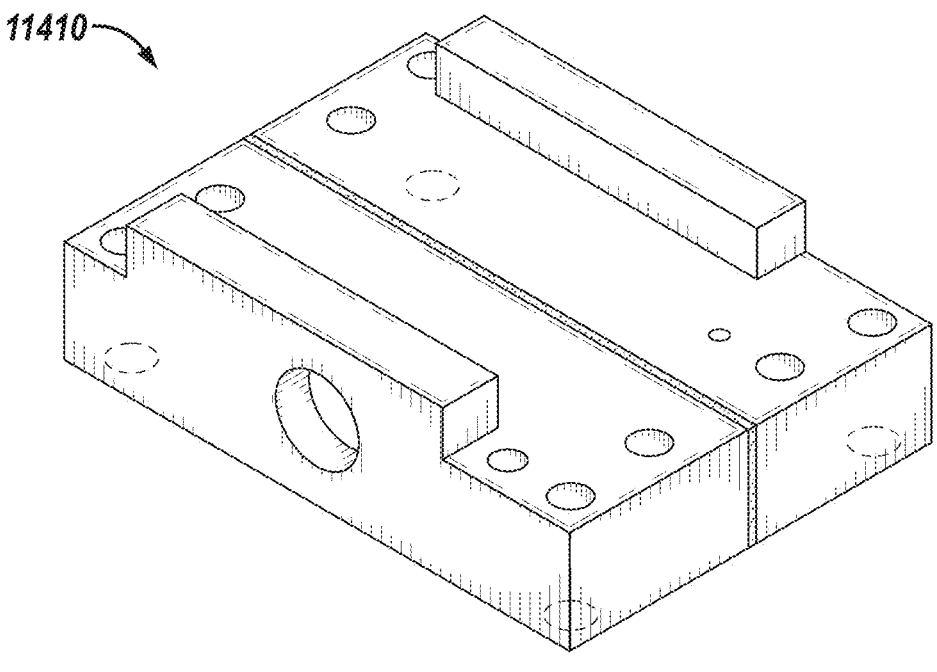
FIGS. 3-10 are perspective, side, and top views of an example sensor holder.
Figure 4:
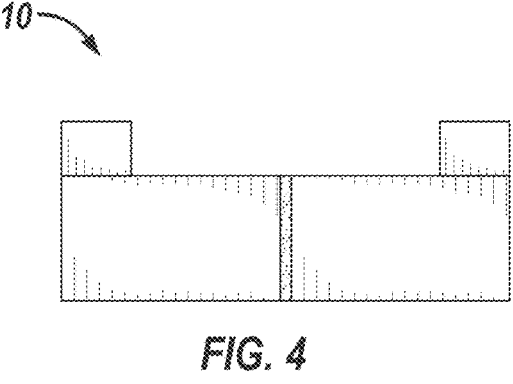
Figure 5:
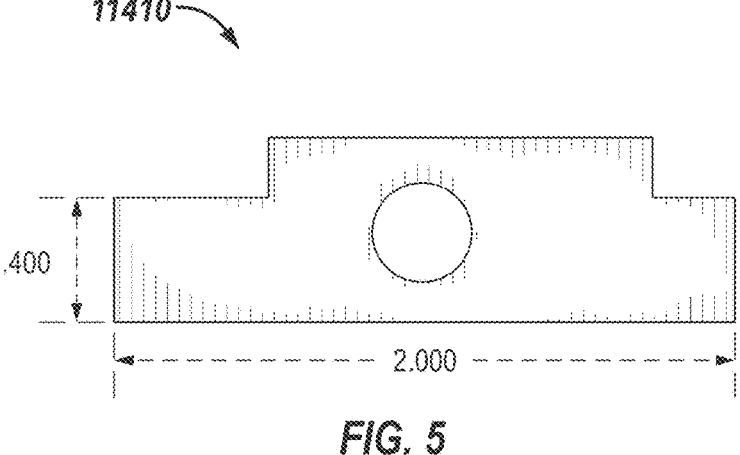
Figure 6:
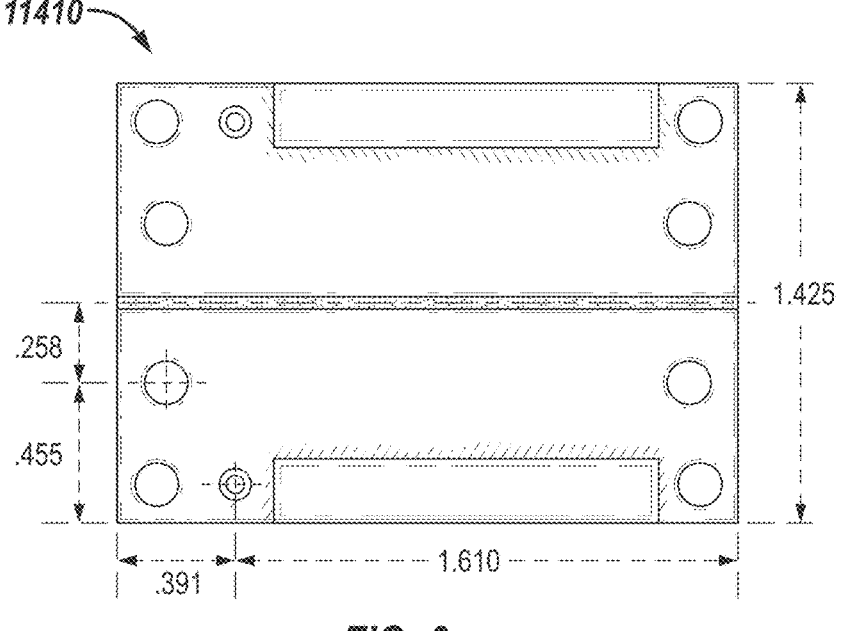
Figure 7:
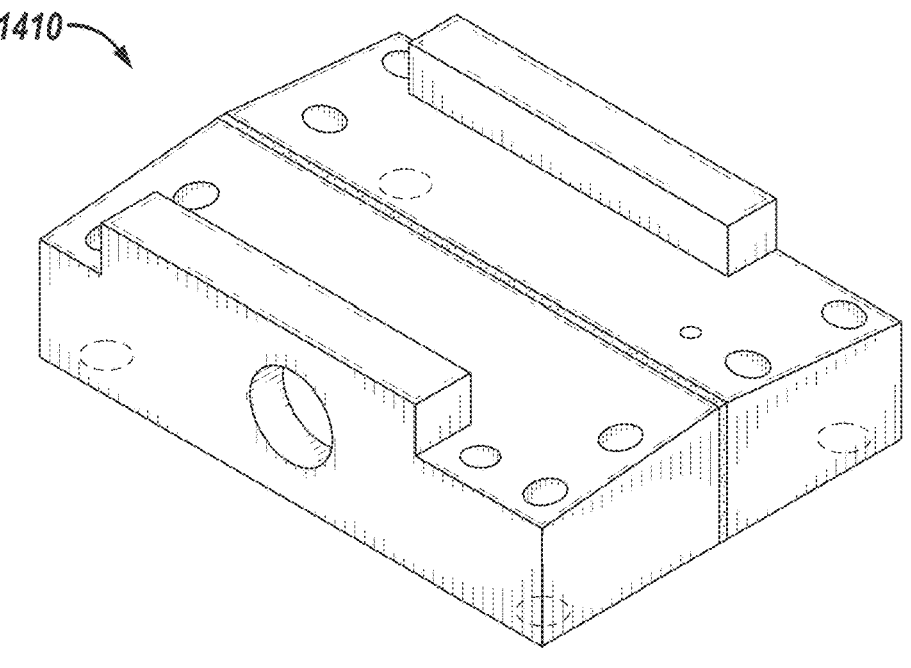
Figure 8:
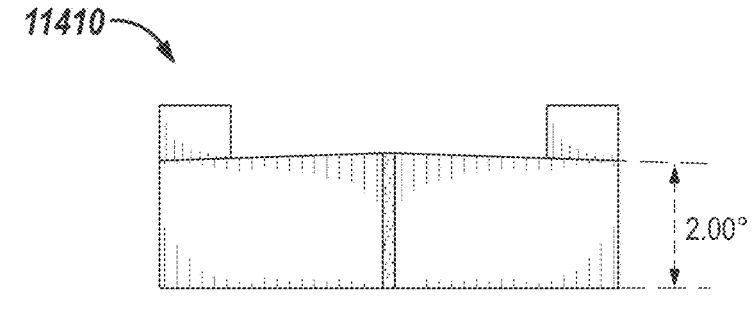
Figure 9:
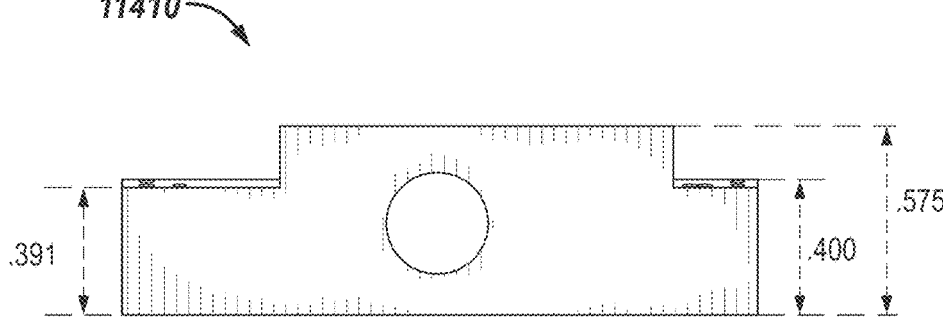
Figure 10:
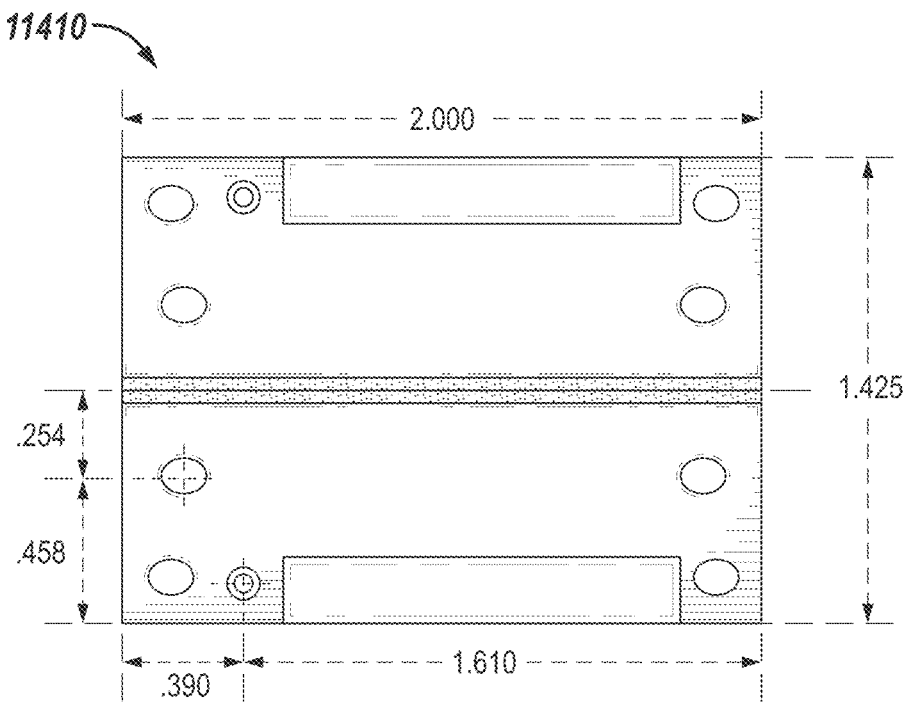
Figure 12:
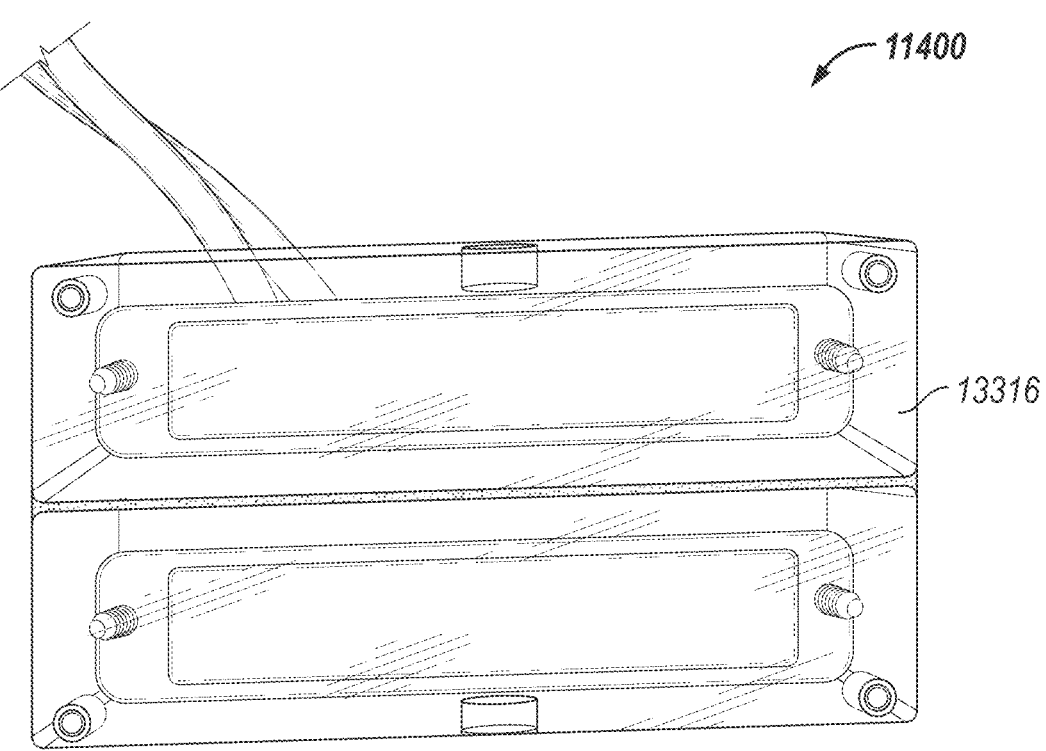
Figure 13:
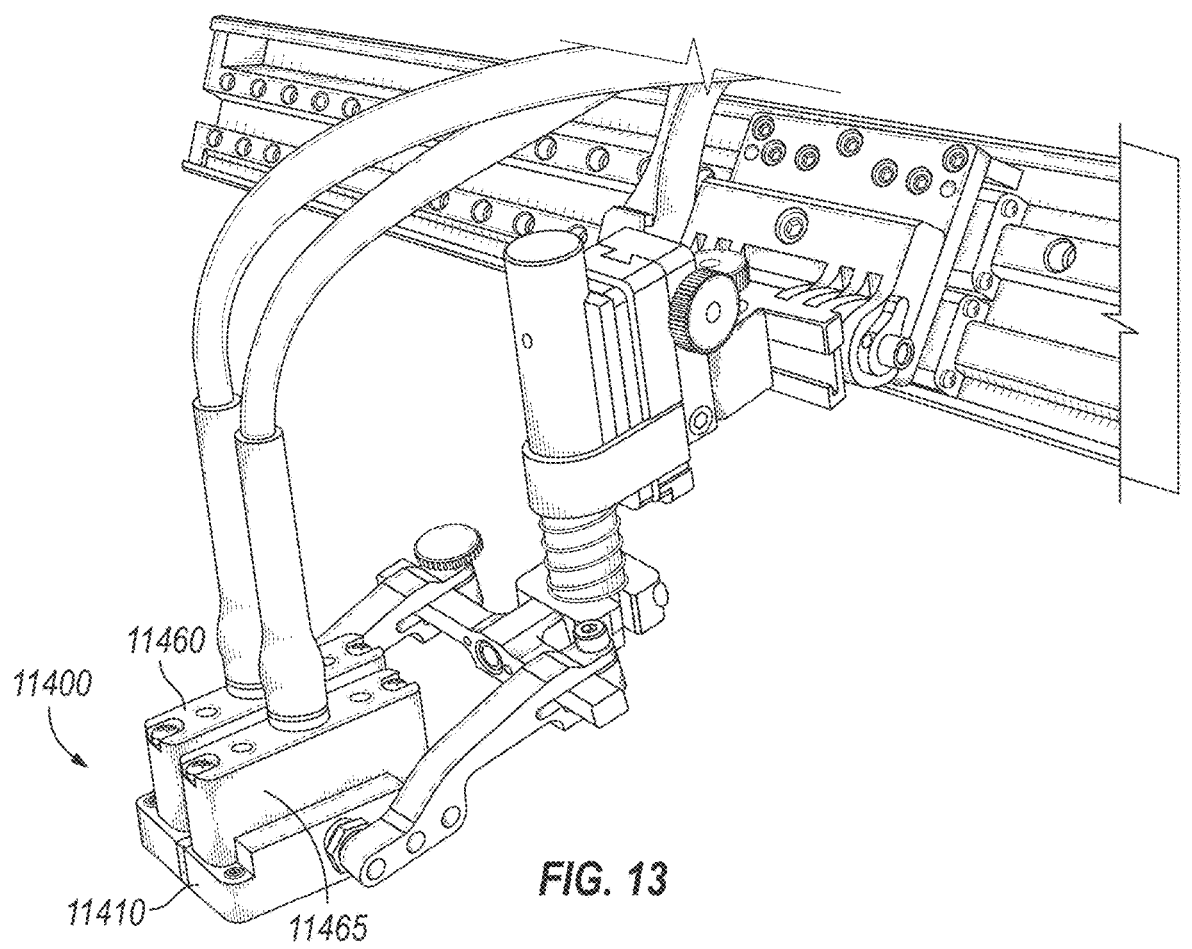
FIG. 13 illustrates a payload and probe holder attached to a mounting rail according to an example embodiment.

FIGS. 3 to 10 illustrate example embodiments of the sensor holder 11410 with varying angles of α and β, and FIGS. 11 and 12 illustrate various perspective views of an example sensor holder 11410. For example, FIGS. 3 to 6 illustrate an example embodiment of a sensor holder 11410 where angles α and β are both zero degrees. Particularly, FIG. 3 illustrates a perspective view of the sensor holder 11410, FIG. 4 illustrates a side view of the sensor holder 11410 (including a same angle of 0 degrees for both α and β), FIG. 5 illustrates another side view of the sensor holder 11410, and FIG. 6 illustrates a top (e.g., plan) view of sensor holder 11410. Likewise, FIGS. 7 to 10 illustrate an example embodiment of a sensor holder 11410 where angles α and β are both 2 degrees. The angles α and β may be selected to have a greater angle for a thinner material. Any dimensions depicted throughout the present disclosure, such as in FIG. 6-10 or 16, are non-limiting examples provided for illustration. In an example, the dimensions depicted in FIGS. 5-6, 8-10, and 16 may be in inches.

In example embodiments, the payload 11400 may be attached to a rastering device of an inspection robot of any type, for example as depicted in U.S. application Ser. No. 17/752,955, to measure characteristics of a portion of an inspection surface. For example, with reference to FIG. 13, which illustrates the payload 11400 attached to a probe holder that translates along a rail of an inspection robot, the rastering device (e.g., moving the probe holder) may be structured to move the payload in a direction of inspection, and the direction of inspection may be distinct from a direction of travel of the inspection robot. For example, the direction of inspection may be orthogonal to the direction of travel of the inspection robot such that the UT elements of the linear phased arrays of the first and second sensors 11460 and 11465 are arranged in a direction parallel to each other, parallel to the direction of travel, and orthogonal to the direction of inspection provided by the rastering device. The rastering may occur at any angle, for example at an angle relative to the movement of the inspection robot (e.g., where the inspection is performed with a series of parallel rastering operations that are each perpendicular to the movement direction of the inspection robot, or that are at an oblique angle relative to the movement direction of the inspection robot).

As described above, one of the first and second linear phased arrays may emit a beam through sensor holder 11410 toward the inspection surface 11850 at an angle α or β (which, as described above, may be 0 degrees or 3 to 7 degrees or 1 to 7 degrees or 1 to 12 degrees, inclusive), and the other of the first and second linear phased arrays may receive a beam reflection in response, such a beam reflection corresponding to characteristics of a portion of the inspection surface 11850, as may be described elsewhere herein. The material thickness of the inspection surface 11850 may be measured by calculating the time it takes for the sound wave to reflect back. Example embodiments may be capable of measuring inspection surfaces with a thickness between and including 0.2 inches to 8 inches. As described above, the angles α and β may be selected to have a greater angle for a thinner material. Owing to a detected change in the thickness of the material, example embodiments may determine corrosion on the back side of the material forming the inspection surface. Example embodiments may provide for ultrasonic testing of weld areas and affected zones (e.g., areas heated by and/or affected by welding operations in the region of the weld).

Figure 14:
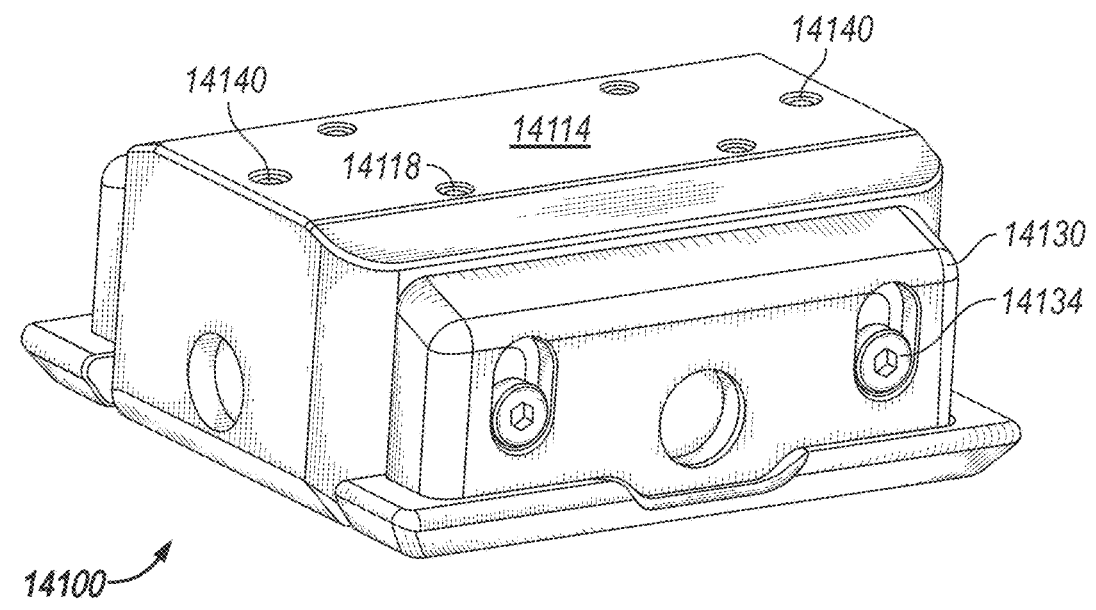
FIG. 14 illustrates a perspective view of a wedge element with side plates according to an example embodiment.
Figure 15:
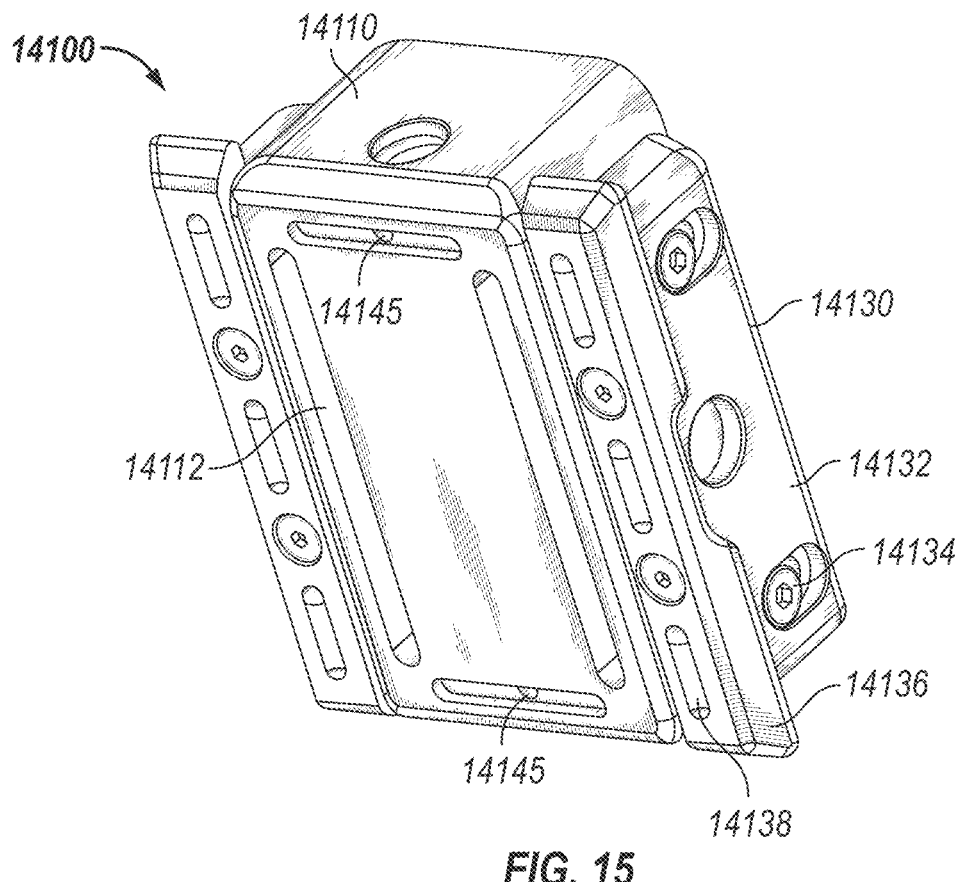
FIG. 15 illustrates a perspective view of a wedge element with side plates according to an example embodiment.

FIGS. 14-15 illustrate a payload 14100 for an inspection robot to inspect an inspection surface according to example embodiments. In some examples, the payload 14100 may be for a phased array probe. In some examples, the payload 14100 may be a portion of a payload for the inspection robot, such as but not limited to inspection robots as described by example herein.

In example embodiments, with reference to FIGS. 33-37, the payload 14100 may include an inspection element 15830 including a first linear phased array of ultrasonic (UT) elements. However, embodiments are not limited thereto. For example, the inspection element 15830 may include a phased array of UT elements in configurations other than linear, and/or may include multiple phased arrays of UT elements.

In example embodiments, the payload 14100 may include a wedge element 14110. A wedge element such as wedge element 14110 may also be referred to herein as a sensor holder or a wedge. With reference to FIGS. 14-15, the wedge element 14110 may include a first side 14114 (e.g., a top side) structured to interface with the inspection element 15830 and a second side 14116 (e.g., a bottom side) structured to interface with the inspection surface 15890.

Figure 33:
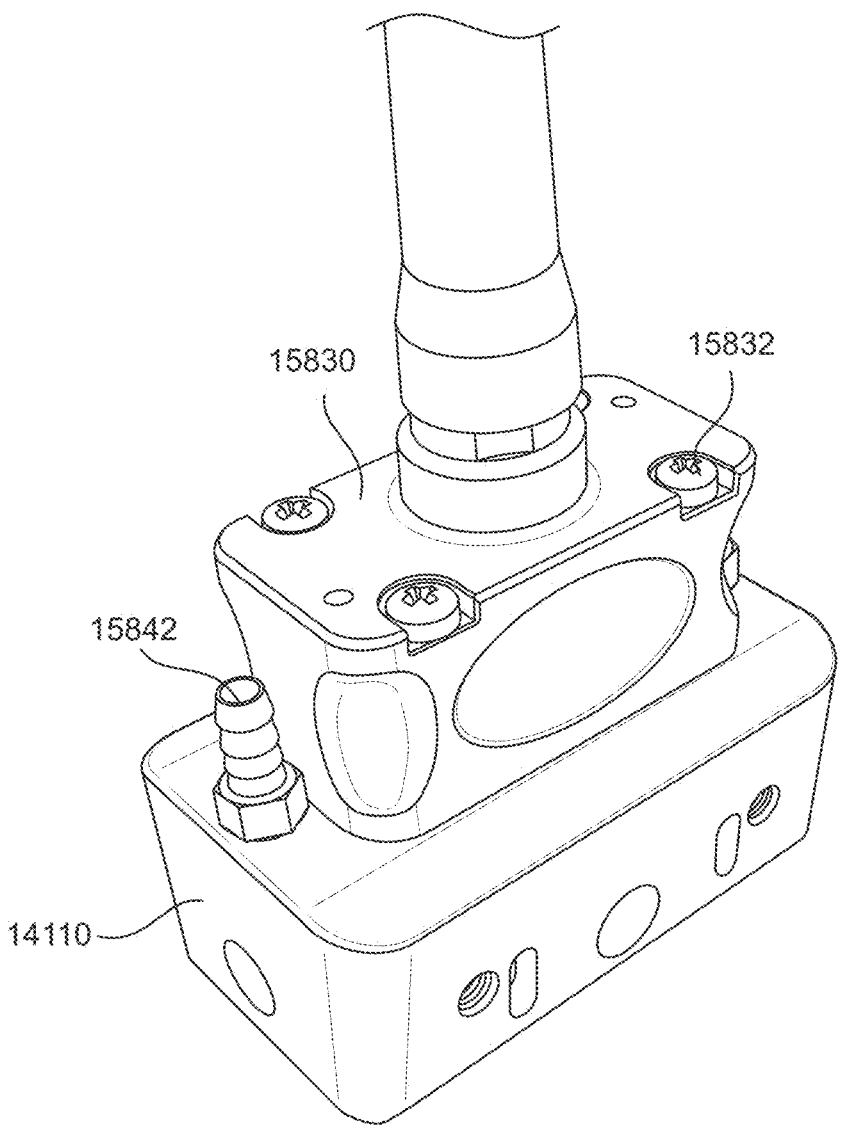
FIG. 33 illustrates a perspective view of a wedge element and an inspection element according to an example embodiment.
Figure 34:
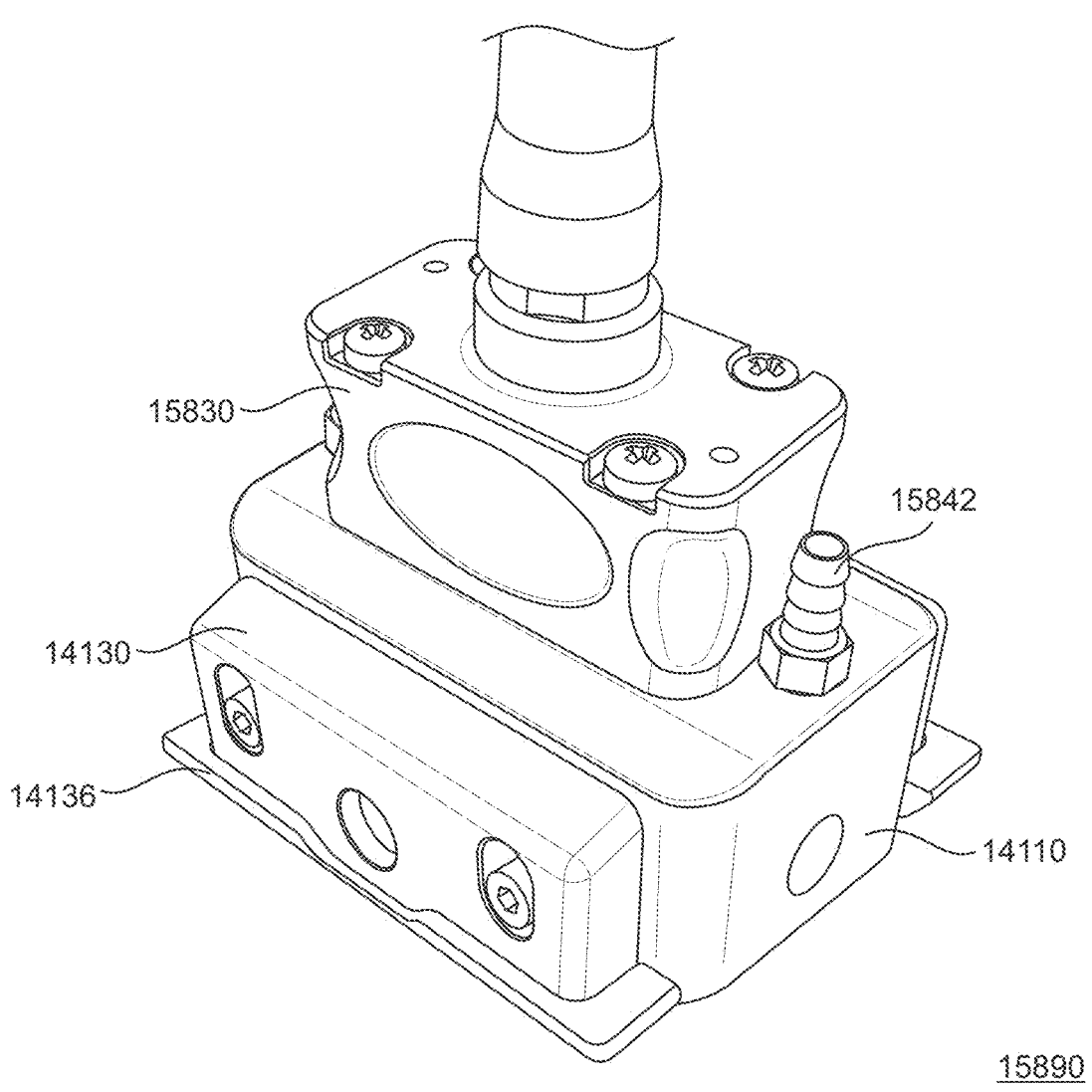
FIG. 34 illustrates a perspective view of a payload according to an example embodiment.

In some examples, with reference to FIG. 33, the inspection element 15830 may be attached to the wedge element 14110 via at least one fastening mechanism 15832 such as screws or bolts. For example, with reference to FIG. 14, the wedge element 14110 may include at least one mechanical structure 14118 (e.g., such as a threaded hole) for connecting with the fastening mechanism 15832.

Figure 32:
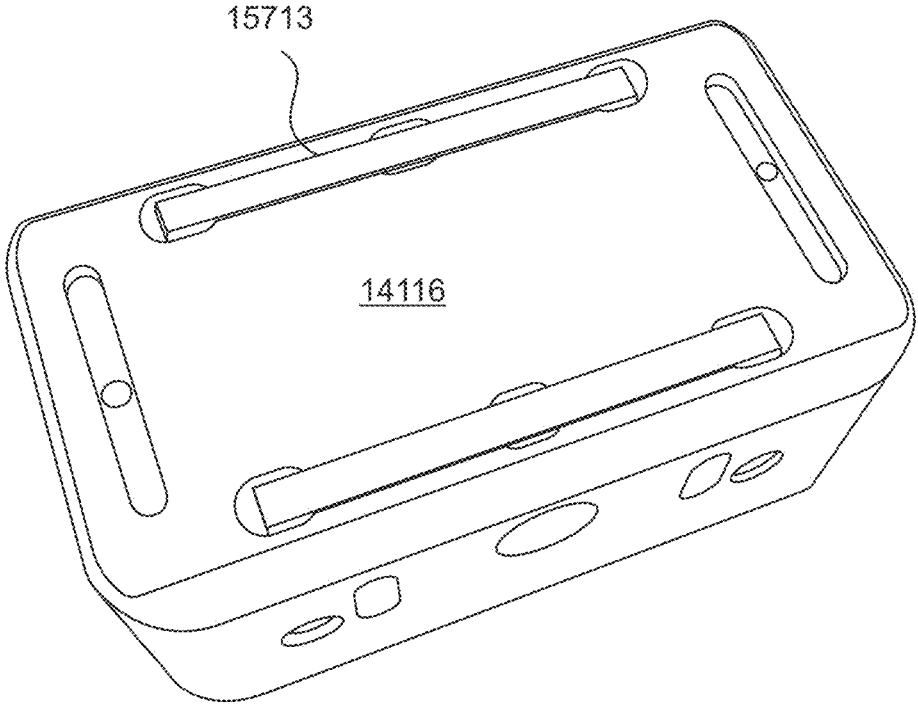
FIG. 32 illustrates a perspective view of a wedge element according to an example embodiment.

During inspection operations, the inspection surface may cause wear on a bottom (e.g., the second side 14116) of the wedge element 14110. Thus, in example embodiments, with reference to FIG. 15, the wedge element 14110 may include a plurality of grooves 14112 structured to accommodate a plurality of wear inserts 15713 therein (see FIG. 32) to control wear on the wedge element 14110. The plurality of wear inserts 15713 may each be positioned in a corresponding one of the grooves 14112. For example, as shown in FIGS. 15 and 32, the wedge element 14110 may include two grooves 14112 with a respective wear insert 15713 positioned in each groove. In some examples, the wear inserts 15713 may be glued, pressure fit, set with a screw, or otherwise fixed in the respective grooves 14112. In some examples, the grooves 14112 and the wear inserts 15713 therein may be elongated in, e.g., a rastering direction.

In example embodiments, a material of the plurality of wear inserts 15713 may include at least one of a plastic (e.g., a hardened plastic), carbide, stainless steel, hardened steel, ceramic, tungsten, or another material(s). The material(s) of the wear inserts 15713 may be selected based on a use case such as an industrial environment of the inspection surface. For example, a material of the wear inserts may be chosen to be harder than a material of the wedge element 14110, and/or may be chosen based on a desired durability, spark resistance (e.g., a material less likely to make sparks against the inspection surface), decreased likelihood of marring the inspection surface, or other considerations. For example, for inspection surfaces involving oil or gas, the wear inserts may be hardened plastic or ceramic to reduce the likelihood of sparks. And in situations where marring of the inspection surface is to be avoided, hardened plastic (which may be sacrificial and replaceable) may be chosen. In some examples, all of the plurality of wear inserts may be made of a same material (e.g., for simplified construction and maintenance), but embodiments are not limited thereto. In certain embodiments, the wear inserts may be relatively impervious to wear, have sufficient wear capability to complete an inspection operation without sufficient wear to affect the inspection outcome (e.g., due to a change in the distance or orientation of a sensor relative to the inspection surface), and/or may be prepared as a sacrificial material to prevent wear on the wedge 14110 or other aspect of the system.

In some embodiments, a bottom of the wear inserts 15713 may be flush with a bottom of the wedge element 14110. For example, the wear inserts 15713 may be flush with the bottom of the wedge element 14110 prior to an inspection operation, but wear on the bottom of the wedge element 14110 during inspection (for example, from inspecting a cylindrical inspection surface) may cause the inserts to eventually protrude slightly relative to the bottom of the wedge element 14110 and control further wear on the wedge element 14110, and/or the wear insert 15713 otherwise prevents significant wear on the bottom of the wedge element 14110. By including the inserts 15713 in the wedge element 14110, wear of the wedge element 14110 itself from inspection operations may be controlled and/or reduced. In some embodiments, the grooves 14112 and wear inserts 15713 may be distributed symmetrically about a center of the second side 14116 of the wedge element 14110. Thus, in an example where the wedge element 14110 is used to inspect a cylindrical inspection surface, a radial direction of the wear on the second side 14116 may coincide with a UT incident angle to the inspection surface of the inspection element 15830.

While the example embodiments illustrated in FIGS. 14-15 and FIGS. 33-37 may be structured for a single phased array probe (e.g., through sizing and/or positioning of structure(s) for fastening mechanisms), embodiments are not limited thereto. For example, the payload 14100 may be structured for a dual phased array probe as discussed by example herein with reference to a sensor holder (e.g., with reference to FIGS. 1-13), as well as for other numbers of phased arrays and other types of probes. In certain embodiments, a wedge element 14110 may be provided for multiple phased array sensors, such as for multiple phased array sensors positioned to inspect the surface at various angles, and/or can support a phased array sensor capable to beam steer the inspection angle to a selected angle that is distinct from a physical geometric angle (e.g., a normal angle relative to the elements of the array). In certain embodiments, a payload may include a number of wedges, for example horizontally arranged allowing for inspection of a greater area of the inspection surface with a single movement of the inspection robot and/or rastering device, and/or the inspection robot may include a number of payloads, each having one or more wedges and corresponding phased array sensors.

With reference to FIGS. 14-15, in example embodiments, the payload 14100 may include the wedge element 14110, which may be made of plastic or another material. In example embodiments, selection of the material of the wedge element 14110 may be based on an expected temperature of the wedge element 14110 during an inspection operation. For example, a high temperature plastic material may be selected based on an expected temperature of the wedge element 14110 during inspection to peak between 250 and 500 degrees F., inclusive. In one example, the high temperature plastic may be Rexolite®.

In example embodiments, the second side 14116 (e.g., a bottom surface) of the wedge element 14110 may be flat. However, embodiments are not limited thereto, and in some example embodiments, the second side 14116 may have a selected curve based on a use case. For example, to assist with contact between the wedge element 14110 and the inspection surface, and/or to reduce consumption of couplant during inspection operations, the second side 14116 may have a radius of curvature selected in response to the radius of the inspection surface (e.g., a pipe).

In example embodiments, the wedge element 14110 may have a fixed shape. In some embodiments, the wedge element 14110 may provide a fixed angle between one or more probes (e.g., one or more phased array probes) on the first side 14114 of the wedge element 14110 and the inspection surface on the second side 14116 of the wedge element 14110. In one example, the angle may be 0 degrees such that the inspection element(s) 15830 is/are normal to the inspection surface.

In example embodiments, with reference to FIGS. 14 and 15, the wedge element 14110 may include one or more couplant intakes 14140 and one or more couplant outputs 14145. In an example, the second side 14116 of the wedge element 14110 may include a plurality of couplant outputs 14145 including channels for distributing the couplant fluid between the wedge element 14110 and the inspection surface. In some embodiments, couplant outputs 14145 may be included on opposite ends of the second side 14116 to provide adequate distribution of the couplant fluid.

With reference to FIG. 33, in an example, the couplant intakes 14140 may include a plurality of couplant intakes 14140 connected to respective couplant connectors 15842. In an example, the couplant connectors 15842 may be connected to couplant tubes providing couplant fluid via an inspection robot or other source.

In example embodiments, within the wedge element 14110 (which as described above, may be or include a unitary body), conduits may run between the couplant intakes 14140 and the couplant outputs 14145 (which in an example may have a 1:1 relationship) to provide couplant fluid receive by the couplant connectors 15842 to the couplant outputs 14145.

Figure 16:
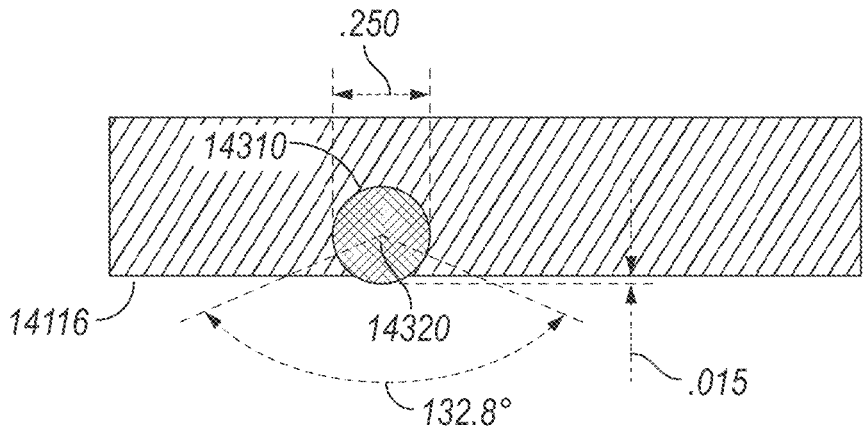
FIG. 16 illustrates a side view of a portion of a wedge element with rotational elements according to an example embodiment.

In example embodiments, with reference to FIG. 16, the second side 14116 of the wedge element 14110 may include at least one (e.g., a plurality of) openings 14310 structured to contain a respective at least one (e.g., a plurality of) rotational elements 14320 that roll therein. The rotational elements 14320 may be exposed to the inspection surface. Indeed, in some embodiments, as shown in FIG. 16, the plurality of openings 14310 may be structured for the respective plurality of rotational elements 14320 to protrude from the second side 14116 of the wedge element 14110.

In some embodiments, a material of the rotational elements 14320 may be selected based on friction attributes. For example, because the rotational elements 14320 may rotate in the respective plurality of openings 14310, it may be desirable for the rotational elements 14320 to have a low coefficient of friction. In some examples, the rotational elements 14320 may be made of hardened plastic, stainless steel, tungsten, or carbide. In certain embodiments, the rotational elements 14320 may be constructed of a material and with a rotational friction selected to slide on the inspection surface, with rotation utilized to provide an option to traverse rough surfaces or obstacles.

In some embodiments, some or all of the rotational elements 14320 may be spherical elements. Thus, the rotational elements 14320 may roll in the plurality of openings 14310 to allow movement of the wedge element 14110 in any direction on the inspection surface. In certain embodiments, a rotational element 14320 may be elliptical or otherwise oriented, for example to rotate in a preferred direction.

In some embodiments, some or all of the rotational elements 14320 may have a cylindrical shape, and the plurality of openings 14310 may be structured such that the plurality of rotational elements 14320 permit the wedge element 14110 to roll only in a rastering direction during an inspection operation.

In some embodiments, the plurality of rotational elements 14320 may include a plurality of ellipsoid elements, which may roll in the plurality of openings 14310 to cause the wedge element to roll along a predictable track.

In example embodiments, the second side 14116 of a wedge element 14110 may include both grooves 14112 with corresponding wear inserts 15713, and openings 14310 with corresponding rotational elements 14320. However, embodiments are not limited thereto, and some embodiments may include only grooves 14112 with corresponding wear inserts 15713 or only openings 14310 with corresponding rotational elements 14320. In some embodiments, openings 14310 with the corresponding rotational elements 14320 may take the place of the grooves 14112 with corresponding wear inserts 15713 (e.g., in terms of location on the second side 14116), or vice versa.

In example embodiments, with reference to FIGS. 14 and 15, a wedge element 14110 may include one or more adjustable side plates 14130 including a top portion 14132 and a bottom portion 14136. For example, as illustrated in FIGS. 14 and 15, the payload 14100 may include first and second adjustable side plates 14130, one on each of two opposing sides of the wedge element 14110. In example embodiments, each of the first and second adjustable side plates 14130 may have an adjustable position in a vertical direction (e.g., normal to or otherwise angled) relative to the inspection surface.

In an example, the bottom portion 14136 may be structured to interface with the inspection surface. In one example, the bottom portion 14136 may be made of a metal such as stainless steel. However, embodiments are not limited thereto, and like the wedge element 14110 and the wear inserts 15713, a material of the bottom portion 14136 may be selected based on a desired use case (e.g., avoidance of sparks, avoidance of marring the inspection surface, etc.). In some embodiments, a material of the bottom portion 14136 may be harder than a material of the wedge element 14110.

Figure 35:
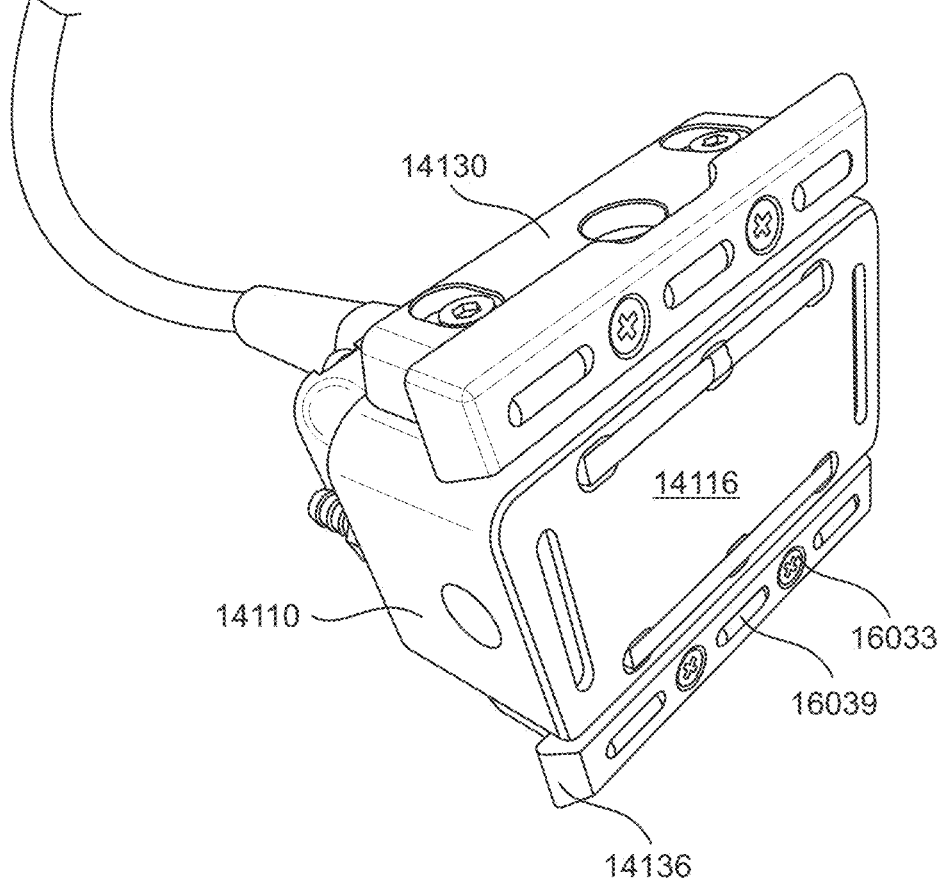
FIG. 35 illustrates a perspective view of a payload according to an example embodiment.
Figure 36:
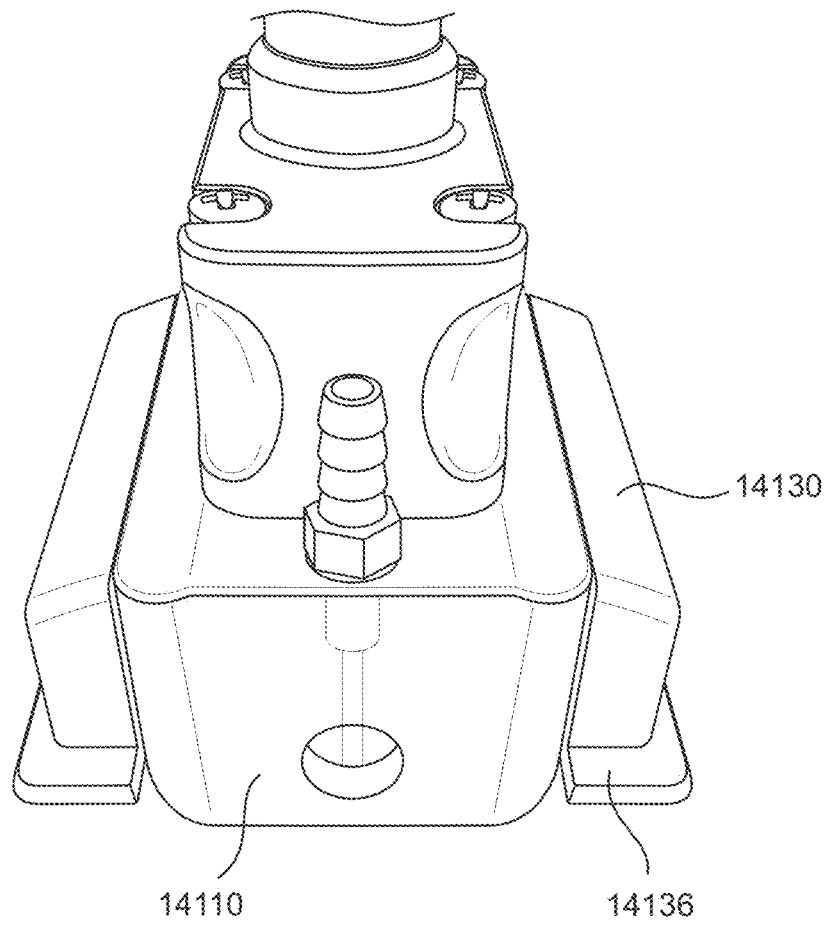
FIG. 36 illustrates a perspective view of a payload according to an example embodiment.
Figure 37:
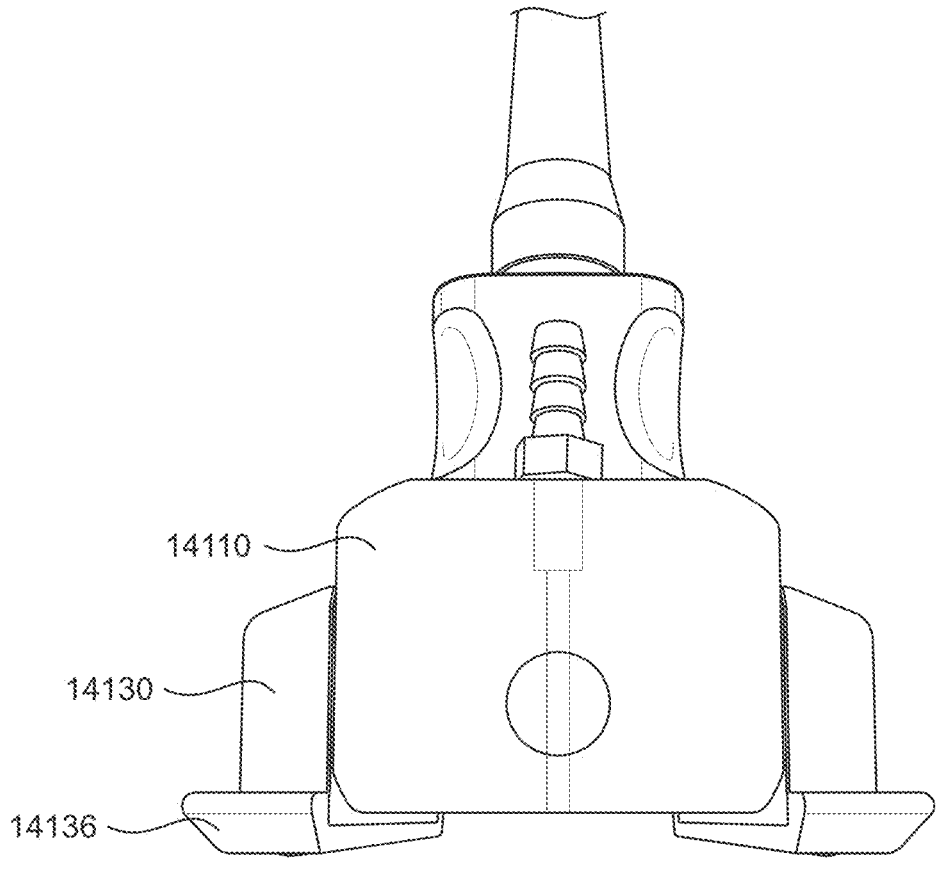
FIG. 37 illustrates a perspective view of a payload according to an example embodiment.

With reference to FIGS. 15 and 35, the bottom portion 14136 of each adjustable side plate 14130 may also include at least one groove 14138 (e.g., a channel) for a respective at least one wear insert 16039, which may be glued or otherwise fixed in the grooves 14138. Like the wear inserts 15713 for the grooves 14112, a material of the wear inserts 16039 for the grooves 14138 may be selected based on the use case, as discussed with reference to the wear inserts 15713 herein, and may include the same possible materials as noted for the wear inserts 15713. In some examples, the material of the wear insert 16039 may be harder than a material of the bottom portion 14136, and furthermore, the material of the bottom portion 14136 may be stainless steel. In some examples, the material of the wear insert(s) 16039 may be the same as the material of the wear insert(s) 15713.

In some embodiments, the bottom portion 14136 may be attached to the top portion 14132 through a fastening mechanism 16033 such as screws or bolts. The fastening mechanism 16033 may be inset from a bottom surface of the bottom portion 14136 so as not to be flush with the bottom surface of the bottom portion 14136 (and/or so as not to be flush with the at least one wear insert 16039), and thereby may avoid wearing against the inspection surface during an inspection operation.

As described above, in example embodiments, the adjustable side plates 14130 may be adjustable vertically (e.g., in a vertical direction) relative to the wedge element 14110 and the inspection surface—e.g., to adjust a distance from the inspection surface, which may be through a fastening mechanism 14134 such as screws or bolts. In some examples, each of the first and second adjustable side plates 14130 may include this fastening mechanism 14134 to adjust their adjustable position relative to the inspection surface.

In an example, the payload 14100 may be placed on an inspection surface and/or a representative surface (e.g., a calibration block, similar surface, etc.), and the adjustable side plates 14130 may be adjusted for desired contact with the inspection surface. In addition to providing wear resistance (e.g., via the wear inserts 16039), the adjustable side plates 14130 may provide stability to the payload 14100's placement on the inspection surface. For example, as discussed herein, each of the adjustable side plates 14130 may be structured to contact the inspection surface (e.g., through the wear insert(s) 16039) to provide stability to the wedge element 14110 and maintain an orientation of the sensor with the inspection surface.

For example, in a use case where the inspection surface is part of a cylindrical asset (e.g., a pipe), an adjustable position of each of the adjustable side plates 14130 (e.g., a first and second adjustable side plate) may be adjusted such that the bottom portion 14136 of each of the first and second adjustable side plates 14130 extends vertically from the second side 14116 of the wedge element 14110 to contact the inspection surface. This positioning of the first and second adjustable side plates 14130 is shown by example in FIG. 37. Thus, in an example, a center of the wedge element 14110 (and/or, for example, the inspection element 15830) may be made adjacent to a radial component of the inspection surface, and the first and second adjustable side plates 14130 provide stability to the wedge element 14110 for an inspection operation.

In another example, in a use case where the inspection surface is flat or nearly so (at least in consideration of the relative size of the inspection robot and/or payload 14100 compared to any radius of curvature of the inspection surface), the payload 14100 may be structured to inspect the inspection surface by adjusting the adjustable position of each of the first and second adjustable side plates 14130 such that a bottom portion 14136 of each of the first and second adjustable side plates 14130 is flush with the second side 14116 of the wedge element 14110. For example, the wedge element 14110 may be placed on the inspection surface and the two adjustable side plates 14130 may be adjusted downward to each make contact with the inspection surface. In some examples, the adjustable side plates 14130 may be adjusted such that their bottoms thereof may be even with each other relative to the bottom of the wedge element 14110. In this way, the probe may be kept perpendicular (normal) to the inspection surface.

In example embodiments, the adjustable side plates 14130, which may provide stability for payload 14100 including wedge element 14110, may allow for a much wider range (e.g., capability difference over a range of pipe diameters) of curvatures of an inspection surface. For example, a wedge element 14110 with a flat second side 14116 may nevertheless may used to inspect down to, e.g., a six inch nominal (6.65 inch) outer diameter (OD) pipe. In some examples, a wedge element 14110 may inspect inspection surfaces with even smaller outer diameters if the second side 14116 of the wedge element 14110 is curved (e.g., to correspond to a curve of the inspection surface). The utilization of adjustable side plates 14130 allows for a simple configuration adjustment to support a single wedge element 14110 capable to inspect a range of inspection surfaces.

In example embodiments, the adjustable side plates 14130 may help control and/or reduce wear on the wedge element 14110. Furthermore, in example embodiments, the adjustable side plates 14130 may help the wedge element 14110 achieve proper contact with the inspection surface. In an example involving a curved inspection surface, the adjustable side plates 14130 may be adjusted down relative to the bottom of the wedge element 14110 such that a center of the wedge element 14110 and/or inspection element 15830 is adjacent to a center of a radius of an inspection surface. Thus, by keeping the wedge element 14110 (and thus payload 14100) centered with the surface (e.g., a pipe), the wedge element 14110 and/or inspection element 15830 may be kept normal to the inspection surface, which may be important for inspecting the surface with the phased array(s) of the inspection element 15830. In certain embodiments, the adjustable side plates 14130 may be asymmetrical, for example where normal contact of the inspection element 15830 is not defined by the bottom flat surface (if present) of the wedge element 14110 (e.g., where the inspection element 15830 engages the wedge element 14110 at an angle).

In certain embodiments, the adjustable side plates 14130 may be coupled, for example with a connecting member (not shown), whereby both adjustable side plates 14130 are enforced to a same vertical position. For example, moving the adjustable side plate 14130 on a first side may move the adjustable side plate 14130 on the other side at the same time and to the same position. In certain embodiments, coupling the adjustable side plates 14130 reduces the complexity of changing the configuration of the wedge element 14110 for a particular surface, and/or reduces the risk of operator error, for example when setting the adjustable side plate 14130 where the wedge element 14110 is tilted, misaligned, or positioned on an irregular portion of the inspection surface and/or representative surface. In certain embodiments, allowing independent adjustment of the adjustable side plates 14130 allows for the operator to configure the wedge element 14110 properly for unusual surfaces, to account for manufacturing tolerances or differences on each side of the wedge element 14110, or the like. Accordingly, embodiments herein should be understood to include either coupled adjustable side plates 14130 or independent adjustable side plates 14130.

With reference to FIG. 39, a method 16400 of adjusting adjustable side plates 14130 of a payload 14100 according to an example embodiment may include loosening 16410 a fastening mechanism 14134 that fastens the first and second adjustable side plates 14130 to the wedge element 14110 of the payload 14100. Furthermore, the method 16400 may include placing 16420 the payload 14100 at a desired position for inspecting the inspection surface such that a bottom portion of the wedge element 14110 contacts the inspection surface. For example, in a use case where the payload 14100 is to inspect a pipe, the payload 14100 may be centered on a top of the pipe such that the wedge element 14110 contacts the pipe, and bottom portions 14136 of the adjustable side plates 14130 extend in a lengthwise direction parallel with the pipe. In some examples, the loosening 16410 may be performed after the placing 16420, while in other examples, the loosening 16410 may be performed before the placing 16420.

Additionally, the method 16400 may include adjusting 16430 vertical positions of the first and second adjustable side plates 14130 such that bottom portions 14136 of the first and second adjustable side plates 14130 make desired contact with the inspection surface. In some examples, such as where the payload 14100 is above the inspection surface, gravity may assist in placing the bottom portions 14136 in contact with the inspection surface. In an example involving convexly curved inspection surface such as a pipe, the bottom portions 14136 may extend vertically past (e.g., above) a bottom side of the wedge element, and both the bottom portions 14136 and the bottom side of the wedge element may contact the inspection surface. In some examples, the adjusting 16430 may be performed after the placing 16420 (e.g., where the adjusting 16430 is performed to a specified position, performed with a representative surface, made as an incremental adjustment after observing the inspection robot on the inspection surface, etc.), while in other examples, the adjusting 16430 may be performed after the placing 16420.

Furthermore, once the vertical positions of the first and second side plates are adjusted to a desired height, the method 16400 may include tightening 16440 the fastening mechanism 14134 such that the first and second adjustable side plates 14130 are fixed against the wedge element 14110. In some examples, the tightening 16440 may be performed after the placing 16420 (e.g., where the tightening 16440 is performed to a specified position, performed with a representative surface, made as an incremental adjustment after observing the inspection robot on the inspection surface, etc.), while in other examples, the tightening 16440 may be performed after the placing 16420.

In certain embodiments, the method 16400 or portions thereof may be performed to configure the payload, the wedge element 14110, and/or the inspection robot. The method 16400 may be performed before an inspection operation, and/or during an inspection operation or between inspection operations (e.g., as guided by an inspection control parameter 18212, to improve positioning of the wedge element 14110 with the surface, to adjust the wedge element 14110 due to a change in the inspection robot during inspection operations, and/or to adjust the wedge element 14110 due to a change in the inspection surface—for example transitioning from inspecting a first section of the inspection surface to a second section of the inspection surface).

In example embodiments, the first and second adjustable side plates 14130 may be locked together (e.g., embodying coupled adjustable side plates 14130) to simultaneously adjust the adjustable positions of each of the first and second adjustable side plates (e.g., according to method 16400) in the vertical direction. For example, the first and second adjustable side plates 14130 may be locked together such that they have a same vertical position relative to the inspection surface, or otherwise have a fixed vertical relationship to each other relative to the inspection surface (e.g., one of the first and second adjustable side plates 14130 may have a different vertical position than the other, but this difference may be fixed). In an example, the first and second adjustable side plates 14130 may be connected together (e.g., through a structural element) to thereby lock them together. Thus, according to the adjusting step 16430, the first and second adjustable side plates may be adjusted simultaneously. Indeed, the first and second adjustable side plates 14130 may move together by the same amount to be simultaneously adjustable to have a same depth relative to the bottom of wedge element 14110.

In some embodiments, it may be the bottom portions 14136 of each of the first and second adjustable side plates 14130 that are connected together (e.g., through a structural element) to thereby lock together the first and second adjustable side plates 14130.

In some embodiments, each of the first and second adjustable side plates 14130 may be spring-loaded to maintain the first and second adjustable side plates 14130 in contact with the inspection surface during an inspection operation. In such an example, the first and second adjustable side plates 14130 may be loosely fastened to the wedge element 14110 (e.g., such that fastening mechanism 14134 is not tight) to prevent friction between the wedge element 14110 and the side plates 14130. Thus, the first and second adjustable side plates 14130 may be auto-leveling to remain in contact with the inspection surface.

In some embodiments, the at least one wear insert 16039 may be spring-loaded in the at least one groove 14138 of the bottom portion 14136 of each of the first and second adjustable side plates 14130. Additionally and/or alternatively, the at least one wear insert 15713 may be spring-loaded in the at least one groove 14112 of the second side 14116 of the wedge element 14110.

In some embodiments the angles and/or depths, of chamfered portions of each of the adjustable side plates 14130 and/or wedge element 14110 may be selected based on a type of surface features expected to be encountered during operation. For example, the chambered portions may have greater angles and/or depths when an inspection surface is expected to be curved.

In some embodiments, like as described above for the second side 14116 of the wedge element 14110, and with reference to FIG. 16, the bottom portions 14136 of the first and second adjustable side plates 14130 may include at least one (e.g., a plurality of) openings 14310 structured to contain a respective at least one (e.g., a plurality of) rotational elements 14320 that roll therein. The rotational elements 14320 may be exposed to the inspection surface. Indeed, in some embodiments, the plurality of openings 14310 may be structured for the respective plurality of rotational elements 14320 to protrude from the second side 14116 of the wedge element 14110. Like with the rotational elements 14320 of the second side 14116, the rotational elements 14320 of the second portion 14136 of the adjustable side plates 14130 may take the place of and/or be in addition to wear inserts 16039 in grooves 14138.

In some embodiments, the sensor holder 11410 described with reference to FIG. 1 may include adjustable side plates like those described above.

In example embodiments, the payload 14100 may include a wear structure configured to provide a wear indicator for the second side of the wedge element 14110. For example, in some embodiments, the wear indicator may include at least one of an irrigation channel depth, a displayed color, a displayed texture, or a difference in spring force. In certain embodiments, the wear indicator may include an extension amount of an adjustable side wall 14136, for example with a visible or audible indicator that appears or occurs when the adjustable side wall 14136 is extended beyond a specified distance to achieve the desired arrangement of the wedge element 14110. The wear indicator may function as a "go/no-go" gauge to determine whether the wear is within specification or out of specification. In some embodiments, such a gauge may provide a wear indication without powering the inspection robot and/or looking at inspection data, significantly reducing the time to configure or reconfigure the inspection robot, increasing the likelihood that collection of inspection data will be successful, and that the configuration of the inspection robot will be sufficiently robust to complete the inspection operations. This wear indicator may also thereby indicate whether the wedge element 14110 (or a portion thereof) should be replaced and/or whether an inspection should be performed. Such a wear structure may be particularly useful in use cases that do not use carbide for the wear inserts 15713, since such use cases may be prone to more wear on the wedge element 14110 and/or the wear inserts 15713. The wear structure may indicate that the wedge element 14110 (or a portion thereof) should be replaced, that an adjustable side wall 14136 should be replaced or extended, and/or that a wear insert 15713 should be replaced, and/or may otherwise indicate that the inspection should not take place before resolution of causal issues for the wear indicator. In certain embodiments, the wear indicator may additionally or alternatively be associated with a wear insert 15713.

In an example where the wear indicator includes the displayed color in a material of the wedge element 14110, the displayed color may be different than a color of a remainder of the wedge element 14110. For example, the remainder of the wedge element 14110 may be transparent and/or translucent, and/or may be colorless (e.g., clear without a hue), while the wear indicator with the displayed color may be, e.g., opaque and/or have a hue (e.g., blue). Thus, as the wear indicator wears away during inspection operations, the displayed color may fade or be worn away entirely. In some examples, this may indicate that the wedge element 14110 (or a portion thereof) should be replaced. In certain embodiments, the wear indicator may be embodied as a color that appears as the wedge element 14110 experiences wear.

In some examples, the wear indicator may include the displayed color in a film on the second side of the wedge element 14110. The film may be integral to the wedge element 14110 (e.g., continuous with the wedge element 14110 and formed of a same, homogenous material except for the coloration), or the film may be a different layer from the wedge element 14110. In an example, the wear indicator may be a film that is under a millimeter in thickness (e.g., a half millimeter).

In some embodiments, the wear indicator may include the displayed texture. The displayed texture may include a pattern in a material of the wedge element 14110—for example, on the second side 14116 of the wedge element 14110, or on a film that is a different layer from the wedge element 14110. As the pattern of the displayed texture wears away during inspection operations, the pattern may fade or be worn away entirely. In some examples, this may indicate that the wedge element 14110 (or a portion thereof) should be replaced.

In some embodiments, the wear indicator may include the irrigation channel depth. In some examples, an irrigation channel may refer to the channels of couplant output(s) 14145. As the irrigation channel wears away during inspection operations, this may provide an indication that the wedge element 14110 (or a portion thereof) should be replaced.

In some embodiments, the wear indicator may include a difference in spring force and/or a spring extension amount. For example, there may be expected a certain amount or range of force from spring loading, and/or an expected extension or other geometrical arrangement of the spring, on the payload 14100 including the wedge element 14110 (e.g., via a constant force probe holder such as may be described herein, and/or a spring associated with an adjustable side wall 14136). A detection in a difference from this spring force and/or spring extension amount may indicate that the wedge element 14110 (and/or wear insert 15713, adjustable side wall 14136, etc.) is worn and should be replaced, and/or otherwise flag a potential issue with wear on any relevant element.

The example wear structures (e.g., color, force, grooves, distance, etc.) forming a wear indicator are non-limiting examples to illustrate aspects of embodiments herein. The example wear indicators may provide a continuous wear value (e.g., a distance, an exposed color area, a force value, a depth of a groove, etc.), and the wear response may be determined based on the continuous wear value. For example, a first value may be utilized to provide a communication such as a notation for service, a service request, etc., and a second value may be utilized to provide a direct response (e.g., proceeding or halting an inspection, changing an associated component, etc.). In certain embodiments, example wear indicators may provide a discrete wear value (e.g., the absence or presence of the indicator, a visually apparent threshold of an otherwise continuous wear value). For example, a color based wear indicator may be utilized to categorize the wear value as "nominal" or "worn", with appropriate responses based on the wear category. In certain embodiments, multiple categorical values for the wear indicator may be utilized, with a number of corresponding responses for the wear indicator.

Figure 40:
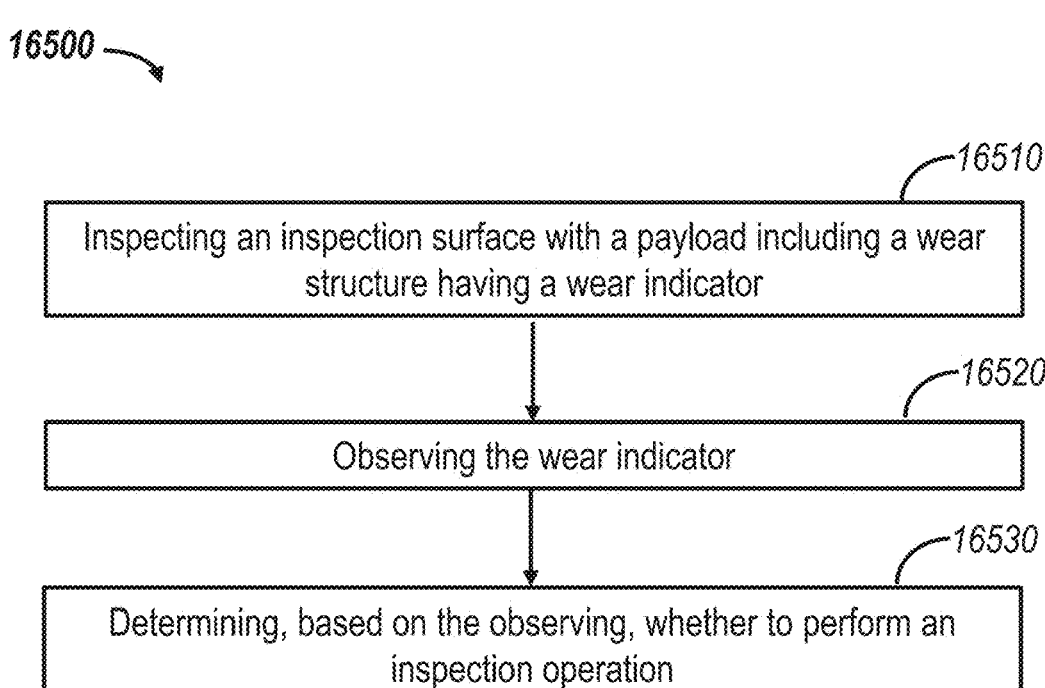
FIG. 40 depicts an example procedure to adjust an inspection operation based on a wear indicator.

With reference to FIG. 40, 16500, an example method 16500 of determining payload wear according to example embodiments may, as a preliminary matter, including having inspected 16510 an inspection surface with a payload including a wear structure having a wear indicator. In some examples, multiple inspection operations may have already been performed. Then, the method 16500 may include observing 16520 the wear indicator 16520. For example, in embodiments including a visual wear indicator such as those described above, the wear indicator 16520 may be visually observed by an operator. And, for example, in embodiments where the wear indicator includes a difference in spring force, such a difference may be detected to thereby observe 16520 the wear indicator. In certain embodiments, observing 16520 the wear indicator may be performed before inspecting 16510 an inspection surface.

The example method 16500 may further include determining 16530, based on the observing the wear indicator, whether to perform an inspection operation, although embodiments are not limited thereto. For example, additionally and/or alternatively, it may be determined, based on the wear indicator, that all or a portion of the payload should be replaced. For example, in an embodiment including a wedge element 14110 and adjustable side plates 14130, it may be determined that the wedge element 14110 needs to be replaced based on the wear indicator, while the adjustable side plates 14130 may continue to be used with a new wedge element.

Figure 17:
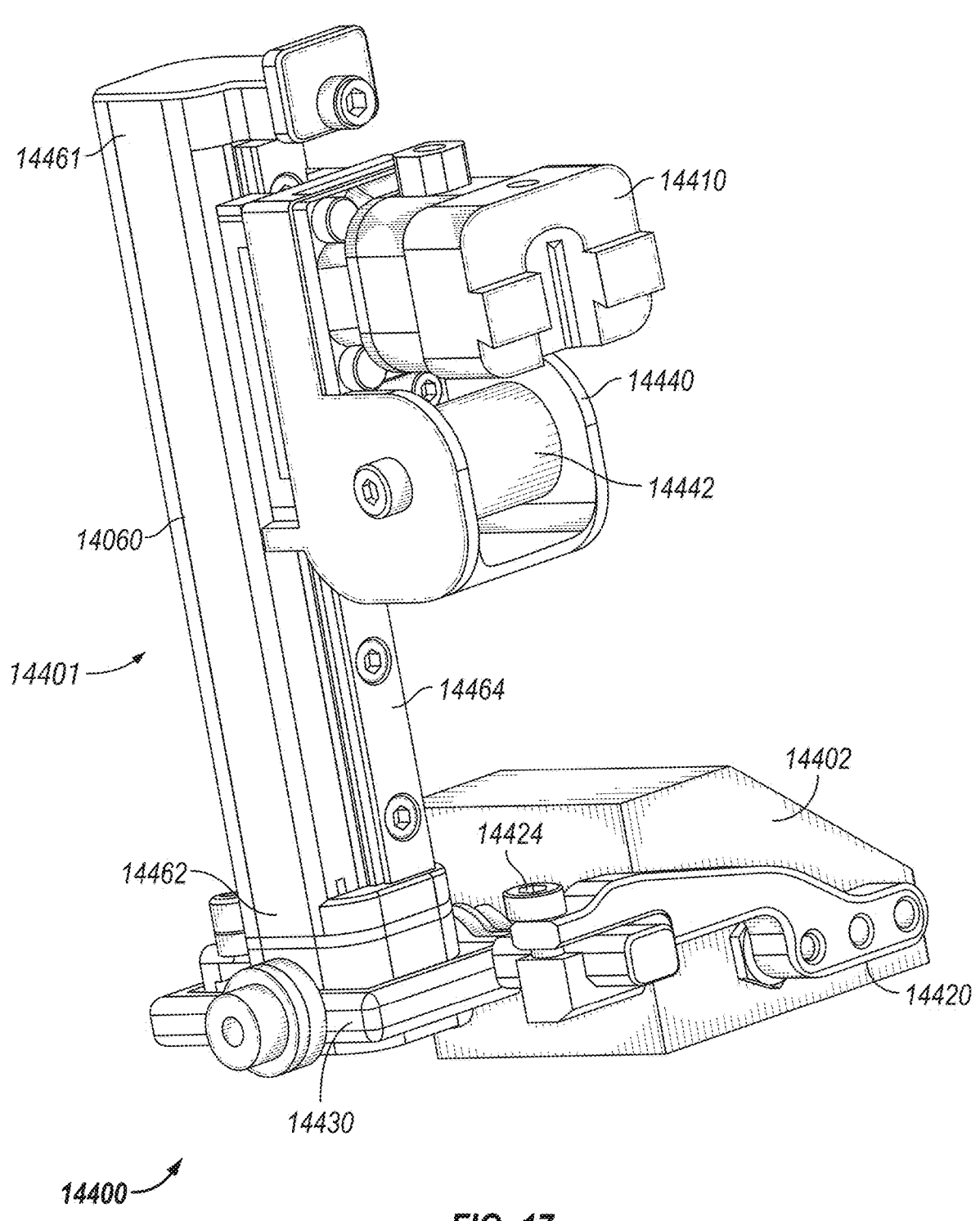
FIG. 17 illustrates a perspective view of a system including a probe holder and a payload according to an example embodiment.
Figure 18:
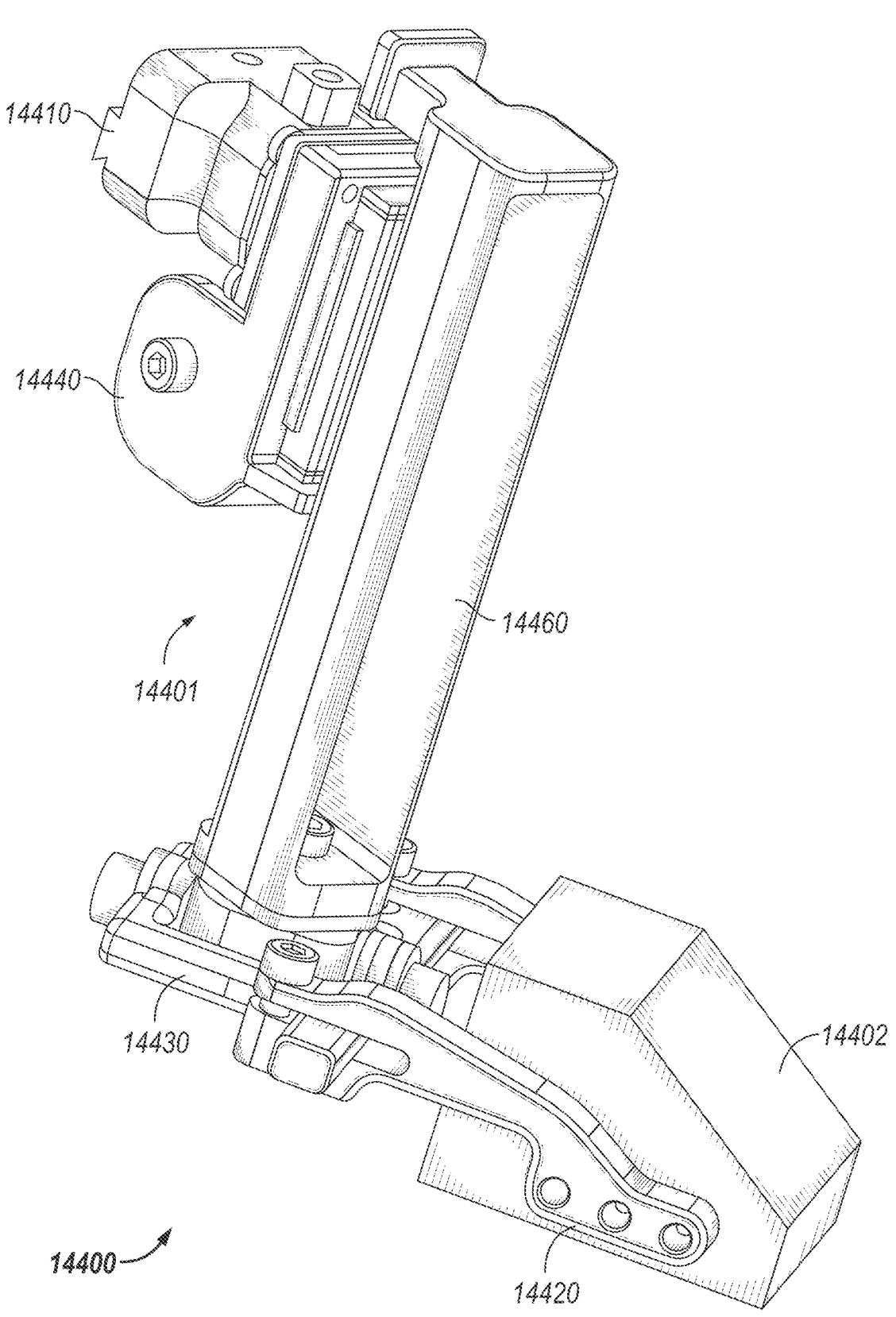
FIG. 18 illustrates a perspective view of a system including a probe holder and a payload according to an example embodiment.
Figure 19:
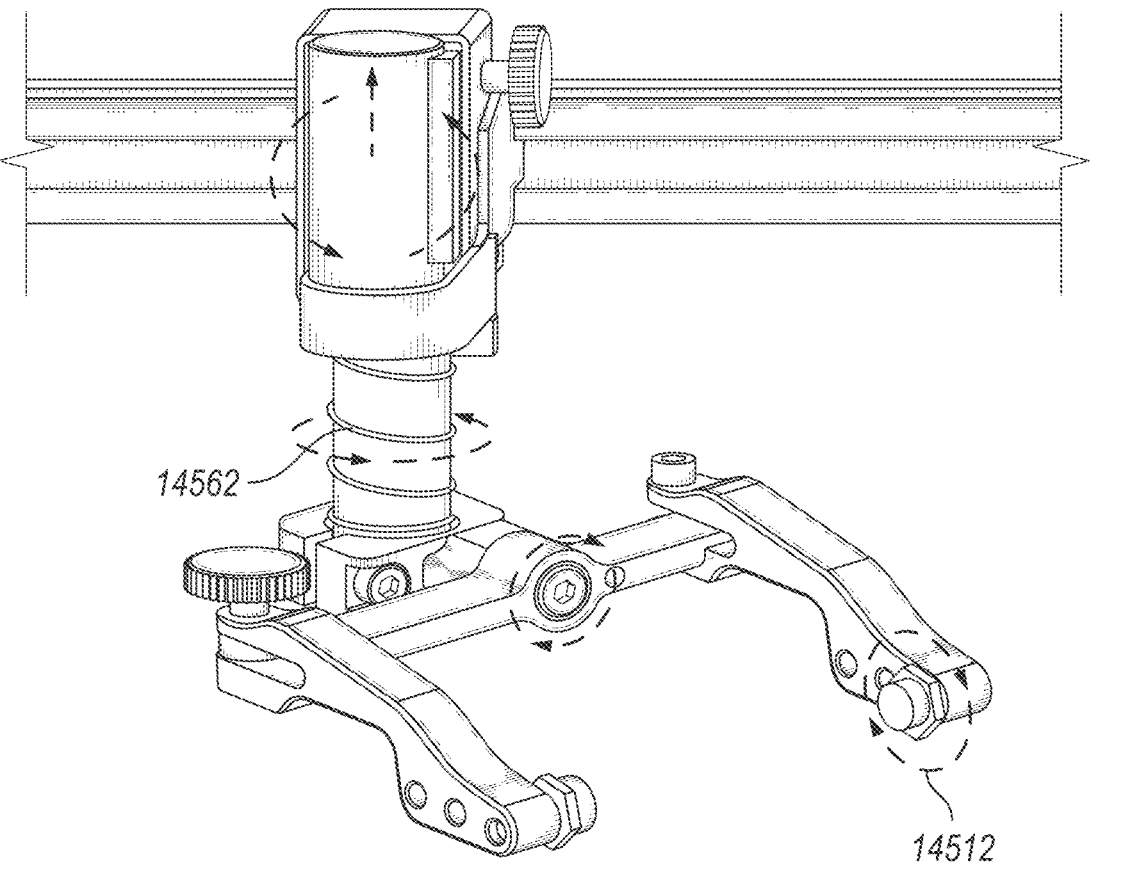
FIG. 19 illustrates a perspective view of a system including a probe holder according to an example embodiment.

FIGS. 17-18 illustrate a schematic diagram of a system 14400 (which may be referred to as a payload) for an inspection robot having a mounting rail to inspect an inspection surface. In example embodiments, the system 14400 may include a probe holder 14401 and a payload 14402, which may be a payload 14100 as described by example herein—e.g., having, among other things, a wedge element 14110. FIG. 19 illustrates another example embodiment of the probe holder connected to a mounting rail.

Figure 38:
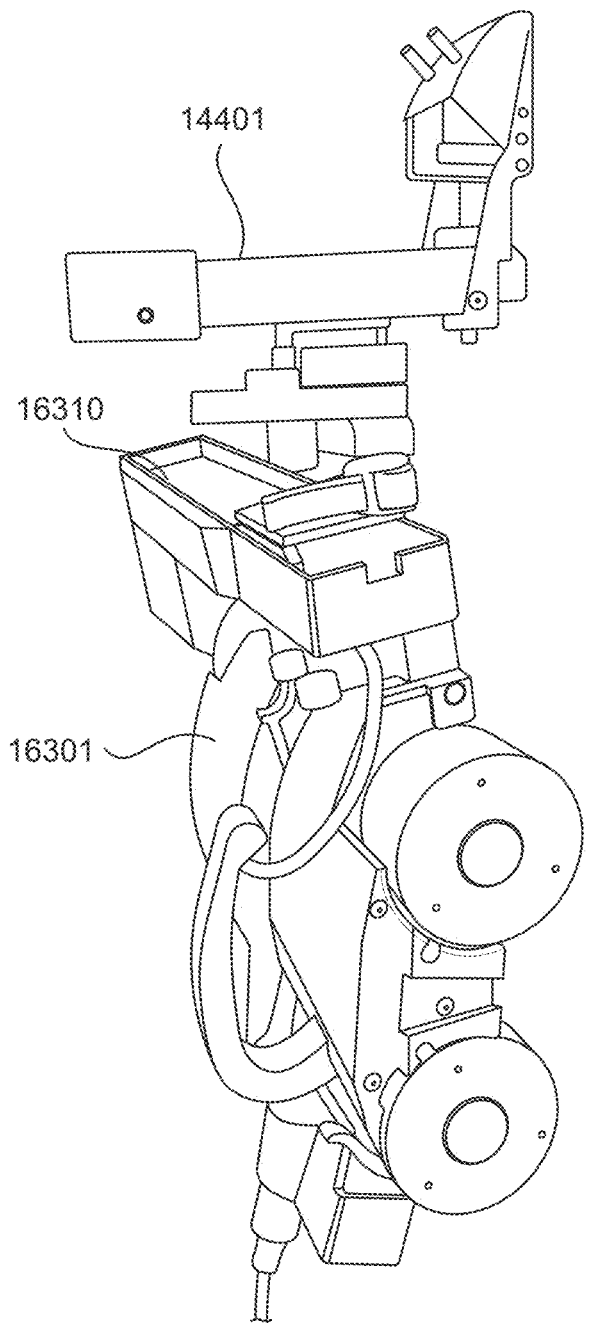
FIG. 38 illustrates an inspection robot with a probe holder and a payload according to an example embodiment.

In example embodiments, the probe holder 14401 may include a mounting rail connection member 14410 structured to connect to the mounting rail of the inspection robot. FIG. 38 illustrates, for example purposes, an example inspection robot 16301 with a mounting rail 16310 to which a system including an example probe holder 14401 is connected via a mounting rail connection member 14410 (as shown in FIGS. 17-18).

With reference again to FIGS. 17-18, the probe holder 14401 may include a wedge element holder 14420 structured to hold the payload 14402 (e.g., including a wedge element 14110), a spring-loaded member 14440 structured to connect to the mounting rail connection member 14410 and to provide a selected downward force on the wedge element holder 14420 and/or to return the wedge element holder 14420 to a selected position, and an extended member 14460 structured to connect to the spring-loaded member 14440 between a first end 14461 and a second end 14462, and to the wedge element holder 14420 at the second end 14462. In some embodiments, as discussed elsewhere herein, the wedge element 14110 may include at least one inspection element (e.g., including at least one ultrasonic transducer) mounted thereon, and may be connected to the wedge element holder 14420 via a pitch axis (e.g., akin to the pitch axis 14512 shown in FIG. 19).

Figure 22:
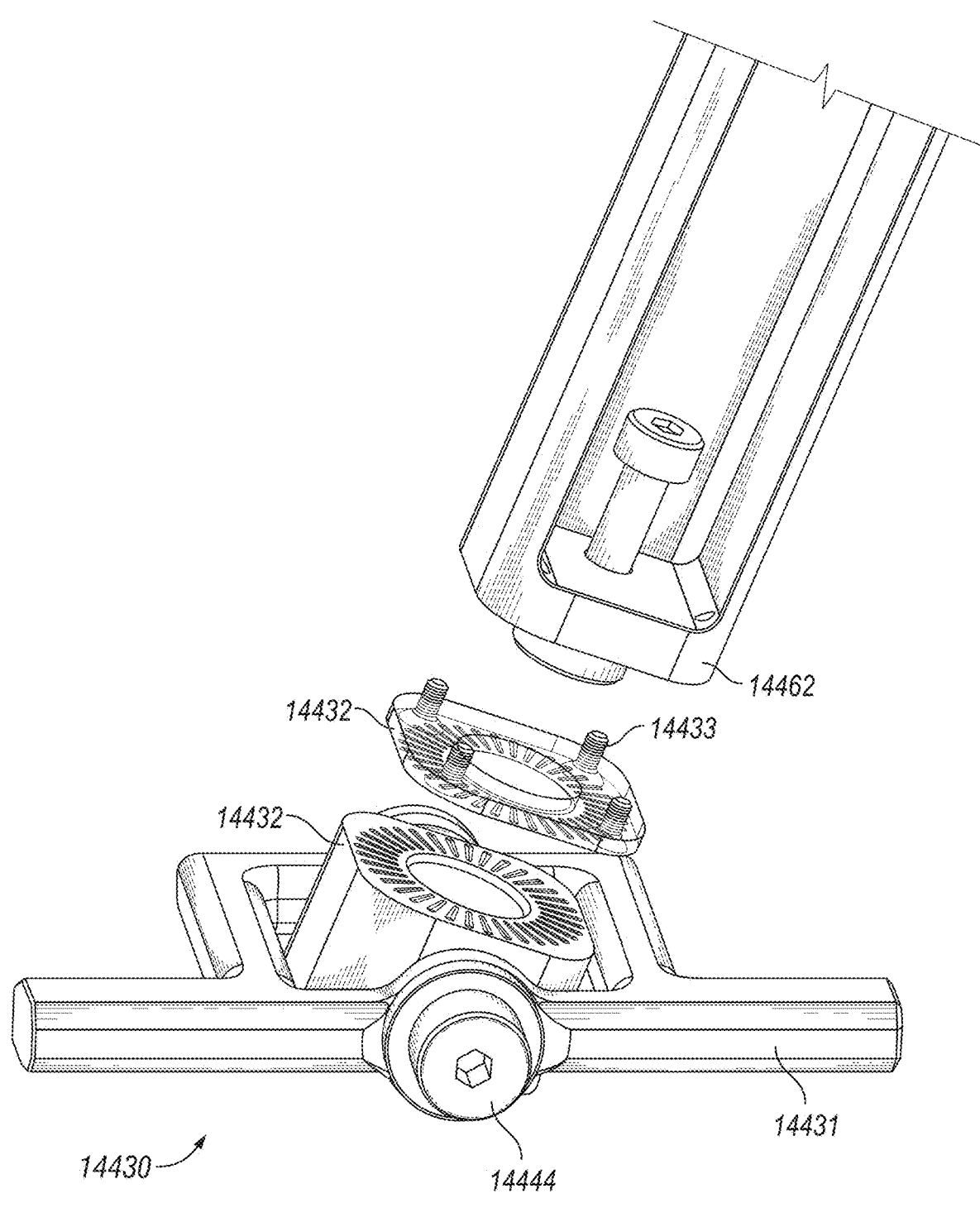
FIG. 22 illustrates a joint member and extended member according to an example embodiment.
Figure 23:
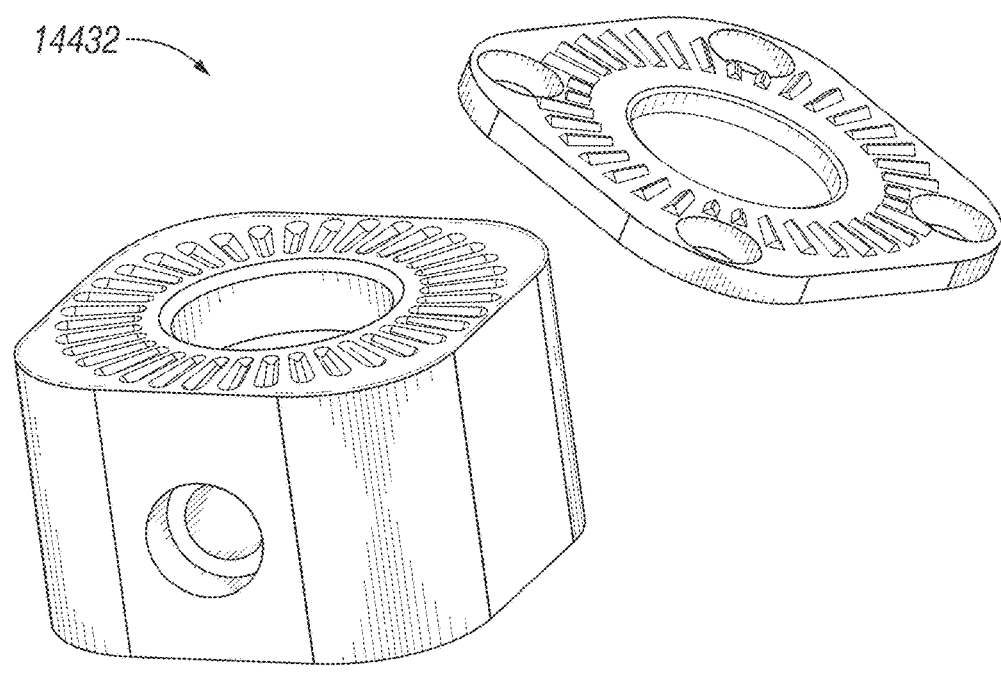
FIG. 23 illustrates a portion of a joint member according to an example embodiment.

In some embodiments, the probe holder 14401 may include a joint member 14430 structured to connect between the extended member 14460 and the wedge element holder 14420. With reference to FIG. 22, which illustrates joint member 14430's connection to extended member 14460, the joint member 14430 may include a joint 14432 such as a Hirth joint (shown in exploded view; see also FIG. 23 for greater detail of the two portions) structured to set a yaw axis 14614 (see FIG. 20) relative to the inspection surface. In some embodiments, the joint member 14430 may connect to the extended member 14460 via the Hirth joint. For example, the Hirth joint 14432 may connect to the second end 14462 of the extended member 14460 via a fastening mechanism 14433 such as screws or bolts. The joint 14432, where present, may be embodied in any manner or by any mechanical device allowing a yaw orientation of the sensing portion of the probe holder 14401. A Hirth joint allows for a rapidly configurable selection of the yaw rotation, that provides a reliable orientation, and that is highly secure.

Figure 27:
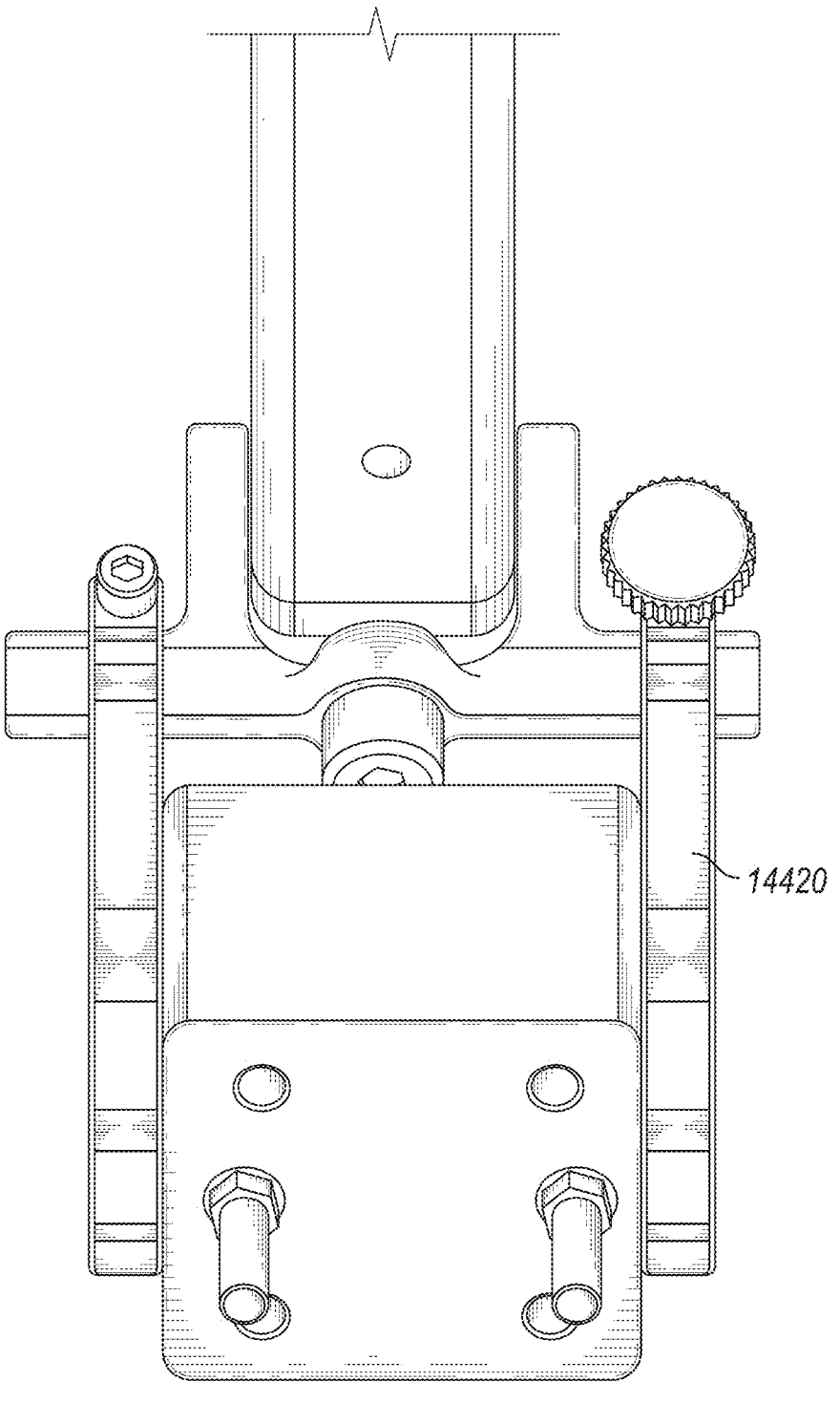
FIG. 27 illustrates a perspective view of a probe holder and a payload according to an example embodiment.

In some embodiments, the wedge element holder 14420 may connect to the joint member 14430 via clamps 14422 on joint frame 14431 and the tightening of fastening mechanisms 14424 such as screws or bolts. A different perspective of this connection is shown by example in FIG. 27.

Furthermore, joint member 14430 may include a rotational joint 14444 structured such that the Hirth joint 14432 may rotate relative to a joint frame 14431 to provide a roll axis 14616 (see FIG. 20) relative to the inspection surface. In an example, with reference to FIG. 21, the rotational joint 14444 may include a bushing. Use of a bushing for the rotational joint 14444 may provide an advantage of a relatively simple construction, but embodiments are not limited thereto and may include other types of rotational joints (e.g., using a bearing or other component to facilitate rotation).

In some embodiments, with reference to FIG. 17, the extended member 14460 may include a linear rail 14464, and the extended member 14460 may be structured to connect to the spring-loaded member 14440 via the linear rail 14464. For example, the spring-loaded member 14440 may be connected to a position on the linear rail 14464 between the first end 14461 and the second end 14462 such that it travels along the linear rail 14464, e.g., along vertical axis 14620 (see FIG. 20).

Figure 26:
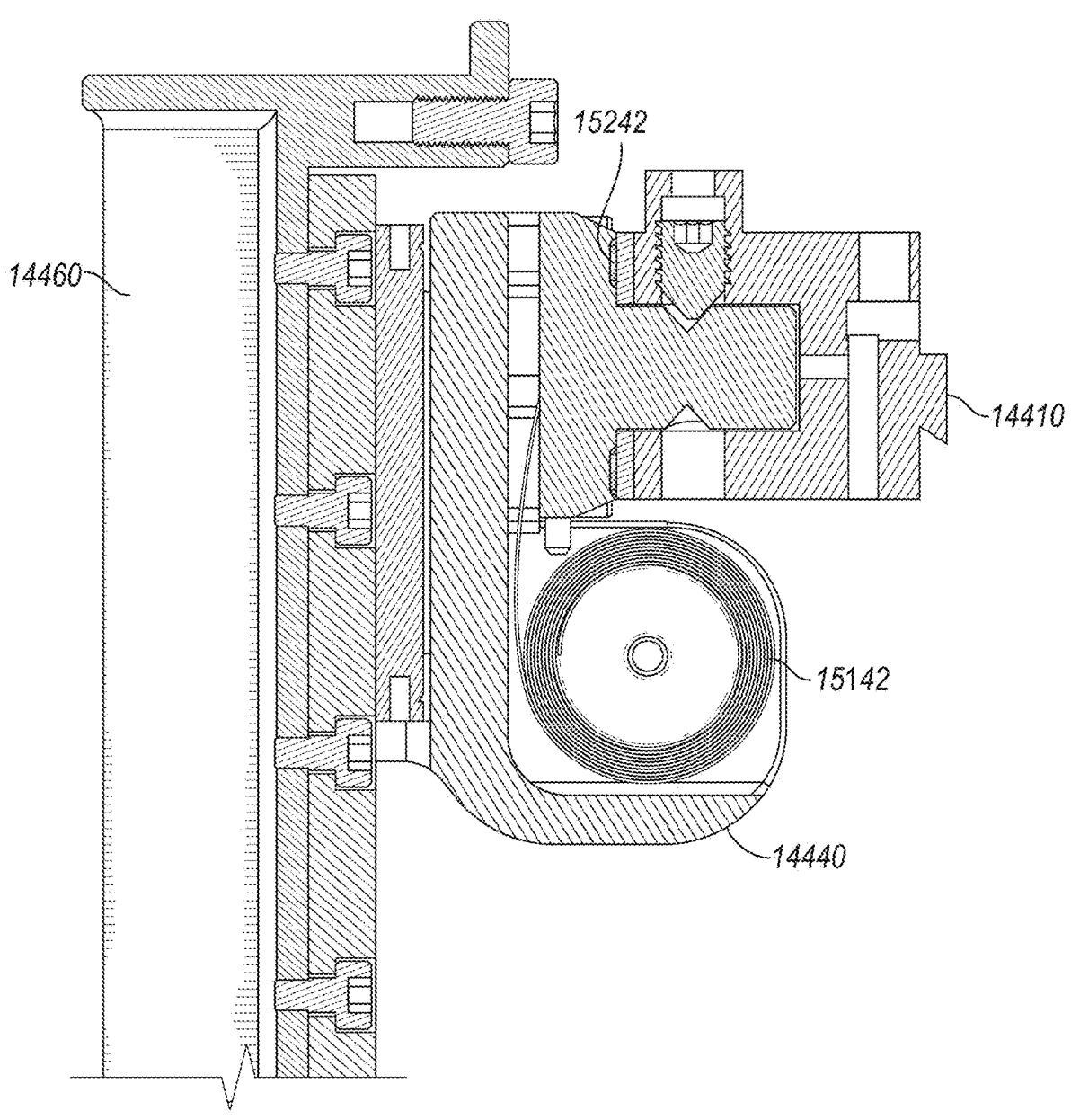
FIG. 26 illustrates a spring-loaded member connected to an extended member and a joint according to an example embodiment.

With reference to FIG. 26, in some embodiments, the spring-loaded member 14440 may include a constant force spring 15142. The constant force spring 15142 may be connected at a position between the first end 14461 and the second end 14462 of the extended member 15160. In some embodiments, the constant force spring 15142 may be structured to be replaced to adjust the selected downward force on the wedge element holder 14420. In certain embodiments, the spring-loaded member 14440 may be structured to apply a lifting force to the extended member 15160 (e.g., applying a selected down force by offsetting a selected amount of the weight of the extended member 15160), and/or to apply a down force to the extended member 15160. In certain embodiments, the spring-loaded member 14440 may be associated with a stop that couples the spring to the extended member 15160 and/or that prevents action of the spring to the extended member 15160 (e.g., to limit lift and/or down force under selected conditions, and/or to limit the total movement of the extended member 15160).

As discussed above, in example embodiments, the spring-loaded member 14440 may be structured to connect to the mounting rail connection member 14410 (e.g., with a fixed connection or, as shown by example in FIG. 26, with a joint 15242 such as a Hirth joint structured to set a skew axis 14618 (see FIG. 20) relative to the inspection surface), and the mounting rail connection member 14410 may connect to the mounting rail of the inspection robot. In one example, the mounting rail connection member 14410 may include a dovetail joint to connect to the mounting rail of the inspection robot.

In example embodiments, the spring-loaded member 14440 and constant force spring 15142 may be configured to exert either downward or upward force on the payload 14402 to maintain the payload 14402 in contact with the inspection surface—for example, together with other spring forces included on the probe holder 14401, interaction with the weight of the extended member 15160, and/or interaction with stops on the rail 14464 or spring-loaded member 14440.

Figure 20:
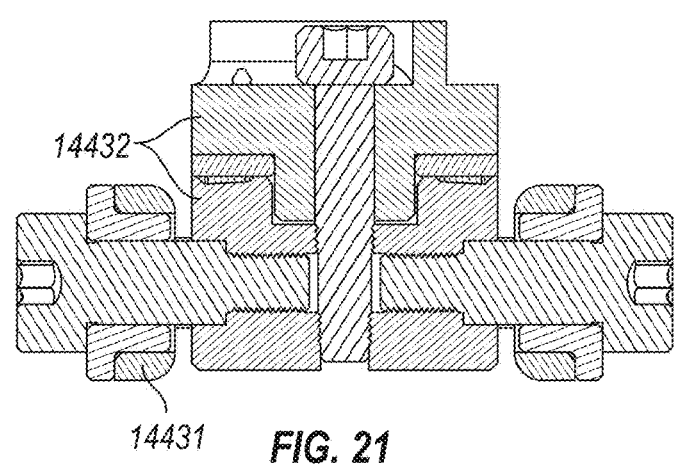
FIG. 20 illustrates a perspective view of a system including a probe holder and a payload according to an example embodiment.
Figure 24:
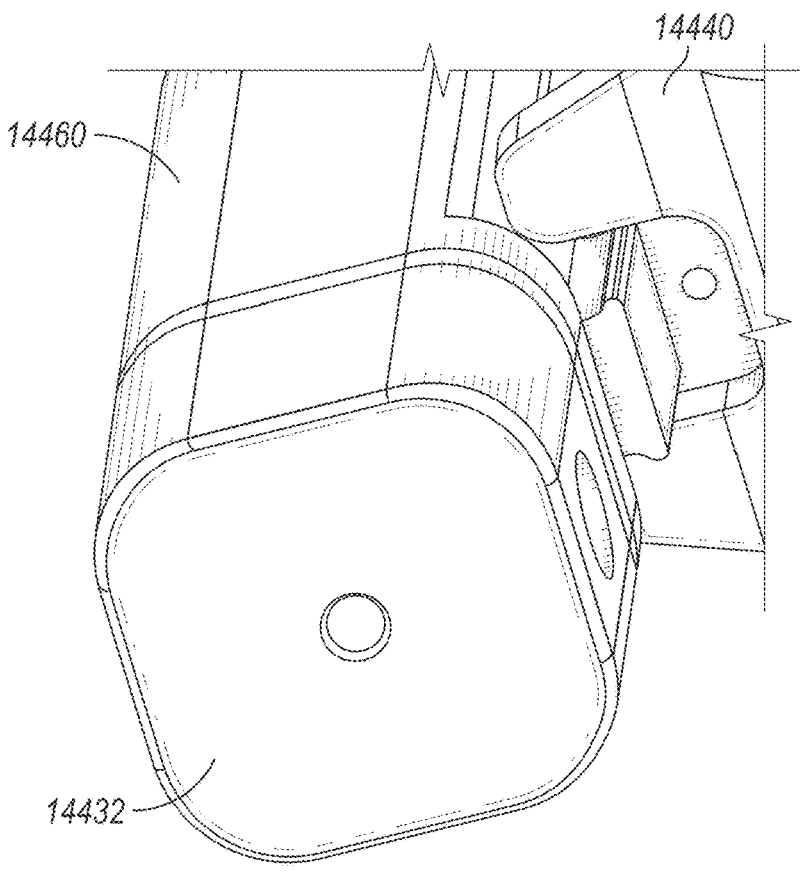
FIG. 24 illustrates a portion of a joint member, an extended member, and a spring-loaded member according to an example embodiment.

With continued reference to FIG. 26, the constant force spring 15142 of the spring-loaded member 14440 may connect to the joint 15242 and, as discussed above, the spring-loaded member 14440 may be connected to the extended member 14460 along linear rail 14464 at a position between the first end 14461 and the second end 14462 such that the spring-loaded member 14440 may translate along the linear rail 14464 (e.g., in the upward and downward vertical directions 14620 illustrated in FIG. 20). For example, as an upward force is transferred from the payload 14402 to the extended member 14460, the spring-loaded member 14440 may travel downward along the linear rail 14464. FIG. 24 depicts an example of the spring-loaded member 14440 at the second end 14462 of the extended member 14460. Another spring force associated with the extended member 14460 (e.g., like the spring 14562 shown in the example probe holder of FIG. 19) may extend to exert a downward force on the extended member 14460 and/or the spring-loaded member 14440 to maintain the payload 14402 in contact with the inspection surface.

Figure 25:
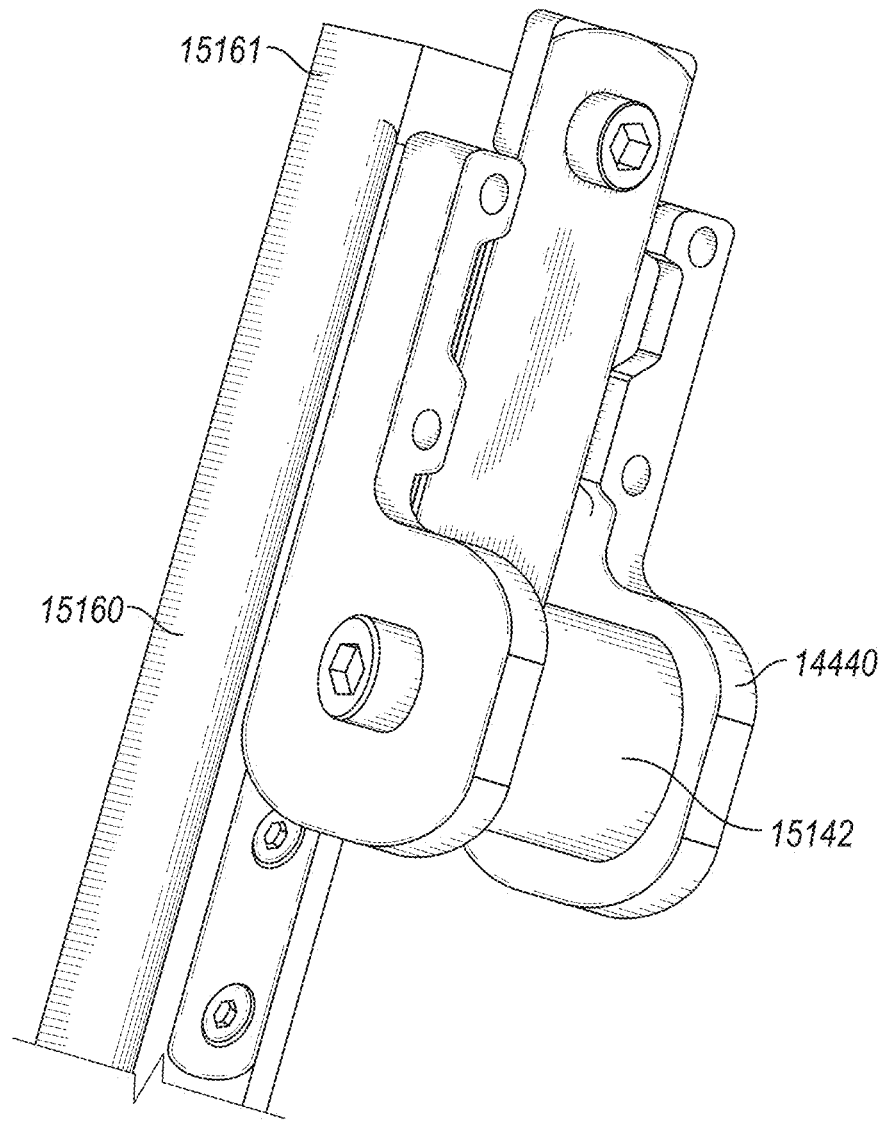
FIG. 25 illustrates a spring-loaded member connected to an extended member according to an example embodiment.

In another example embodiment, with reference to FIG. 25, a constant force spring 15142 of a spring-loaded member 14440 may be connected to a first end 15161 of the extended member 15160 (e.g., through a fastening mechanism such as a screw or a bolt). Thus, as the payload 14402 traverses the inspection surface, it may encounter upward (e.g., in a vertical direction) forces, which it transfers via the wedge element holder 14420 to extended member 15160. As extended member 15160 travels upward from the vertical force, the constant force spring 15142 may expand, creating an opposite downward force (which may selectable via selection of the constant force spring 15142, which may be replaceable) on the wedge element 14110 via extended member 15160 and wedge element holder 14420 to maintain the payload 14402 in contact with the inspection surface.

In example embodiments, the constant force spring 14442 may be selected to have sufficient force for the payload 14402 to adequately traverse weld lines and other surface features. Additionally, the degrees of freedom discussed herein with regard to the joints of the system 14400 may provide for traversal over inspection surfaces with relatively small radiuses of curvature. The locations of the joints for adjustment by an operator are located for ergonomical convenience the yaw and roll as discussed herein.

Thus, the system 14400 including the constant force spring 14442 may provide for adaptability to surface conditions, such as undulations, weld lines obstacles, surface features, and other curvatures. As the constant force spring 14442 may be structured to be replaced in the field, a vertical force provided by the constant force spring 14442 may be thereby adjusted based on findings during operation.

In some embodiments, the system 14400 may be structured to provide an active upward force on the payload 14402—for example, through the use of a linear actuator. In such embodiments, the system 14400 may raise the payload 14402 from the inspection surface when, for example, an obstacle needs to be traversed or when it is desired to avoid wear on the payload 14402.

In example embodiments, the system 14400 including the probe holder 14401 and payload 14402 may be more robust and may have a longer travel length (e.g., in a vertical direction) owing to the extended member 14460. Such a longer travel length may be helpful for smaller-diameter surfaces—for example, the extended member 14460 may function as a long, straight raster arm driving vertically over the curved surface such as a pipe. Indeed, the vertical travel length may correspond to a length of the extended member 14460.

Furthermore, the joints of the system 14400 as discussed herein (e.g., for yaw and roll) may provide for a proper orientation and spacing relative to the inspection surface, which may be important in order for the at least one inspection element 15830 (e.g., including at least one phased array of UT elements) to properly inspect the inspection surface for obtaining inspection data.

With reference to FIG. 41, an example method 16600 of maintaining a payload 14100 in contact with an inspection surface during an inspection operation may include maintaining 16520, using a constant force spring of a probe holder, the payload in contact with the inspection surface during a rastering operation that rasters the payload along the inspection surface. In example embodiments, the probe holder may be the probe holder 14401 and the payload may be payload 14402.

With reference to FIG. 42, a method 16700 according to example embodiments may include determining 16710 an inspection depth value of an asset (the surface of which may be the inspection surface) based on a first inspection using an inspection robot (e.g., inspection robot 16301) including a system 14400 having a first wedge element 14110 and a first ultrasonic (UT) sensor package 15830 mounted thereon. Furthermore, the method may include swapping 16720 out at least one of the first wedge element 14110 or the first UT sensor package 15830 with at least one of a different wedge element or a different UT sensor package based on the inspection depth value of the inspection surface.

In some embodiments, the inspection depth value may include at least one of a thickness of an asset having the inspection surface, a depth of a damage of the inspection surface, or a selected inspection depth.

In some embodiments, the first UT sensor package 15830 may be swapped out for the different UT sensor package, and the different UT sensor package may have at least one of a different UT frequency, a different UT amplitude, a different UT sensor pitch, a different number of UT sensors, a different available data rate capability, a different available excitation energy and/or excitation characteristic (e.g., frequency, rise rate, fall rate, impulse, etc.), and/or a different on-package calibration from the first UT sensor package.

In some embodiments, the inspection depth value may include the thickness of the asset having the inspection surface, and the different UT sensor package may have a lower UT frequency than the first UT sensor package 15830 based on determining that the thickness is greater than a first thickness corresponding to the first UT sensor package 15830.

In some embodiments, the first wedge element 14110 may be swapped out for the different wedge element, and the different wedge element may have at least one of a different thickness or a different roof angle from the first wedge element 14110.

In example embodiments, a payload for an inspection robot to inspect an inspection surface may include a first swappable sensor package (e.g., inspection element 15830) including at least one ultrasonic (UT) element, and a first wedge element (e.g., wedge element 14110) having a unitary body and including a bottom side (e.g., second side 14116) structured to interface with the inspection surface and a top side (e.g., 14114) structured for the first swappable sensor package to be mounted directly thereon. The first swappable sensor package may be mounted directly on the unitary body of the first wedge element with at least one fastening mechanism (e.g., screws or bolts) such that the first swappable sensor package has an angle of 0 to 7 degrees, inclusive, relative to the bottom side of the first wedge element.

In some embodiments, the first wedge element may be structured such that the first swappable sensor package may be operable to be dismounted from the unitary body of the first wedge element and replaced with a second swappable sensor package.

Furthermore, in some embodiments, the second swappable sensor package may have at least one of a different UT frequency, a different UT amplitude, a different UT sensor pitch, a different number of UT sensors, or a different on-package calibration from the first swappable sensor package.

In some embodiments, the different wedge element may have at least one of a different thickness or a different roof angle from the first wedge element.

In some embodiments, a first swappable sensor package may be swapped for a second swappable sensor package having a lower UT operating frequency. A lower UT operating frequency may be more suitable for inspecting a thicker asset. In an example, a thickness of an asset may change during an inspection operation. Thus, the first swappable sensor package may be swapped for a second sensor package having a lower UT operating frequency if the thickness increases, or may be swapped for a second sensor package having a higher UT operating frequency if the thickness decreases.

In some embodiments, a digital to analog converter (DAC) of the inspection robot to which the swappable sensor package(s) is connected may itself be swappable, e.g., to adjust to the inspection needs (e.g., to swap out to a DAC with more analog-to-digital inputs for an inspection requiring a greater resolution). For example, in an inspection that may require a greater resolution, additional UT elements of a fixed or swappable sensor package may be enabled and/or read by a DAC that has been swapped in to replace a first DAC.

Example embodiments herein allow for a system to detect damage and/or a surface anomaly on the inspection surface, and to swap out a payload sensing package to respond to the damage. In certain embodiments, an inspection robot is capable to service payloads having any sensor type and/or capability, and can be configured on-site to perform a number of inspection operations, for example through recalibration of sensors, changing a payload, swapping a sensor on a wedge element, and/or swapping out one wedge element with another.

Figures 30, 31:
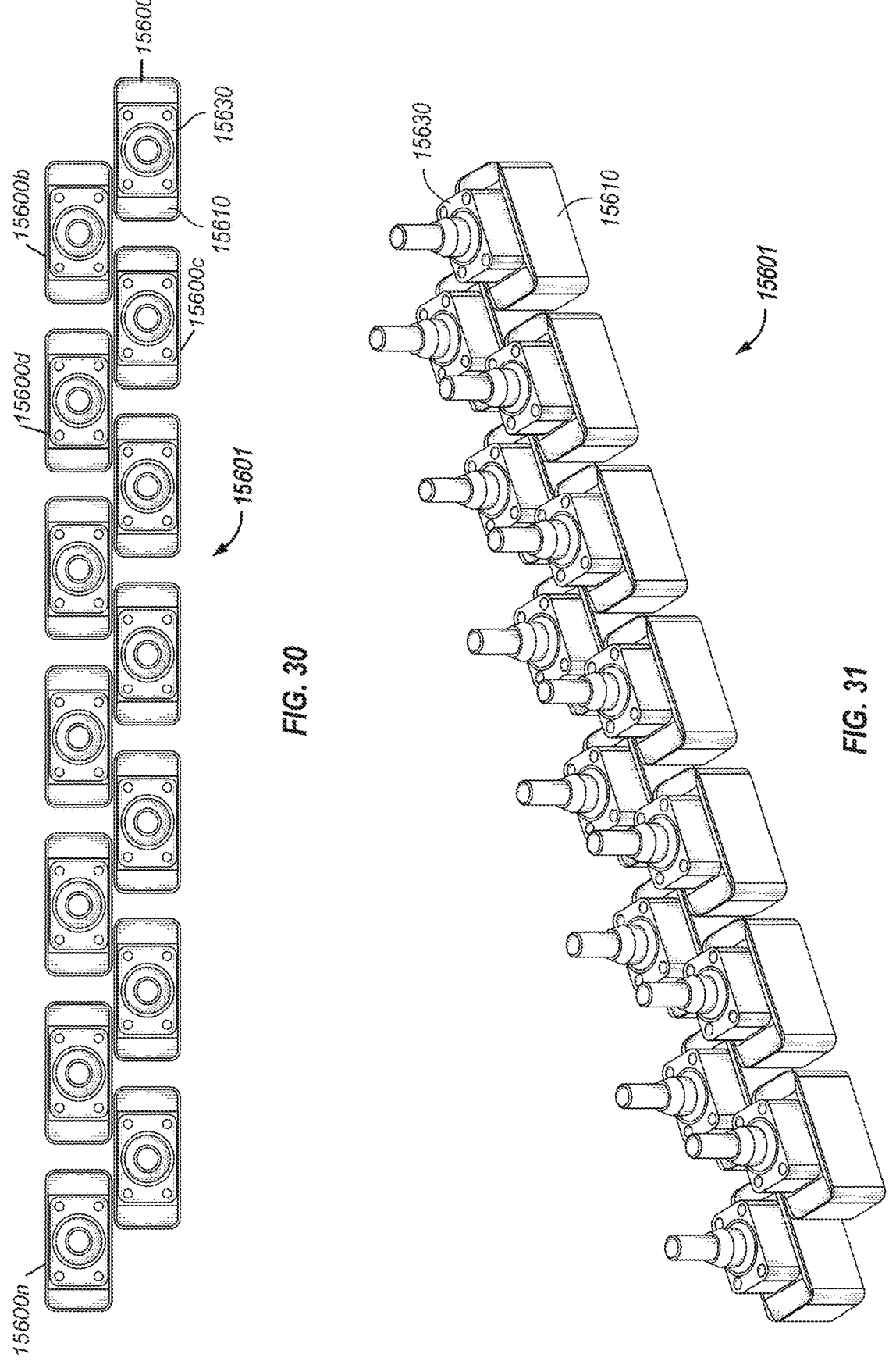
FIGS. 30-31 illustrate a sequence of payloads according to an example embodiment.

With reference to FIGS. 30-31, in example embodiments, an inspection system 15601 may include a connected sequence of payloads 15600 (e.g., 15600a to 15600n) including wedge elements 15610 with respective inspection elements 15630, where the inspection elements 15630 may each include a phased array (e.g., a linear phased array) of UT elements. In some examples, the phased arrays of UT elements may each include 16 UT elements. In some examples, the phased arrays of UT elements may have a pitch of 1.5 mm or 2 mm.

In some embodiments, the payloads 15601 of system 15601 may be arranged in a staggered, two-row arrangement such that the UT elements of a phased array of a first inspection element of a payload in a first row (e.g., payload 15600a) may form a contiguous surface inspection with the UT elements of a phased array of a second inspection element of a phased array of a second inspection element of a payload in a second row (e.g., 15600b), e.g., such that payloads of system 15601 may maintain a consistent resolution between UT elements of respective phased arrays and between UT elements of different, contiguous (but staggered) phased arrays. In some embodiments, the payloads 15600 of system 15601 may incorporate beam steering. Such a system 15601 may provide advantages in terms of speed of inspection and in inspection resolution. In some embodiments, the system 15601 may have 256 total UT elements (e.g., sixteen payloads 15600 with sixteen UT element each), the inspection data of which may be converted by a digital-to-analog converter, either through all 256 inputs at once or through multiplexing.

Figures 28, 29:
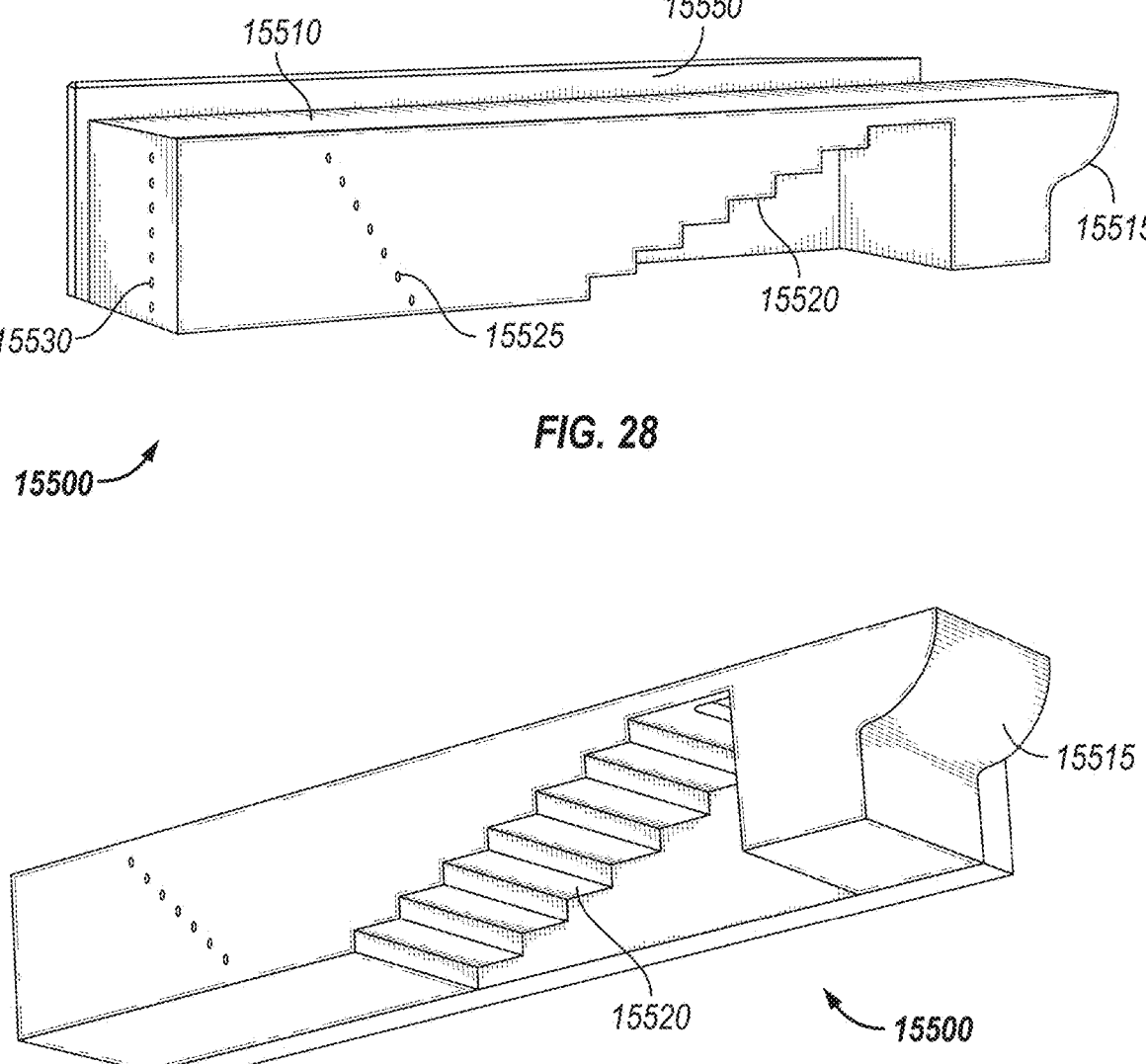
FIG. 28-29 illustrate a calibration block according to an example embodiment.

With reference to FIGS. 28-29, example embodiments include a calibration block that may provide for calibration for different types of inspections, including, for example, weld inspections, rapid RAUT inspections, etc. In example embodiments, the calibration block 15500 may include a guide plate 15510 to ensure the probe is perpendicular to calibration holes and/or calibration thicknesses included in the calibration block 15500, which may be important for achieving calibration.

In some embodiments, the calibration block 15500 may include a curved portion 15515, which may be used for calibrating an angle beam for, e.g., a weld inspection to set the delay, for multiple angles that have the same distance, and/or for ensuring proper detection of certain types of features on the inspection surface.

In some embodiments, the calibration block 15500 may include a plurality of steps 15520 having different thicknesses. For example, in some embodiments, the calibration block 15500 may include steps 15520 having thicknesses ranging from 0.1 to 2.0 inches. In some embodiments, each step 15520 may include one or more holes (e.g., a plurality of holes) that may provide resolution verification. Thus, for example, the steps 15520 may be used to calibrate and verify that the thickness is correct, and/or the steps 15520 may be used to verify that the resolution is sufficient for detecting the holes. In an example, the holes may be based on 10% depth and 20% depth with two different diameters.

In some embodiments, the calibration block 15500 may include a plurality of angled side holes 15525, which may extend through the calibration block 15500. The side holes 15525 may be used for an angled beam or 0 degree calibration.

In some embodiments, the calibration block 15500 may include a plurality of back side holes 15530, which may be used for calibrations such as for a tri-lateral configuration, e.g., for three beam sets all in one swipe.

In some embodiments, the calibration block 15500 may include a guide plate 15550. In some embodiments, the guide plate 15550 may be removable from the remainder of the calibration block 15500. The guide plate 15550 may help to ensure that the sensor is perpendicular to the holes for calibration.

In some embodiments, a back side of the calibration block 15500 (e.g., a side facing the guide plate 15550) may be angled, e.g., at about 10 degrees, such as in a vertical direction, so that the sound may not reflect back to the probe but in another direction so that calibration of the holes is not impeded.

Figure 43:
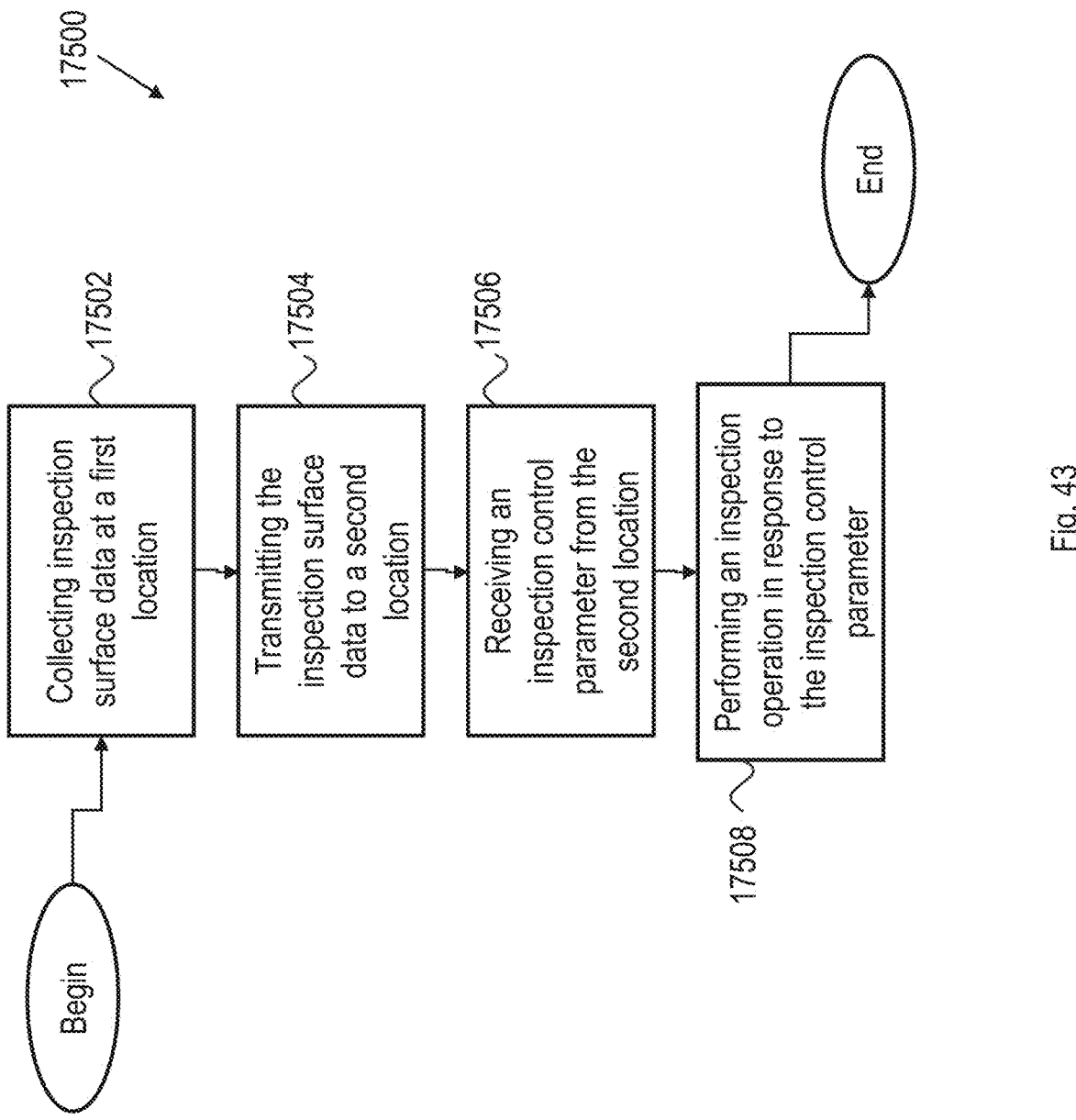
FIG. 43 depicts an example procedure to receive an inspection control parameter and adjust an inspection operation.

Referencing FIG. 43, an example procedure 17500 for receiving an inspection control parameter and performing an inspection operation accordingly is schematically depicted. The example procedure may be performed, in whole or part, by any system, controller, circuit, apparatus, or the like as set forth throughout the present disclosure. The example procedure 17500 includes an operation 17502 to collect inspection surface data at a first location (e.g., at an asset of a facility that is to be inspected). The example procedure 17500 includes an operation 17504 to transmit the inspection surface data to a second location (e.g., a location remote from the asset, for example an office location where an expert UT analyst may nominally be located), and an operation 17506 to receive an inspection control parameter from the second location. The example procedure 17500 further includes an operation 17508 to perform an inspection operation in response to the inspection control parameter. In certain embodiments, performing the inspection operation in response to the inspection control parameter includes configuring any aspect of an inspection robot, configuring any operational aspect of the inspection (e.g., a velocity of the inspection robot, wait times, rastering speeds, etc.), validating that any of these are already configured accordingly, and/or confirming that any operations performed were consistent with the inspection control parameter.

Figure 44:
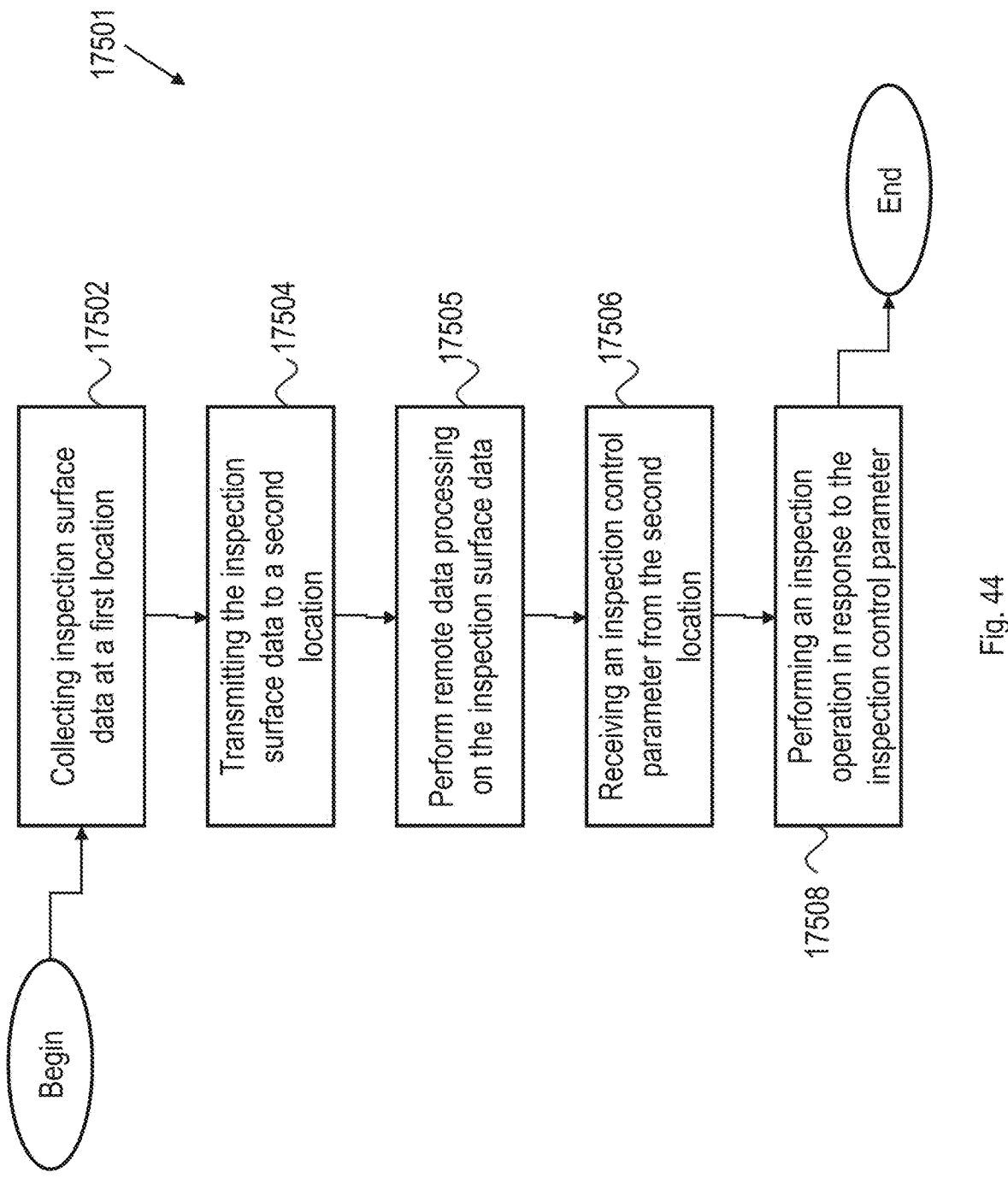
FIG. 44 depicts an example procedure to receive an inspection control parameter and adjust an inspection operation based on remote processing.

Referencing FIG. 44, an example procedure 17501 includes an operation 17505 to perform remote data processing on the inspection surface data. In certain embodiments, the operation 17505 includes an expert UT analyst interfacing with a facility visualization and planning platform (e.g., reference U.S. application Ser. No. 18/479,624) allowing for sophisticated visualization of the facility and visualization of the inspection data to facilitate analysis of the inspection surface data.

Figure 45:
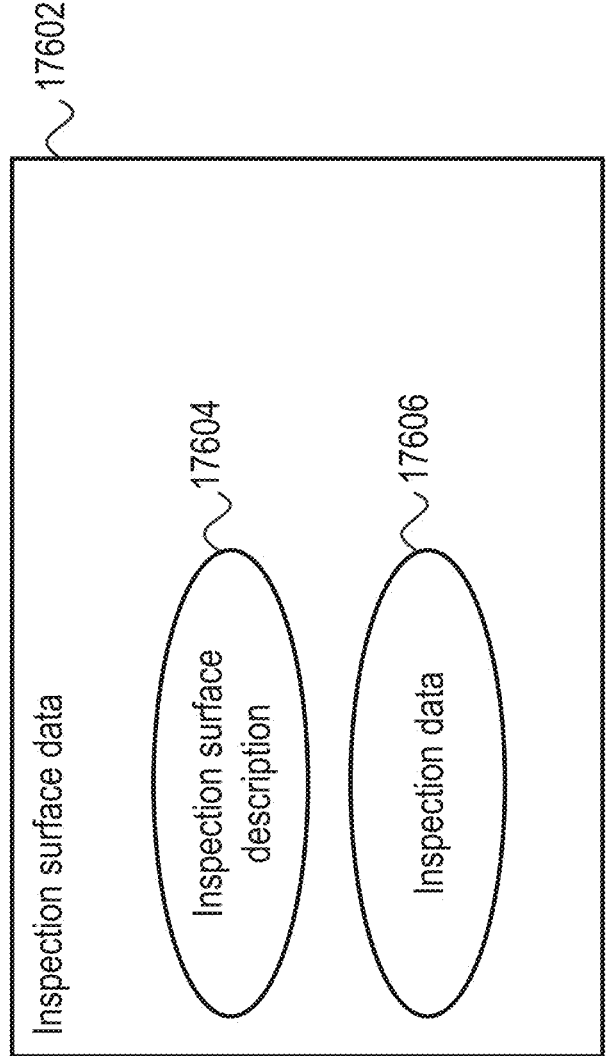
FIG. 45 depicts example inspection surface data.

Referencing FIG. 45, example and non-limiting inspection surface data 17602 is schematically depicted. Example inspection surface data 17602 includes an inspection surface description 17604, which may include observations or measurements provided from the first location (e.g., an operator positioned at the asset for inspection). The inspection surface description 17604 may be any type of description of the inspection surface that tends to help the remote expert determine the proper configuration of the inspection robot, sensors, payload, etc. For example, the surface area and shape of the inspected region, presence of any damage or obstacles, a general observation of the type of damage or surface condition (e.g., dirt, visible corrosion, paint condition, etc.), specifications related to the surface (e.g., drawings, operating temperatures, vibration profile, etc.), a thickness of the inspection surface, etc. In certain embodiments, the inspection surface data 17602 may be utilized to confirm known information (e.g., a stated pipe diameter that is confirmed on location). Example inspection surface data 17602 includes inspection data 17606, for example data collected from an inspection robot at the location collecting data from the inspection surface. Example and non-limiting inspection data 17606 includes data directly related to operation of the UT phased array, such as raw acoustic data, indicated thickness data, presence of certain types of cracks, corrosion, or the like. In certain embodiments, the inspection data 17606 includes data that is not directly related to operation of the UT phased array, such as camera data, connectivity data, data from other inspection sensors (e.g., EMI sensors, temperature sensors, etc.), that may be utilized to infer information about the UT inspection, to plan pathing and/or coverage of inspection of the asset, to select certain types of sensors, sleds, payloads, to add inspection operations to confirm the presence of possible features identified in the inspection data 17606, etc. In certain embodiments, the inspection data 17606 may include various sources of data, and may be combined with the inspection surface description 17604 for the remote expert to plan, adjust, and evaluate the inspection operations.

Figure 46:
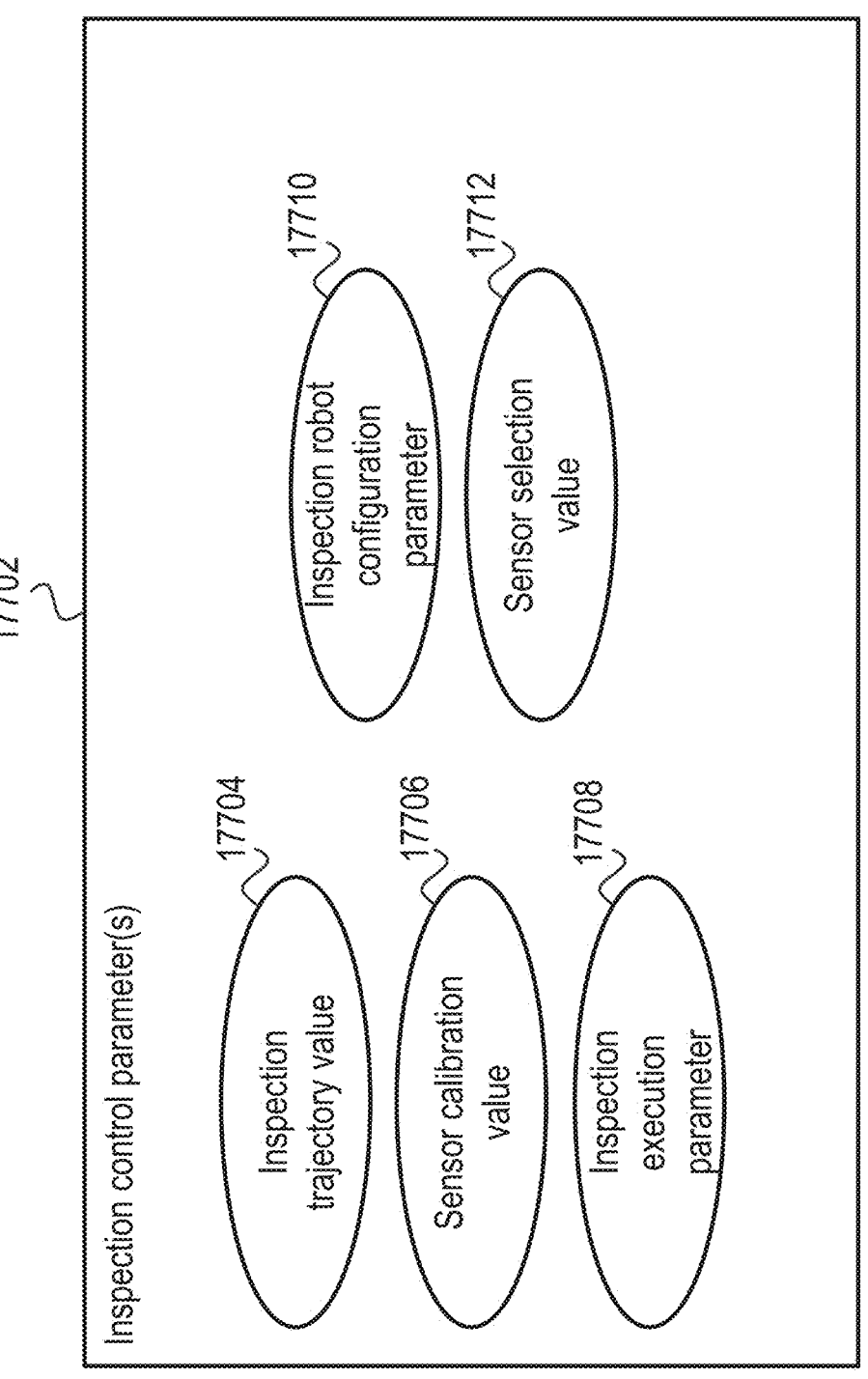
FIG. 46 depicts example inspection control parameters.

Referencing FIG. 46, example and non-limiting inspection control parameters 17702 are schematically depicted. An example inspection control parameter 17702 includes an inspection trajectory value 17704. The inspection trajectory value 17704 includes a trajectory of any inspection parameter over the course of the inspection, and the parameterization value for the trajectory may be any value (e.g., time, position, stage of the inspection, etc.). The inspection trajectory value 17704 may include a robot trajectory (e.g., where the inspection robot should traverse), a sensor trajectory (e.g., which sensors should be activated, at which region on the inspection surface, stage of the inspection, etc.), and/or a trajectory of any other inspection control parameters 17702 (e.g., a trajectory of sensor calibration values 17706—for example where sensors should operate at a first calibration over a specific region or during certain operations, and at a second calibration over another region or operations, where the regions may overlap—for example allowing inspection at a first depth and then at a second depth, either in the same region or a different region, for example to inspect two separate features within a region, to inspect two different surfaces having different thicknesses, etc.). An example inspection control parameter 17702 includes a sensor calibration value 17706, for example to configure or confirm that sensor calibrations are appropriate for the inspection surface and conditions indicated by the inspection surface data 17602). An example inspection control parameter 17702 includes an inspection execution parameter 17708, for example defining any inspection execution parameter, such as couplant flow rates, inspection robot velocity, operating limits, a down force to be applied for a payload, time limits, power settings, etc. An example inspection control parameter 17702 includes an inspection robot configuration parameter 17710, for example the constituency and arrangement of payloads, selection of sled characteristics (e.g., adjustable side wall selections, ramp angles, pivot limits, material selections, etc.), software versions to be utilized for components of the inspection robot, type of drive module to be utilized, modular components to be utilized (e.g., drive modules, printed circuit boards and/or board versions, encoder options, interface options which interface plate to utilize for an inspection robot to connect to accessories such as the drive modules, payloads, etc.). An example inspection control parameter 17702 includes a sensor selection value 17712, which may include types of sensors, versions of sensors, arrangement of sensors, etc. An example inspection control parameter 17702 includes any parameter that can be usefully set by a remote expert, typically a data quality expert or an expert in analyzing the sensor data for the inspection operation (e.g., a UT sensor expert and/or a phased array UT sensor expert), where setting the parameter allows for the operator performing the physical inspection and/or the inspection robot directly to respond to the parameter to perform the inspection operation. It will be seen that certain example inspection control parameters 17702 may reasonably fit within more than one category of example as depicted in FIG. 46. The selected categorization and nomenclature for inspection control parameters 17702 is not limiting, and a parameter may be included as an inspection control parameter 17702 regardless of how many categories it might be considered within, whether such a parameter fits into any of the example categories, or whether the parameter fits into a category at all.

Figure 47:
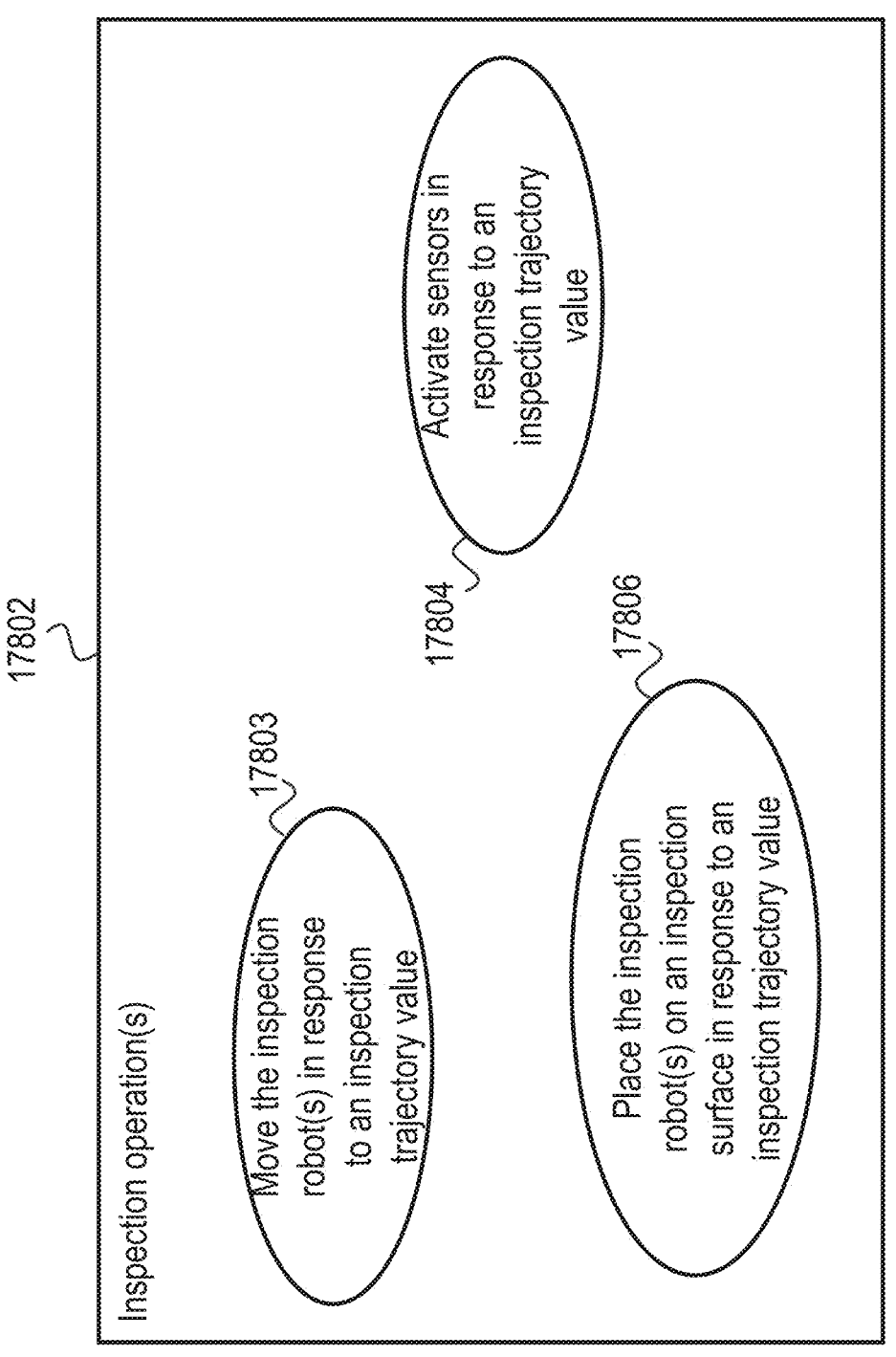
FIGS. 47-49 depict example inspection operations determined or adjusted in response to an inspection control parameter.

Referencing FIG. 47, example and non-limiting inspection operations 17802 are schematically depicted. As set forth throughout the present disclosure, the inspection operations 17802 include any operations related to configuring, preparing for, performing, validating, and/or confirming that operations were performed for an inspection operation in response to one or more inspection control parameter(s) 17702. Accordingly, the life cycle of the inspection control parameter(s) 17702 and inspection operation(s) 17802 may not coincide with a naïve description of the life cycle of physical inspection operations (e.g., inspection operations to operate an inspection robot on an inspection surface, collect data thereby, and communicate the data to a customer of the data). For example, certain inspection operations 17802 may be performed before the physical inspection operations commence, and/or may be performed after the physical inspection operations are otherwise completed.

An example inspection operation 17802 includes an operation 17803 to move the inspection robot in response to an inspection trajectory value 17704—for example: following a prescribed path on the inspection surface, limiting movement of the inspection robot to certain regions of the inspection surface; limiting movement of the inspection robot within described velocity constraints; and/or moving the inspection robot over regions of the inspection surface in a scheduled sequence. An example inspection operation 17802 includes an operation 17804 to activate sensors in response to an inspection trajectory value 17704—for example activating particular sensors to interrogate selected regions of the inspection surface. The operation 17804 includes interrogating any accessible regions of the inspection surface with any available sensors, which may be performed by a same inspection robot (e.g., where the inspection robot has multiple sensor packages or payloads available, and activates appropriate ones at appropriate regions of the inspection surface, and/or where the inspection robot traverses the inspection surface with a first sensor package, is reconfigured with a second sensor package, and then traverses the inspection surface with a second sensor package). In certain embodiments, the operation 17804 can include following an inspection trajectory value 17704 that is sequential (e.g., inspect region "A" with a first sensor package, then inspect region "A" with a second sensor package), interleaved (e.g., inspect each slice of region "A" with the first sensor package and then with the second sensor package, for example utilizing two complete rastering operations for each slice, before proceeding to inspect the next slice of regions "A" with both sensor packages), and/or a combination of these (e.g., inspecting certain regions of the inspection surface sequentially, and other regions in an interleaved manner). In certain embodiments, arbitrary scheduling and/or trajectories may be utilized, for example: in the interleaved example, a first slice may be inspected with the first sensor package and then the second sensor package, and a second slice may be inspected with the second sensor package and then the first sensor package, which in the example would reduce the switching between the first sensor package and the second sensor package by 50%. One of skill in the art, having the benefit of the present disclosure, can readily determine an inspection trajectory value 17704 to accomplish planned physical inspection operations and/or to respond to conditions observed at the location of the asset and/or determined during inspection operations, including the sequencing of differential inspection operations.

A sensor package, as utilized herein, should be understood broadly, and includes any hardware configuration that is capable to effectively inspect the inspection surface for a particular aspect, such as a wall thickness inspection, corrosion inspection, cracking inspection, weld quality inspection, heat affected area inspection, or the like. Two distinct sensor packages may share a same physical sensor, for example an encoder or other position sensor, or a camera, may be a member of several (or all) different sensor packages for an inspection robot. In another example, a phased array UT sensor may be configured to inspect for distinct features based on various configuration parameters of the phased array UT sensor that do not change the physical arrangement, for example a depth of inspection may be configured based on excitation parameters (e.g., excitation frequency, amplitude, sequencing, etc.), and or different types of surface degradation may be detected utilizing beam steering operations for a phased array UT sensor, and accordingly the phased array UT sensor may be considered as a part of a different sensor package depending upon the configuration or calibration of the phased array UT sensor, or based on differential processing of the data from the phased array UT sensor.

Activation of a sensor, as utilized herein, should be understood broadly, and includes one or more operations such as: including a sensor on a payload of the inspection robot; interfacing with the sensor for power, communication, or other needs (e.g., provision of couplant); retaining the sensor in operational contact with the inspection surface; commencing, stopping, continuing, and/or adjusting collection of data from the sensor; and/or applying a tag (e.g., as metadata) to data from the sensor indicating that the sensor is "active" or "inactive". For example, a sensor activation may include one or more of: providing power to the sensor; communicating with the sensor (e.g., providing commands, tracking diagnostic information, and/or collecting data from the sensor); providing couplant to a delay line of the sensor; tagging collected data from the sensor with an active flag; lowering the sensor into operational contact with the inspection surface; and/or applying a selected down force to the sensor to ensure operational contact. In another example, a sensor deactivation may include one or more of: cutting power to the sensor; cutting communication with the sensor; ceasing couplant provision to a delay line of the sensor; ceasing the monitoring of couplant provision to the delay line of the sensor (e.g., couplant is still nominally provided, but certain operations to confirm couplant performance, perform de-bubbling operations, or the like, may not be fully performed or maintained); tagging collected data from the sensor with an inactive or deactivated flag; lifting the sensor from operational contact with the inspection surface; ceasing the application of a selected down force to the sensor; ceasing the monitoring of down force applied to the sensor; and/or ceasing position monitoring and confirmation operations (e.g., using a camera to ensure that the sensor is properly positioned to be in operational contact with the inspection surface). In certain embodiments, activating or deactivating a sensor may include installing the sensor on the inspection robot, and/or installing a payload including the sensor on the inspection robot.

An example inspection operation 17802 includes an operation 17806 to place the inspection robot on an inspection surface in response to an inspection trajectory value 17704. For example, the inspection trajectory value 17704 may include a starting location for physical inspection operations, and/or a discontinuity in inspected regions (e.g., where the operator moves the inspection robot manually between regions).

Figure 48:
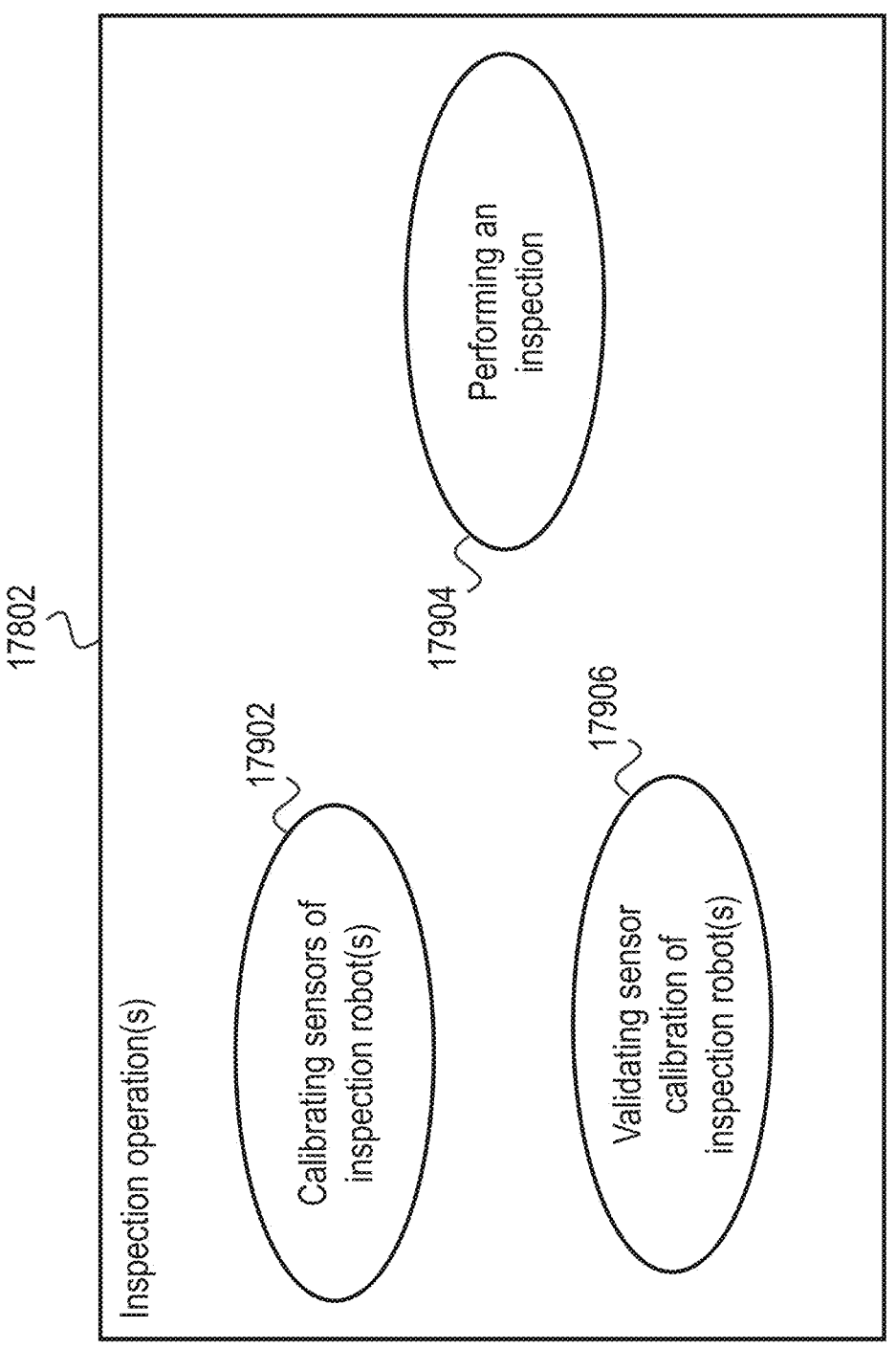

Referencing FIG. 48, example and non-limiting inspection operations 17802 are schematically depicted. The example inspection operation 17802 includes an operation 17902 to calibrate sensors of the inspection robot. In certain embodiments, the operation 17802 may be performed by a controller of the inspection robot, for example implementing calibration values and/or a calibration mode (e.g., deep scan mode) in response to a sensor calibration value 17706. An example inspection operation 17802 includes an operation 17904 to perform an inspection (e.g., as a physical inspection operation) in response to the inspection control parameter 17702—for example performing an aspect of execution for the inspection operation, such as controlling the movement and/or position of the inspection robot, monitoring and/or confirming any parameters, and/or performing any aspect according to an inspection execution parameter 17708 as set forth herein. An example inspection operation 17802 includes an operation 17906 to validate a sensor calibration of an inspection robot. In certain embodiments, operation 17906 includes operating the inspection robot using the sensor calibration on the inspection surface and/or a calibration block to validate the calibration. In certain embodiments, operation 17906 includes providing a direct view of the calibration (e.g., to the second location), capturing a file version, displaying values from a memory location on a controller, providing metadata for the physical inspection operation that demonstrates the calibration, etc., that demonstrates that the sensor calibration value 17706 has been properly applied, and/or that the sensor calibration value 17706 is correct for the conditions of the inspection surface.

Figure 49:
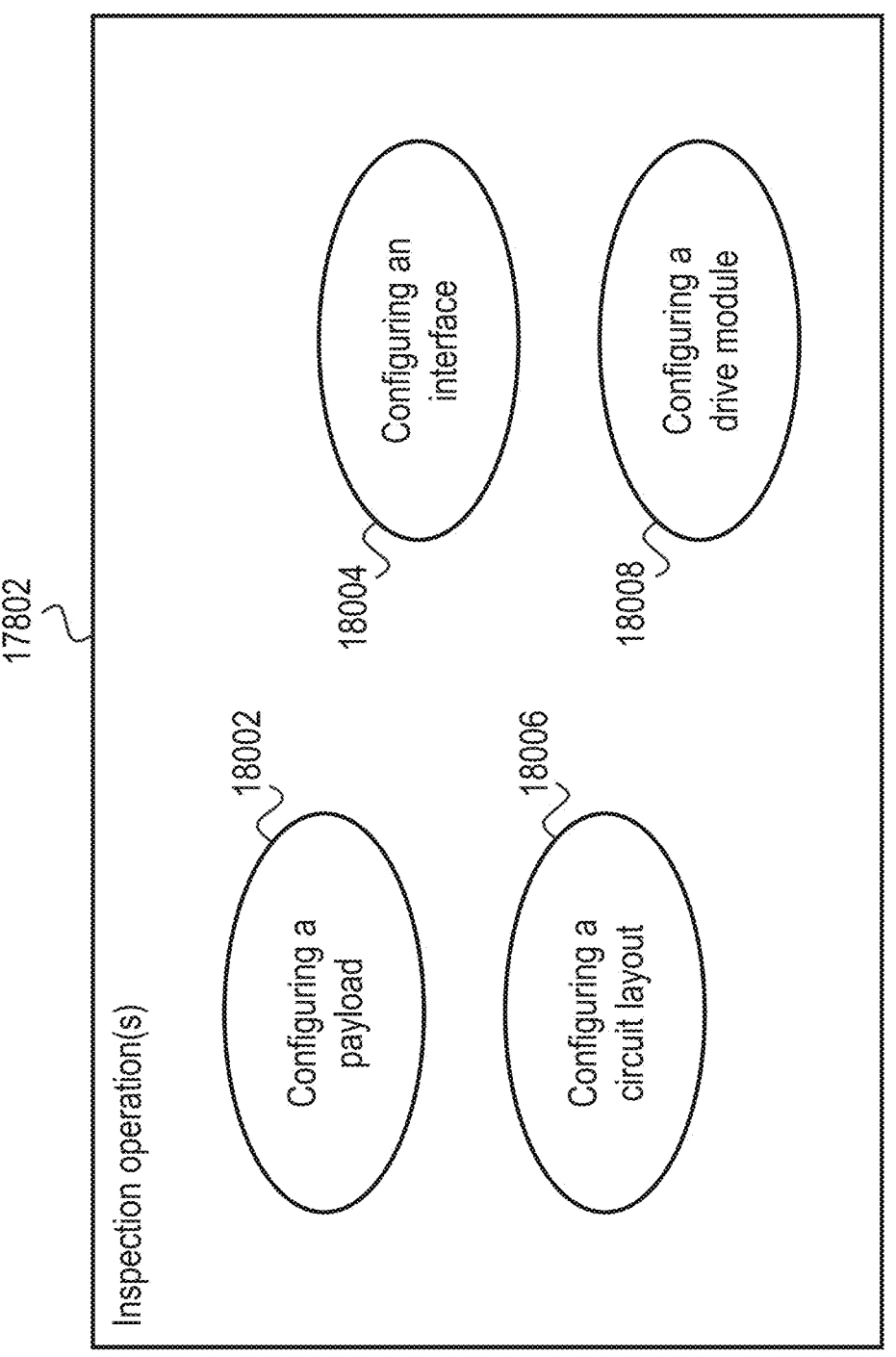

Referencing FIG. 49, example and non-limiting inspection operations 17802 are schematically depicted. An example inspection operation 17802 includes an operation 18002 to configure a payload in response to the inspection control parameter 17702 (e.g., as an inspection robot configuration parameter 17710). Example operations 18002 include one or more operations such as: mounting selected sensors on the payload; selecting a biasing spring or other down force control component for the payload; mounting the payload to the inspection robot in a selected arrangement; selecting horizontal position(s) for sensor(s) on the payload (e.g., using configurable sled positions); and/or routing power, communications, or couplant to the payload in a selected manner. An example inspection operation 17802 includes an operation 18004 to configure an interface of the inspection robot in response to the inspection control parameter 17702—for example setting communications protocols, sampling rates, configuring power inputs (e.g., AC vs. DC, voltage levels, frequency values, noise and/or clean-up configuration, etc.), configuring I/O for the payload (e.g., installing an interface plate with selected I/O from the inspection robot to the payload), etc. An example inspection operation 17802 includes an operation 18006 to configure a circuit layout for the inspection robot (e.g., installing selected cards/boards or PCBs, which may control various sensors, accessories such as a drive module, data acquisition cards having selected capability, adjusting card/board locations to conform to a heat rejection plan for the inspection robot, adjusting power configuration for the inspection robot, etc.). An example inspection operation 17802 includes an operation 18008 to configure a drive module for the inspection robot (e.g., coupling the drive module at a selected location or interface of the inspection robot, and/or setting the drive logic (e.g., forward vs. reverse commands) for the drive module).

Figure 50:
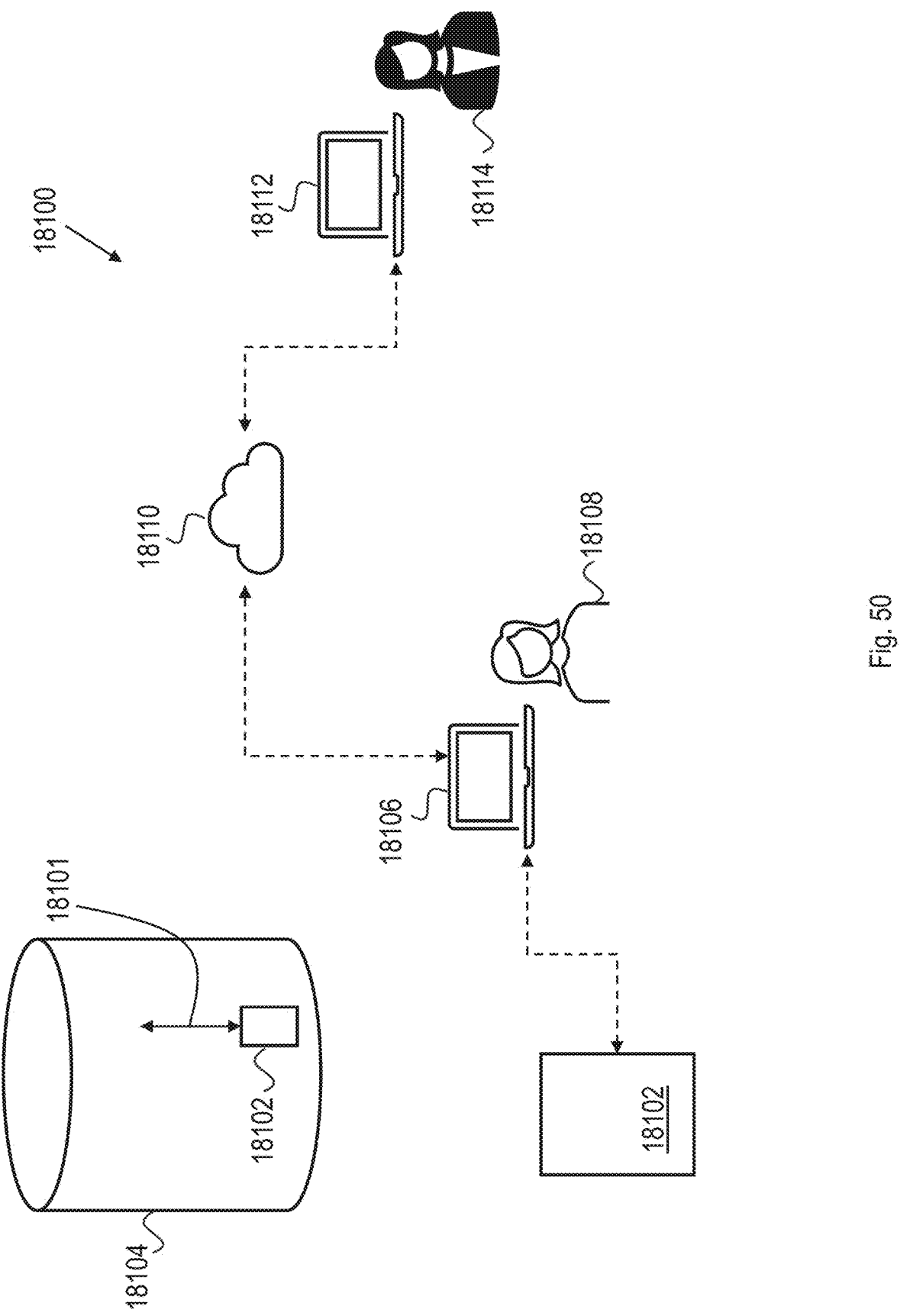
FIG. 50 depicts an example system to receive an inspection control parameter and adjust an inspection operation.

Referencing FIG. 50, an example system 18100 to implement inspection control parameters 17702 provided at a second location, to provide for remote data analysis to support physical inspection operations, and to provide for division of labor between experts having differential areas of expertise is schematically depicted. The example system 18100 provides an illustrative context for various embodiments herein, and any one or more, or all, aspects of the system 18100 may be included with any systems, controllers, payloads, or the like as set forth throughout the present disclosure. Additionally, any methods, procedures, or functional operations as set forth throughout the present disclosure may be performed in the context of system 18100 or portions thereof.

The example system includes an inspection robot 18102, depicted on the surface of an asset 18104, where at least a portion of the surface of the asset 18104 forms an example inspection surface. The inspection robot 18102 is depicted as capable to move 18101 on the surface of the asset, in a vertical movement in the example of FIG. 50. The example system 18100 includes a local computing device 18106, which may be an operator 18108 laptop, mobile device, a local computing device at a facility including the asset 18104, or the like. The example inspection robot 18102 is communicatively coupled, at least intermittently, to the local computing device 18106, although the inspection robot 18102 may additionally or alternatively be coupled directly to a remote computing device 18112. The local computing device 18106 and remote computing device 18112 are depicted as being communicatively coupled through the cloud 18110 (e.g., through the internet or other networking backbone), but the communicative coupling between the local computing device 18106, the inspection robot 18102, and/or the remote computing device 18112, may be provided using any known communication systems, including WiFi, Bluetooth, a LAN, a WAN, a web portal, a mobile application, cellular communications, and may utilize different communication systems at different times and/or at different operating conditions.

In the example of FIG. 50, a remote expert 18114 interfaces with the system utilizing a remote computing device 18112. The remote computing device 18112 may be embodied by any computing device, such as a laptop, desktop, tablet, mobile device, and/or terminal. The remote computing device 18112 may be embodied by different devices at different times and/or operating conditions. In certain embodiments, a cloud server may embody some or all of the controllers and/or circuits set forth herein, and/or may embody some or all of the aspects described in relation to the local computing device 18106 and/or remote computing device 18112 as set forth herein. In certain embodiments, for example referencing FIG. 53 and the related description, multiple remote experts may interface with the system 18100 providing different aspects of support to the local operator 18108.

Embodiments herein allow for the remote expert(s) 18114 to plan, analyze, configure, analyze, and otherwise support the physical inspection operation, allowing for the local operator 18108 to focus on operational excellence and safe operations in performing inspection operations. Further, the remote expert(s) 18114 can realize numerous efficiencies by avoiding unnecessary travel to the inspection location, training and execution of safe operation at the location, and by allowing the remote expert 18114 to support multiple physical inspection operations simultaneously and/or in a rapid succession that would not be possible otherwise due to travel constraints and physical limitations compared to previously known systems where the expert must be physically present at the location. Further, the overall quality of inspection operations is improved by embodiments herein, for example by allowing experts (whether the remote expert 18114 or the local operator 18108) to focus on training, execution, and developing experience within their areas of expertise. Additionally, by dividing the workload of inspection operations, experts (whether the remote expert 18114 or the local operator 18108) are able to focus on complex tasks that must be performed in the physical inspection operations, and able to train others due to the reduced task load, enhancing the overall capacity of a service provider employing and/or working with the remote expert 18114 and/or local operator 18108.

Figure 51:
FIG. 51 depicts an example controller to receive an inspection control parameter and adjust an inspection operation.

Referencing FIG. 51, an example system 18200 includes a controller 18202 is provided for receiving inspection control parameter(s) and/or implementing inspection operation(s) 18214. The example controller 18202 is depicted as a single device for clarity of the present description, but the controller 18202 may be a distributed device, and may be embodied, in whole or part, on the local computing device 18106, the remote computing device 18112, a controller of the inspection robot 18102, and/or a cloud server (not shown). The example controller 18202 includes a number of circuits configured to perform one or more operations of the controller 18202. The example circuits are depicted as distinct devices for clarity of the description, but may be distributed on one or more computing devices, and/or may be embodied in whole or part as any hardware device within a system, and/or as computer readable instructions which, when executed by a processor, cause the circuit to perform one or more aspects of the operations set forth herein.

The example controller 18202 includes an inspection surface description circuit 18204 structured to interpret inspection surface data 18210; a remote inspection evaluation circuit 18206 structured to transmit the inspection surface data 18210 to an external device (e.g., remote computing device 18112), and to receive an inspection control parameter 18212 from the external device. The controller 18202 includes an inspection execution circuit 18208 structured to perform an inspection operation 18214 configured in response to the inspection control parameter 18212. The inspection surface data 18210, inspection control parameter 18212, and inspection operation 18214 may include any such data or parameters as set forth throughout the present disclosure. Example operations to perform the inspection operation 18214 include operations such as: electronically configuring an aspect of the inspection robot and/or providing commands thereto; providing the inspection control parameter 18212 on a display device visible to the operator 18108; surveying the inspection robot to determine calibration values and/or other settings on the inspection robot; providing reminders and/or requesting confirmation from the operator 18108; and/or providing confirmation, validation, or other data to the remote expert 18114 in response to the inspection control parameter 18212.

An example inspection control parameter 18212 includes an inspection trajectory value, where the inspection execution circuit 18208 performs the inspection operation 18214 by transmitting the inspection trajectory value to a robot controller positioned on the inspection robot. An example inspection control parameter 18212 includes a sensor calibration value, where the inspection execution circuit 18208 performs the inspection operation 18214 by transmitting the sensor calibration value to a robot controller positioned on the inspection robot. An example inspection execution circuit 18208 further structured receives a calibration confirmation value from the controller positioned on the inspection robot, and where the remote inspection evaluation circuit 18206 further structured transmits the calibration confirmation value to the external device. An example inspection control parameter 18212 includes an inspection robot configuration parameter, where the inspection execution circuit 18208 further transmits the inspection robot configuration parameter to a robot controller positioned on the inspection robot. An example inspection control parameter 18212 includes a sensor selection value, where the inspection execution circuit 18208 transmits the sensor selection value to a robot controller positioned on the inspection robot.

An example inspection control parameter 18212 includes an inspection trajectory value, and an inspection robot includes a phased array sensor, and a robot controller configured to control motive operations of the inspection robot on the inspection surface in response to the inspection trajectory value.

An example inspection control parameter 18212 includes a sensor calibration value, and an inspection robot includes a phased array sensor and a robot controller configured to calibrate the phased array sensor in response to the sensor calibration value. An example robot controller further provides a calibration confirmation value to the inspection execution circuit 18208 in response to the operation to calibrate the phased array sensor. An example remote inspection evaluation circuit transmits the calibration confirmation value to the external device.

An example inspection control parameter 18212 includes an inspection execution parameter; an inspection robot includes a phased array sensor and a robot controller configured to operate the inspection robot on the inspection surface in response to the inspection execution parameter. An example inspection control parameter 18212 includes an inspection robot configuration parameter; an inspection robot includes a phased array sensor and a robot controller configured to operate the inspection robot on the inspection surface in response to the inspection robot configuration parameter.

An example inspection control parameter 18212 includes an inspection robot configuration parameter; an inspection robot includes a phased array sensor and a robot controller configured to configure an aspect of the inspection robot in response to the inspection robot configuration parameter.

An example robot controller configures the aspect of the inspection robot by adjusting weighting factors for a positioning algorithm of the robot controller, for example adjusting position information contributions between competing position sources, allowing the remote expert to configure position determination according to the limitations and capabilities in view of the actual physical location (e.g., accounting for a lack of geo positioning information, line of sight to portions of the inspection surface, etc.).

An example robot controller configures the aspect of the inspection robot by adjusting ultrasonic processing parameters of the robot controller. An example robot controller configures the aspect of the inspection robot by surveying connected devices (e.g., sensors, payloads, cards/boards, accessories, etc.) of the inspection robot.

An example robot controller configures the aspect of the inspection robot by selecting a reference coordinate scheme for inspection operations (e.g., absolute positioning, relative positioning, and/or criteria for the coordinate system and/or a reference location within the coordinate system).

An example robot controller configures the aspect of the inspection robot by adjusting gain values for a control algorithm of the robot controller. An example robot controller configures the aspect of the inspection robot by adjusting a cost function for a control algorithm of the robot controller.

Figure 52:
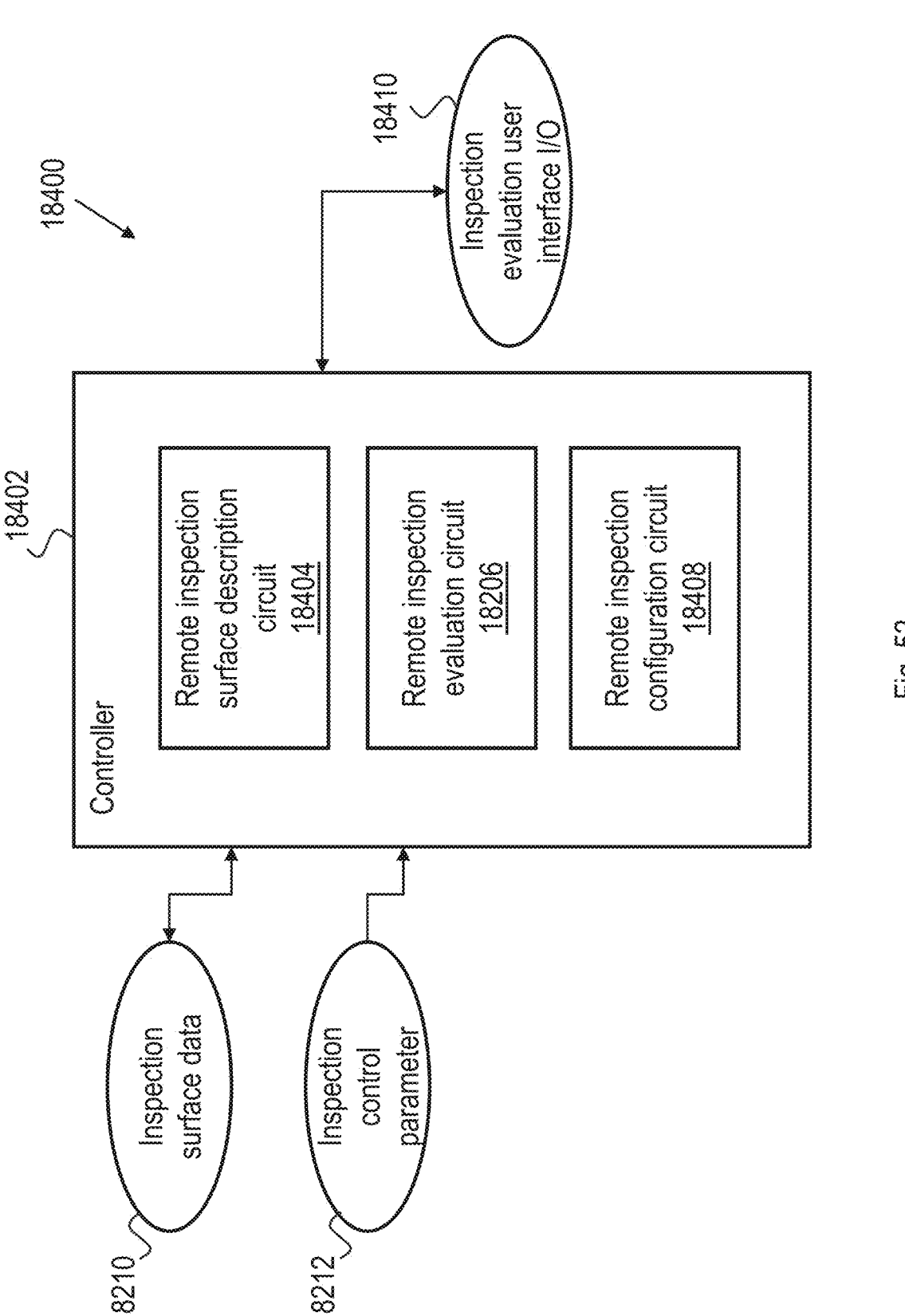
FIG. 52 depicts an example controller to receive inspection surface data and provide an inspection control parameter.

Referencing FIG. 52, an example system 18400 to support remote analysis, expert support, and reporting for physical inspection operations is schematically depicted. The example system 18400 includes a controller 18402 having a remote inspection surface description circuit 18404 that interprets inspection surface data 18210 from a local controller positioned proximate to an inspection surface, a remote inspection evaluation circuit 18206 that implements an inspection evaluation user interface 18410 (e.g., on the remote computing device 18112, and to receive user inputs from user interactions with the inspection evaluation user interface. The controller 18402 includes a remote inspection configuration circuit 18408 that provides an inspection control parameter 18212 to the local controller (e.g., a controller on the inspection robot 18102 and/or the local computing device 18106) in response to the user interactions. The inspection surface data 18210 and inspection control parameter 18212 may include any such data or parameters as set forth throughout the present disclosure.

An example remote inspection surface description circuit 18404 receives at least one of a calibration confirmation value or a calibration validation value from the local controller. An example inspection control parameter includes an inspection robot configuration parameter, where the remote inspection surface description circuit 18404 further receives a configuration confirmation value and/or a configuration validation value from the local controller. In certain embodiments, the configuration confirmation value and/or configuration validation values are determined automatically, for example through communications with the local computing device 18106 and/or a controller on the inspection robot 18102, and/or through operator actions on an operator interface (e.g., implemented by the local computing device 18106).

Figure 53:
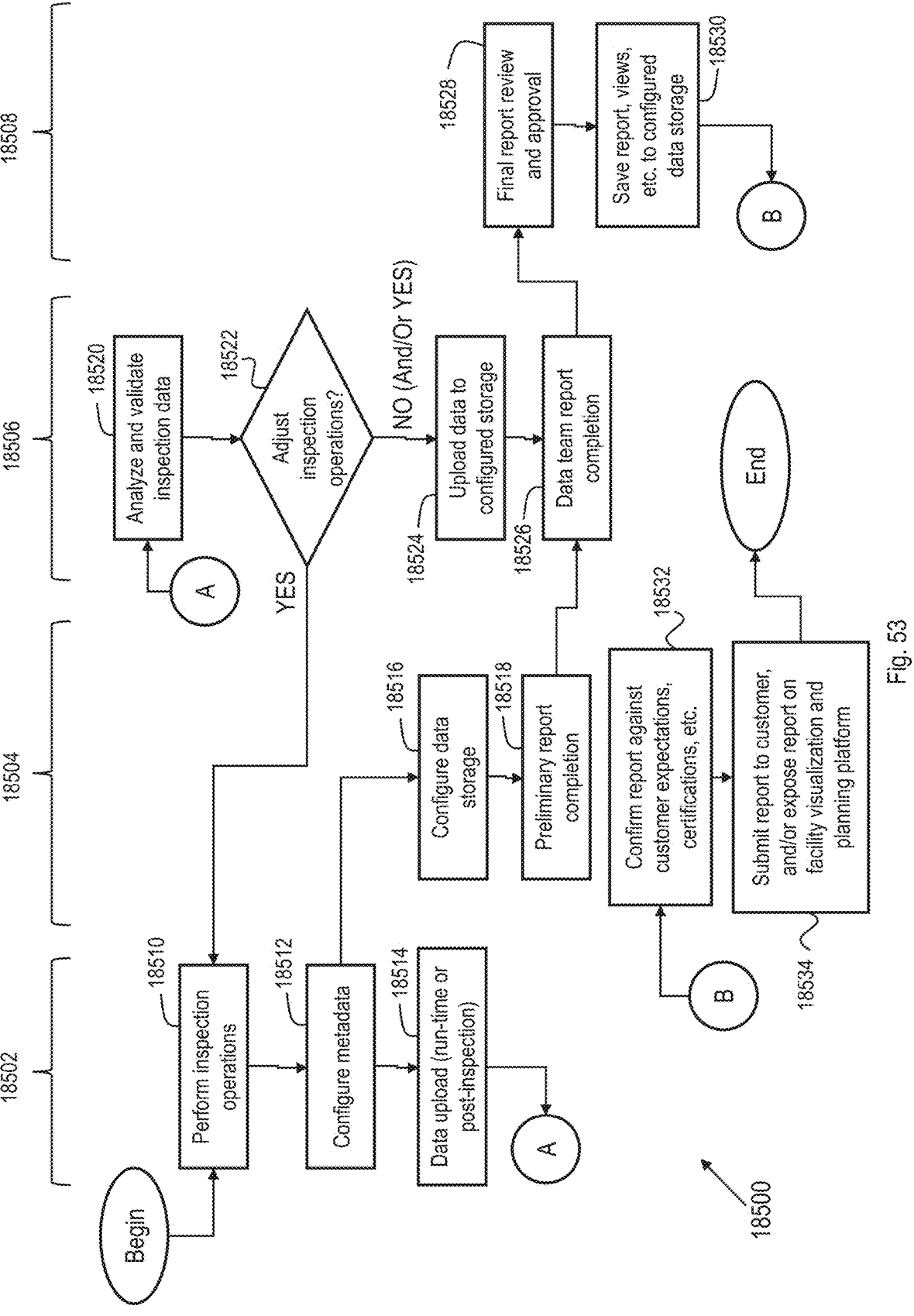
FIG. 53 depicts an example workflow to perform remote processing and reporting.

Referencing FIG. 53 an example workflow 18500 to perform remote processing and reporting for physical inspection operations is schematically depicted. The example workflow 18500 is divided into operations performed by various teams associated with the workflow 18500, providing an example of the division of support activities for physical inspection operations, including remote analysis, data processing, and reporting of inspection data. The example workflow 18500, and the division of operations between teams, is a non-limiting example to demonstrate certain features and benefits of embodiments of the present disclosure. The division of operations may be distinct from those depicted in the example of FIG. 53, and operations presented may be organized in a different manner, one or more operations may be omitted, re-ordered, repeated, or the like.

The example workflow 18500 includes a field operations team 18502, for example including personnel that perform physical configuration and operation of the inspection robot at the inspection location, and/or that perform the physical inspection operation. The example workflow 18500 includes a project management team 18504, for example including personnel that perform coordination and dispatch of operational teams, that interface with a customer of the inspection operations to determine the customer needs and to develop work orders or other agreements regarding the scope of inspection operations to be performed. The example workflow 18500 includes a data team 18506 that coordinates ingestion of the inspection data, communications support (e.g., between local and remote computing devices, a web portal, mobile application, proprietary application, etc.), data validation (e.g., ensuring data integrity, performing automated checks on inspection data, performing rationality checks such as ensuring data time sequencing is correct, data is moving in an expected manner, checks on data packet integrity, etc.), and the like. In certain embodiments, operations of the data team 18506 may include sophisticated analysis, for example using pattern recognition and/or automated routines, such as developed by a UT sensor expert (and/or UT expert team 18508), which may include substantive checks that the inspection data was collected properly and reflects the state of the inspection surface. The example workflow 18500 includes a UT expert team 18508 that performs the final analysis and/or checks on any conclusions made about the inspection data and/or inspection surface. The described teams and division of the workflow 18500 is a non-limiting example, and any organization of teams and workflow elements to support remote processing and reporting for physical inspection operations is contemplated herein.

The utilization of multiple teams divided into functional areas promotes efficient utilization of inspection resources, improves the quality of inspection operations, reduces the cost of inspection operations, and increases the throughput of inspection operations resulting in an increased capacity to perform inspections given a fixed amount of inspection resources. For example, data generated throughout the physical inspection operation life cycle is checked by the closest team to the data, resulting in a more rapid response to any data that is incorrect or where proper data may be in question. For example, in an example organization, the project management team 18504 is the most familiar with the customer needs and requirements, certifications or audits that the customer must meet, and the labeling and organization of information according to customers, and accordingly the project management team 18504 acts as the immediate custodian for relevant data, as the most immediate reviewer of that data, and as the final authority for such data. Accordingly, data within the workflow 18500 is reviewed early in the process by a team that will have the correct information to check the data, allowing for a more rapid correction in the physical inspection operation if an error is present. The same logic applies to all of the teams throughout the workflow 18500. The example workflow 18500 provides for a rapid and correct product delivery to the customer (e.g., where a final report, certification, analysis, or the like is the "product"), keeps each team focused on their area of expertise, reduces standby time for teams by allowing them to contribute to the workflow 18500 from a useful location that allows the team to perform other work, and reduces the attention burden on the critical operational personnel that perform the physical inspection operation, allowing them to focus on safe operation and operational excellence.

The example workflow 18500 includes an operation 18510 to perform inspection operations. Operation 18510 may include setup and configuration of the inspection robot, applicable payloads, and the like, and may begin away from the location (e.g., loading a vehicle with an appropriate selection of payloads, sensor sleds, accessories, etc., to ensure that the needed equipment is available based on the operations to be performed, and foreseeable (at least by experts) additions to the operations that may occur based on information developed during the on-location inspection operations). The workflow 18500 includes an operation 18512 to configure metadata, for example data that documents details about the inspection operation, equipment or calibrations available, tags for the inspection data (e.g., facility, location, inspection time, etc.). The workflow 18500 includes an operation 18516 to configure data storage for the inspection, allowing the project management team 18504 to immediately check whether the metadata is complete and correct. In certain embodiments, the metadata can therefore operate as a process check, for example using job codes or other metadata to ensure the planned work is in accordance with a work plan or the customer's request, to ensure facility information is correct, to ensure customer information is correct, etc. In certain embodiments, the project management team 18504 can immediately notify the field operations team 18502 if the metadata indicates a disconnect between the planned operations from the customer's perspective and the planned operations by the field operations team 18502.

The workflow 18500 includes, in the field operations team 18502 scope, an operation 18514 to upload inspection data, which may be performed at run-time (e.g., streaming inspection data), post-inspection (e.g., delivered from a local computing device 18106 before the field operations team 18502 leaves the location), and/or a combination of these (e.g., sending periodic batches of inspection data during the inspection operations). In certain embodiments, inspection surface data 17602, 18210 may be provided during operation 18512 (e.g., within the metadata) and/or during operation 18514.

The workflow 18500 includes, in the data team 18506 scope, an operation 18520 to analyze and validate inspection data, for example to ensure sensors are communicating with the inspection surface, calibrations appear to be set correctly, and/or any other validation or analysis of the inspection data to ensure that the inspection operations will be successful. In certain embodiments, the workflow 18500 includes an operation 18522 to determine whether the inspection operations should be adjusted, which may include (where operation 18522 indicates YES) providing an inspection control parameter 18212 communicated to the field operations team 18502 (e.g., passed to operation 18510 perform inspection operations in the example). In certain embodiments, automated checks and responses, fault tree processes, or similar operations may be performed to determine operation 18522. In certain embodiments, some types of issues may indicate that the UT expert team 18508 should check or make a determination about operation 18522, where a member of the UT expert team 18508 may be brought in to confirm and/or correct adjustment decisions.

The workflow 18500 includes, in the data team 18506 scope, an operation 18524 to upload the inspection data (and/or including metadata) to the configured data storage. The operation 18524 may be performed once the data is collected and the inspection operations do not have an adjustment to be made (e.g., operation 18522 indicating NO), and/or the operation 18524 may be performed regardless of the determination of operation 18522 (e.g., to save off-nominal data for further processing, development of automated corrections for the data team 18506, to support inspection operation metrics, etc.).

Returning to the project manager team 18504 scope, the workflow 18500 includes an operation 18518 to prepare a preliminary report, for example ensuring that headers, organization, data fields, depictions or visualization of inspection data and/or facilities, or the like, are configured in a manner that is compliant with process requirements and customer requirements or preferences. The workflow 18500 includes an operation 18526 to prepare a data team report, for example completing data fields outlined from the preliminary report and configured properly for the customer. In certain embodiments, the data team report may be automated, for example with preliminary conclusions according to an algorithm or expert system, which may be built by the UT expert team 18508, for example depicting a visualization of inspected assets, basic information about expected service life, upcoming service events, statistics and/or outliers in the data, and the like. The workflow 18500 includes, in the UT expert team 18508 scope, an operation 18528 to review and approve the final report, for example based on the data team report. Operation 18528 provides the UT expert team 18508 the opportunity to provide a refined analysis of any preliminary determinations from the data team report, to add explanations, descriptions of certainty around any conclusions, recommendations for future inspection operations based on the results (e.g., changing the timing or content of future inspections), and/or descriptions about what further information might be developed to close the gap on any uncertainties about the asset, facility, or inspection surface. Operation 18528 further provides the UT expert team 18508 with an opportunity to perform a more granular analysis on any data analysis, for example to confirm that automated checks or conclusions (e.g., operated by the data team 18506 or otherwise) are correct, to improve the underlying automated checks or expert systems, or the like. The workflow 18500 includes an operation 18530 to save the report, any views (e.g., specific depictions, graphs, facility views, and/ or annotations by the UT expert team 18508, allowing other parties such as the operator and/or customer to view specific configured aspects of the report, the inspection data, or conclusions determined therefrom, as curated by the UT expert team 18508 and that can be accessed, for example on a facility visualization and planning platform, by just logging in to an account, following a hyperlink, etc.).

The workflow 18500 includes an operation 18532 for the project management team 18504 to confirm the final report before it is provided to the customer. The project management team 18504 ensures that the customer requirements and/or preferences are met, that items in a work order are complete, that required certification elements are addressed (e.g., where the inspection is a part of a regulatory or other requirement), or the like. Further, for example where the project management team 18504 is the curator of the customer relationship, the project management team 18504 can highlight items of interest, provide customer facing notes or commentary, or the like. Operation 18534 may be performed by providing the report to the customer (e.g., in an e-mail, with a link, as a printed hard copy, etc.), and/or by exposing the report to the customer on a facility visualization and planning platform (e.g., making the report accessible to a user account, dashboard, within a messaging system, or the like on the platform).

An example operation 18514 uploads inspection data following a preliminary completion of inspection operations—for example the field operations team 18502 may complete planned inspection operations, but await confirmation based on the uploaded inspection data before leaving the location. In certain embodiments, preliminary completion of inspection operations includes a full completion of inspection operations upon confirmation from another team (e.g., the project management team 18504 and/or data team 18506). An example workflow 18500 includes uploading 18514 inspection data during the inspection operations, for example streaming or batching inspection data during the inspection operations. An example workflow 18500 includes performing operations for one or more teams 18502, 18504, 18506, 18508 by accessing a facility visualization and planning platform.

An example workflow 18500 includes performing operation 18520 and/or operation 18528 by performing an operation such as: confirming a configuration of an inspection robot; confirming a configuration of a payload of an inspection robot; confirming a calibration of a sensor; confirming an apparent aspect of the inspection surface; confirming a diagnostic condition of an inspection robot; or performing a rationality check on the inspection data. An example workflow 18500 includes performing operation 18526 and/or operation 18528 by performing an operation such as: reviewing an analytical conclusion of the preliminary report; reviewing an appropriateness of a configuration of an inspection robot; reviewing an appropriateness of a configuration of a payload of an inspection robot; and/or reviewing an appropriateness of a calibration of a sensor. An example workflow 18500 includes performing operation 18528 by performing an operation such as: adjusting an analytical conclusion of the preliminary report (and/or of the data team report); or adding an inspection control parameter for a future inspection operation. An example workflow 18500 includes determining an inspection control parameter in response to the analysis of the inspection data or validation of the inspection data utilizing the uploaded inspection data; and communicating the inspection control parameter to a computing device positioned in proximity to the inspection surface. An example workflow 18500 includes determining an inspection control parameter in response to the reviewing the preliminary report for data quality and/or data accuracy; and communicating the inspection control parameter to a computing device positioned in proximity to the inspection surface. An example operation 18532 includes confirming the approved report for scope completion by performing at least one operation such as: comparing the approved report to a work order for the inspection operation; comparing the approved report to a planned inspection operation; comparing the approved report to a work specification for the inspection operation; comparing the approved report to a certification requirement for the asset of the facility; or comparing the approved report to a work description agreed with the customer.

The methods and systems described herein may be deployed in part or in whole through a machine having a computer, computing device, processor, circuit, and/or server that executes computer readable instructions, program codes, instructions, and/or includes hardware configured to functionally execute one or more operations of the methods and systems disclosed herein. The terms computer, computing device, processor, circuit, and/or server, as utilized herein, should be understood broadly.

Any one or more of the terms computer, computing device, processor, circuit, and/or server include a computer of any type, capable to access instructions stored in communication thereto such as upon a non-transient computer readable medium, whereupon the computer performs operations of systems or methods described herein upon executing the instructions. In certain embodiments, such instructions themselves comprise a computer, computing device, processor, circuit, and/or server. Additionally or alternatively, a computer, computing device, processor, circuit, and/or server may be a separate hardware device, one or more computing resources distributed across hardware devices, and/or may include such aspects as logical circuits, embedded circuits, sensors, actuators, input and/or output devices, network and/or communication resources, memory resources of any type, processing resources of any type, and/or hardware devices configured to be responsive to determined conditions to functionally execute one or more operations of systems and methods herein.

Network and/or communication resources include, without limitation, local area network, wide area network, wireless, internet, or any other known communication resources and protocols. Example and non-limiting hardware, computers, computing devices, processors, circuits, and/or servers include, without limitation, a general purpose computer, a server, an embedded computer, a mobile device, a virtual machine, and/or an emulated version of one or more of these. Example and non-limiting hardware, computers, computing devices, processors, circuits, and/or servers may be physical, logical, or virtual. A computer, computing device, processor, circuit, and/or server may be: a distributed resource included as an aspect of several devices; and/or included as an interoperable set of resources to perform described functions of the computer, computing device, processor, circuit, and/or server, such that the distributed resources function together to perform the operations of the computer, computing device, processor, circuit, and/or server. In certain embodiments, each computer, computing device, processor, circuit, and/or server may be on separate hardware, and/or one or more hardware devices may include aspects of more than one computer, computing device, processor, circuit, and/or server, for example as separately executable instructions stored on the hardware device, and/or as logically partitioned aspects of a set of executable instructions, with some aspects of the hardware device comprising a part of a first computer, computing device, processor, circuit, and/or server, and some aspects of the hardware device comprising a part of a second computer, computing device, processor, circuit, and/or server.

A computer, computing device, processor, circuit, and/or server may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor, or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions, and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache, and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer readable instructions on a server, client, firewall, gateway, hub, router, or other such computer and/or networking hardware. The computer readable instructions may be associated with a server that may include a file server, print server, domain server, internet server, intranet server and other variants such as secondary server, host server, distributed server, and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, and the like. Additionally, this coupling and/or connection may facilitate remote execution of instructions across the network. The networking of some or all of these devices may facilitate parallel processing of program code, instructions, and/or programs at one or more locations without deviating from the scope of the disclosure. In addition, all the devices attached to the server through an interface may include at least one storage medium capable of storing methods, program code, instructions, and/or programs. A central repository may provide program instructions to be executed on different devices. In this implementation, the remote repository may function as a storage medium for methods, program code, instructions, and/or programs.

The methods, program code, instructions, and/or programs may be associated with a client that may include a file client, print client, domain client, internet client, intranet client and other variants such as secondary client, host client, distributed client, and the like. The client may include one or more of memories, processors, computer readable transitory and/or non-transitory media, storage media, ports (physical and virtual), communication devices, and interfaces capable of accessing other clients, servers, machines, and devices through a wired or a wireless medium, and the like. The methods, program code, instructions, and/or programs as described herein and elsewhere may be executed by the client. In addition, other devices utilized for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of methods, program code, instructions, and/or programs across the network. The networking of some or all of these devices may facilitate parallel processing of methods, program code, instructions, and/or programs at one or more locations without deviating from the scope of the disclosure. In addition, all the devices attached to the client through an interface may include at least one storage medium capable of storing methods, program code, instructions, and/or programs. A central repository may provide program instructions to be executed on different devices. In this implementation, the remote repository may function as a storage medium for methods, program code, instructions, and/or programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules, and/or components as known in the art. The computing and/or non-computing device(s) associated with the network infrastructure may include, apart from other components, a storage medium such as flash memory, buffer, stack, RAM, ROM, and the like. The methods, program code, instructions, and/or programs described herein and elsewhere may be executed by one or more of the network infrastructural elements.

The methods, program code, instructions, and/or programs described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, program code, instructions, and/or programs described herein and elsewhere may be implemented on or through mobile devices. The mobile devices may include navigation devices, cell phones, mobile phones, mobile personal digital assistants, laptops, palmtops, netbooks, pagers, electronic books readers, music players, and the like. These mobile devices may include, apart from other components, a storage medium such as a flash memory, buffer, RAM, ROM and one or more computing devices. The computing devices associated with mobile devices may be enabled to execute methods, program code, instructions, and/or programs stored thereon. Alternatively, the mobile devices may be configured to execute instructions in collaboration with other devices. The mobile devices may communicate with base stations interfaced with servers and configured to execute methods, program code, instructions, and/or programs. The mobile devices may communicate on a peer to peer network, mesh network, or other communications network. The methods, program code, instructions, and/or programs may be stored on the storage medium associated with the server and executed by a computing device embedded within the server. The base station may include a computing device and a storage medium. The storage device may store methods, program code, instructions, and/or programs executed by the computing devices associated with the base station.

The methods, program code, instructions, and/or programs may be stored and/or accessed on machine readable transitory and/or non-transitory media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, stand-alone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

Certain operations described herein include interpreting, receiving, and/or determining one or more values, parameters, inputs, data, or other information. Operations including interpreting, receiving, and/or determining any value parameter, input, data, and/or other information include, without limitation: receiving data via a user input; receiving data over a network of any type; reading a data value from a memory location in communication with the receiving device; utilizing a default value as a received data value; estimating, calculating, or deriving a data value based on other information available to the receiving device; and/or updating any of these in response to a later received data value. In certain embodiments, a data value may be received by a first operation, and later updated by a second operation, as part of the receiving a data value. For example, when communications are down, intermittent, or interrupted, a first operation to interpret, receive, and/or determine a data value may be performed, and when communications are restored an updated operation to interpret, receive, and/or determine the data value may be performed.

Certain logical groupings of operations herein, for example methods or procedures of the current disclosure, are provided to illustrate aspects of the present disclosure. Operations described herein are schematically described and/or depicted, and operations may be combined, divided, re-ordered, added, or removed in a manner consistent with the disclosure herein. It is understood that the context of an operational description may require an ordering for one or more operations, and/or an order for one or more operations may be explicitly disclosed, but the order of operations should be understood broadly, where any equivalent grouping of operations to provide an equivalent outcome of operations is specifically contemplated herein. For example, if a value is used in one operational step, the determining of the value may be required before that operational step in certain contexts (e.g. where the time delay of data for an operation to achieve a certain effect is important), but may not be required before that operation step in other contexts (e.g. where usage of the value from a previous execution cycle of the operations would be sufficient for those purposes). Accordingly, in certain embodiments an order of operations and grouping of operations as described is explicitly contemplated herein, and in certain embodiments re-ordering, subdivision, and/or different grouping of operations is explicitly contemplated herein.

The methods and systems described herein may transform physical and/or or intangible items from one state to another. The methods and systems described herein may also transform data representing physical and/or intangible items from one state to another.

The elements described and depicted herein, including in flow charts, block diagrams, and/or operational descriptions, depict and/or describe specific example arrangements of elements for purposes of illustration. However, the depicted and/or described elements, the functions thereof, and/or arrangements of these, may be implemented on machines, such as through computer executable transitory and/or non-transitory media having a processor capable of executing program instructions stored thereon, and/or as logical circuits or hardware arrangements. Example arrangements of programming instructions include at least: monolithic structure of instructions; standalone modules of instructions for elements or portions thereof; and/or as modules of instructions that employ external routines, code, services, and so forth; and/or any combination of these, and all such implementations are contemplated to be within the scope of embodiments of the present disclosure Examples of such machines include, without limitation, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements described and/or depicted herein, and/or any other logical components, may be implemented on a machine capable of executing program instructions. Thus, while the foregoing flow charts, block diagrams, and/or operational descriptions set forth functional aspects of the disclosed systems, any arrangement of program instructions implementing these functional aspects are contemplated herein. Similarly, it will be appreciated that the various steps identified and described above may be varied, and that the order of steps may be adapted to particular applications of the techniques disclosed herein. Additionally, any steps or operations may be divided and/or combined in any manner providing similar functionality to the described operations. All such variations and modifications are contemplated in the present disclosure. The methods and/or processes described above, and steps thereof, may be implemented in hardware, program code, instructions, and/or programs or any combination of hardware and methods, program code, instructions, and/or programs suitable for a particular application. Example hardware includes a dedicated computing device or specific computing device, a particular aspect or component of a specific computing device, and/or an arrangement of hardware components and/or logical circuits to perform one or more of the operations of a method and/or system. The processes may be implemented in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and computer readable instructions, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionalities may be integrated into a dedicated, standalone device or other hardware. In another aspect, the means for performing the steps associated with the processes described above may include any of the hardware and/or computer readable instructions described above. All such permutations and combinations are contemplated in embodiments of the present disclosure.

What is claimed is:

1. A method, comprising:

performing inspection operations for an inspection surface at an asset of a facility;

configuring metadata for inspection data collected as a part of the inspection operations;

uploading inspection data in response to the inspection operations;

performing at least one of analysis of the inspection data or validation of the inspection data utilizing the uploaded inspection data, wherein the performing at least one of analysis of the inspection data or validation of the inspection data comprises accessing a facility visualization and planning platform;

providing a preliminary report in response to the analyzed and/or validated inspection data;

reviewing the preliminary report for data quality and/or data accuracy, and providing an approved report in response to the review; and confirming the approved report for scope completion, and providing a confirmed final report to a customer of the inspection operation.

2. The method of claim 1, wherein the uploading inspection data follows a preliminary completion of the inspection operations.

3. The method of claim 1, wherein the uploading inspection data is performed during the inspection operations.

4. The method of claim 1, wherein the performing at least one of analysis of the inspection data or validation of the inspection data comprises accessing a facility visualization and planning platform.

5. The method of claim 1, wherein the reviewing the preliminary report for data quality and/or data accuracy comprises accessing the facility visualization and planning platform.

6. The method of claim 5, wherein confirming the approved report for scope completion comprises accessing the facility visualization and planning platform.

7. The method of claim 6, wherein providing the confirmed final report comprises exposing the final report to the customer on the facility visualization and planning platform.

8. The method of claim 1, wherein the performing at least one of analysis of the inspection data or validation of the inspection data further comprises performing at least one operation selected from:

confirming a configuration of an inspection robot;

confirming a configuration of a payload of an inspection robot;

confirming a calibration of a sensor;

confirming an apparent aspect of the inspection surface;

confirming a diagnostic condition of an inspection robot; or performing a rationality check on the inspection data.

9. The method of claim 1, wherein the reviewing the preliminary report for data quality and/or data accuracy comprises performing at least one operation selected from:

reviewing an analytical conclusion of the preliminary report;

reviewing an appropriateness of a configuration of an inspection robot;

reviewing an appropriateness of a configuration of a payload of an inspection robot; or reviewing an appropriateness of a calibration of a sensor.

10. The method of claim 1, wherein providing the approved report comprises performing at least one operation selected from:

adjusting an analytical conclusion of the preliminary report; or adding an inspection control parameter for a future inspection operation.

11. The method of claim 1, further comprising:

determining an inspection control parameter in response to the analysis of the inspection data or validation of the inspection data utilizing the uploaded inspection data; and communicating the inspection control parameter to a computing device positioned in proximity to the inspection surface.

12. The method of claim 1, further comprising:

determining an inspection control parameter in response to the reviewing the preliminary report for data quality and/or data accuracy; and communicating the inspection control parameter to a computing device positioned in proximity to the inspection surface.

13. The method of claim 1, wherein the confirming the approved report for scope completion comprises performing at least one operation selected from:

comparing the approved report to a work order for the inspection operation;

comparing the approved report to a planned inspection operation;

comparing the approved report to a work specification for the inspection operation;

comparing the approved report to a certification requirement for the asset of the facility; or comparing the approved report to a work description agreed with the customer.

14. A method, comprising:

performing inspection operations for an inspection surface at an asset of a facility;

configuring metadata for inspection data collected as a part of the inspection operations;

uploading inspection data in response to the inspection operations, wherein the uploading inspection data follows a preliminary completion of the inspection operations;

performing at least one of analysis of the inspection data or validation of the inspection data utilizing the uploaded inspection data;

providing a preliminary report in response to the analyzed and/or validated inspection data;

reviewing the preliminary report for data quality and/or data accuracy, and providing an approved report in response to the review; and confirming the approved report for scope completion, and providing a confirmed final report to a customer of the inspection operation.

15. The method of claim 14, further comprising:

determining an inspection control parameter in response to the analysis of the inspection data or validation of the inspection data utilizing the uploaded inspection data; and communicating the inspection control parameter to a computing device positioned in proximity to the inspection surface.

16. The method of claim 14, further comprising:

determining an inspection control parameter in response to the reviewing the preliminary report for data quality and/or data accuracy; and communicating the inspection control parameter to a computing device positioned in proximity to the inspection surface.

17. A method, comprising:

performing inspection operations for an inspection surface at an asset of a facility;

configuring metadata for inspection data collected as a part of the inspection operations;

uploading inspection data in response to the inspection operations, wherein the uploading inspection data is performed during the inspection operations;

performing at least one of analysis of the inspection data or validation of the inspection data utilizing the uploaded inspection data;

providing a preliminary report in response to the analyzed and/or validated inspection data;

reviewing the preliminary report for data quality and/or data accuracy, and providing an approved report in response to the review; and confirming the approved report for scope completion, and providing a confirmed final report to a customer of the inspection operation.

18. The method of claim 17, further comprising:

determining an inspection control parameter in response to the analysis of the inspection data or validation of the inspection data utilizing the uploaded inspection data; and communicating the inspection control parameter to a computing device positioned in proximity to the inspection surface.

19. The method of claim 17, further comprising:

determining an inspection control parameter in response to the reviewing the preliminary report for data quality and/or data accuracy; and communicating the inspection control parameter to a computing device positioned in proximity to the inspection surface.

* * * * *